(12) United States Patent
Yang

(10) Patent No.: US 10,794,730 B1
(45) Date of Patent: Oct. 6, 2020

(54) POSITION TRACKING SYSTEM

(71) Applicant: Wenbo Yang, Bellevue, WA (US)

(72) Inventor: Wenbo Yang, Bellevue, WA (US)

( * ) Notice: Subject to any disclaimer, the term of this patent is extended or adjusted under 35 U.S.C. 154(b) by 93 days.

(21) Appl. No.: 16/429,539

(22) Filed: Jun. 3, 2019

(51) Int. Cl.
| | |
|---|---|
| *A63F 13/00* | (2014.01) |
| *G01D 5/12* | (2006.01) |
| *H01Q 7/00* | (2006.01) |
| *H01Q 1/27* | (2006.01) |
| *G06F 3/01* | (2006.01) |
| *G06F 3/0346* | (2013.01) |
| *A63F 13/235* | (2014.01) |
| *A63F 13/212* | (2014.01) |
| *A63F 13/211* | (2014.01) |

(52) U.S. Cl.
CPC ............. *G01D 5/12* (2013.01); *A63F 13/212* (2014.09); *A63F 13/235* (2014.09); *G06F 3/012* (2013.01); *G06F 3/014* (2013.01); *G06F 3/0346* (2013.01); *H01Q 1/273* (2013.01); *H01Q 7/00* (2013.01); *A63F 13/211* (2014.09); *A63F 2300/105* (2013.01); *A63F 2300/1012* (2013.01); *A63F 2300/1031* (2013.01); *A63F 2300/8082* (2013.01)

(58) Field of Classification Search
None
See application file for complete search history.

(56) References Cited

U.S. PATENT DOCUMENTS

| | | | | |
|---|---|---|---|---|
| 3,369,235 A | * | 2/1968 | Odams | H01Q 21/29 342/380 |
| 6,442,986 B1 | * | 9/2002 | Russell | E05B 47/063 70/278.3 |
| 8,907,531 B2 | * | 12/2014 | Hall | H02J 50/60 307/326 |

(Continued)

*Primary Examiner* — Paul A D'Agostino
(74) *Attorney, Agent, or Firm* — Mohr Intellectual Property Law Solutions, PC

(57) ABSTRACT

Position tracking systems comprising one or more emitters comprising one or more emitter magnetic loops, one or more receivers comprising one or more receiver magnetic loops and a processing unit and a processing unit comprising a mixed signal circuit, wherein the one or more emitters and the one or more receivers each further comprise one or more electromagnetic absorbers and electromagnetic blockers which are configured to ensure the respective emitter and receiver magnetic loops emit a magnetic field on their own plane. The one or more receiver magnetic loops, the one or more second electromagnetic absorbers, and the one or more second electromagnetic blockers are placed in between the one or more receivers to increase differences in the strengths of the incoming magnetic field such that the differences in the strengths are measurable by mixed signal circuit. In some examples, the one or more emitters comprise at least six emitter magnetic loops, wherein an x-axis, y-axis, and z-axis each comprise two of the at least six emitter magnetic loops. In another example, the one or more emitters each operate in a unique frequency. In some further examples, a receiver unit comprises a convex spherical shape, one or more small loop antenna units comprising one or more processing units and one or more receivers, wherein the one or more receivers are rotated either along y-axis to create a cone shape or along x-axis to create a wedge shape.

20 Claims, 40 Drawing Sheets

(56) References Cited

U.S. PATENT DOCUMENTS

| | | | |
|---|---|---|---|
| 2006/0166681 A1* | 7/2006 | Lohbihler | G01S 5/02 455/456.2 |
| 2010/0061553 A1* | 3/2010 | Chaum | G06F 21/10 380/200 |
| 2011/0050405 A1* | 3/2011 | Hollis, Jr. | G06F 3/016 340/407.2 |
| 2012/0112536 A1* | 5/2012 | Karalis | H02J 50/12 307/10.1 |
| 2012/0153732 A1* | 6/2012 | Kurs | B60L 3/0069 307/104 |
| 2013/0113656 A1* | 5/2013 | Vervisch-Picois | G01S 19/11 342/357.59 |
| 2014/0266164 A1* | 9/2014 | Arumugam | G01B 7/004 324/207.15 |
| 2015/0204561 A1* | 7/2015 | Sadwick | G05D 23/1905 236/1 C |
| 2015/0303768 A1* | 10/2015 | Henderson | B60L 13/04 310/90.5 |
| 2015/0313496 A1* | 11/2015 | Connor | A61B 5/0476 600/301 |
| 2016/0033970 A1* | 2/2016 | Henderson | B60L 13/04 701/22 |
| 2017/0205903 A1* | 7/2017 | Miller | G06F 3/0346 |
| 2017/0307891 A1* | 10/2017 | Bucknor | G06F 3/012 |
| 2019/0357456 A1* | 11/2019 | Ensworth | B29C 48/0022 |

\* cited by examiner

PHYSICAL SIZE AND COMPOSITION

OPENING SIZE

POSITION TRACKING SYSTEM

BACKGROUND

The present disclosure relates generally to virtual reality systems. In particular, position tracking systems for use in virtual reality systems are described. The next step in virtual reality systems is for the consumer market. Most position tracking systems are optics based and are adequate for the current generation of virtual reality system due to the wired nature of head mounted displays. However, it desirable for the head mounted displays to be wireless. The limiting factor lies with the position tracking systems. Currently available position tracking systems are too expensive and/or too inaccurate because they are inside-out designs where the user is attached to the receivers and the receivers require Digital Signal Processing (DSP) to operate. The challenge is to make position tracking systems affordable using an outside-in design.

A consumer position tracking system must be reasonably accurate, able to operate in real-time, affordable, and deployable. The presently disclosed position tracking system for virtual reality systems offers 5 mm accuracy over a range of about 3 meters. The algorithms used are simple to ensure that it can operate in real-time. All components are mass-producible to keep the cost down. The trade-off between physical size, accuracy and measure volume are also optimized to make it deployable for home use. The presently disclosed position tracking system consists of a set of small signal emitter units, a stationary receiver unit, and attached processing unit for processing position and orientation of emitters.

SUMMARY

The present disclosure is directed to position tracking systems comprising one or more emitters comprising one or more emitter magnetic loops, one or more receivers comprising one or more receiver magnetic loops and a processing unit and a processing unit comprising a mixed signal circuit, wherein the one or more emitters and the one or more receivers each further comprise one or more electromagnetic absorbers and electromagnetic blockers which are configured to ensure the respective emitter and receiver magnetic loops emit a magnetic field on their own plane. The one or more receiver magnetic loops, the one or more second electromagnetic absorbers, and the one or more second electromagnetic blockers are placed in between the one or more receivers to increase differences in the strengths of the incoming magnetic field such that the differences in the strengths are measurable by mixed signal circuit. In some examples, the one or more emitters comprise at least six emitter magnetic loops, wherein an x-axis, y-axis, and z-axis each comprise two of the at least six emitter magnetic loops. In another example, the one or more emitters each operate in a unique frequency. In some further examples, a receiver unit comprises a convex spherical shape, one or more small loop antenna units comprising one or more processing units and one or more receivers, wherein the one or more receivers are rotated either along y-axis to create a cone shape or along x-axis to create a wedge shape.

DETAILED DESCRIPTION

Figure 1:
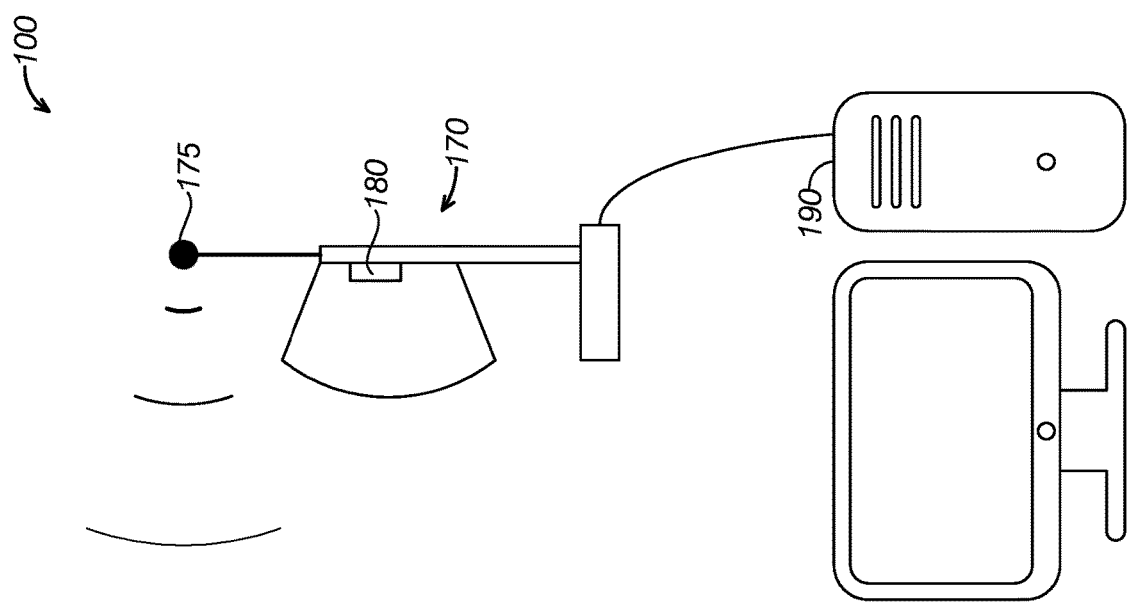
FIG. 1 is a perspective view of an example of a position tracking system.
Figure 1:
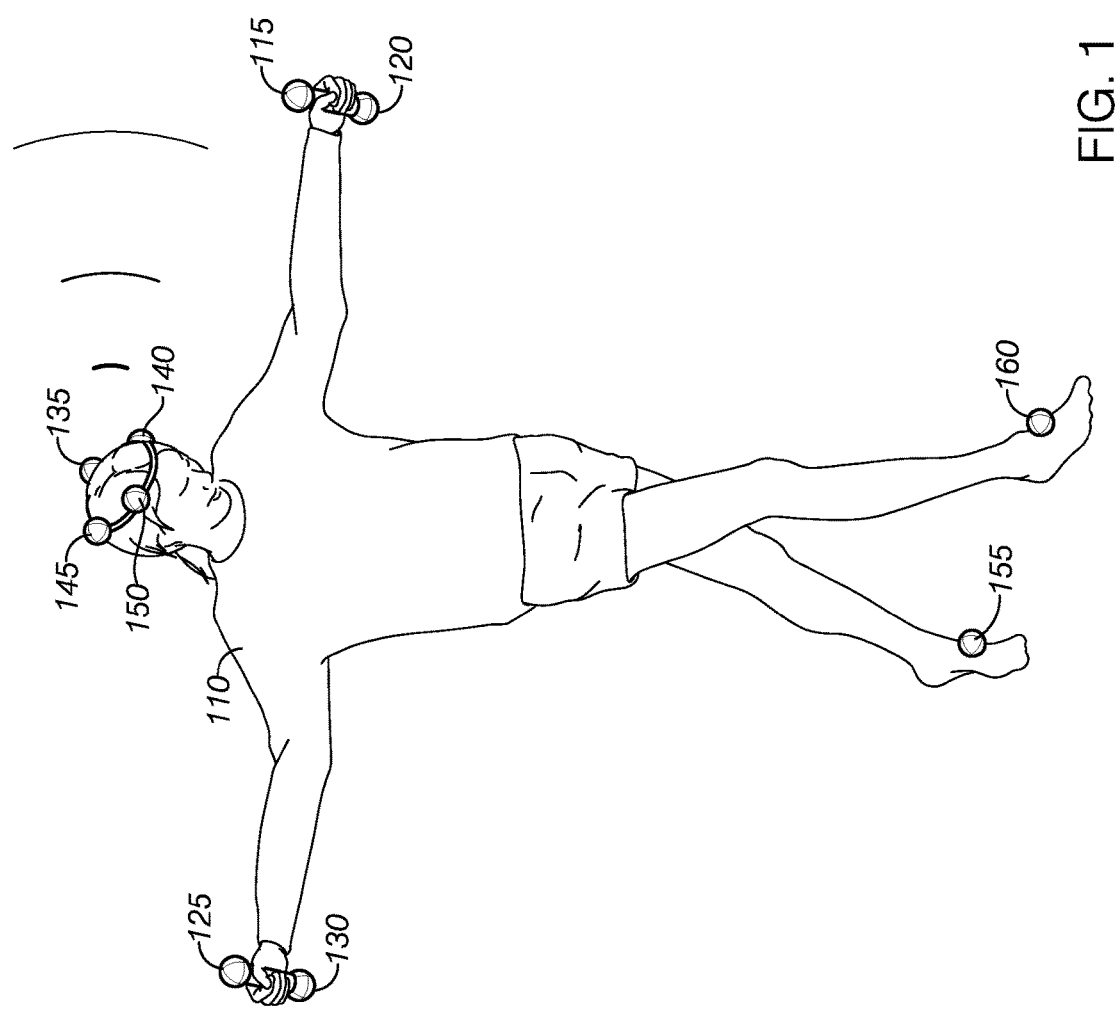

The disclosed position tracking system comprising one or more emitters and a receiver comprising a communication module and a processing unit, wherein the one or more emitters comprise one or more receiver electromagnetic absorbers which increase the differences of incoming electromagnetic fields to the point that the differences are measurable by the processing unit. In some examples, the one or more emitters each operate in a unique frequency. In another example, the one or more emitters comprise one or more emitter magnetic loops which each operating in a unique frequency. In some further examples, the receiver comprises either cone shaped units or wedge shaped units.

Throughout the following detailed description, examples of various position tracking systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The principles of design of the present position tracking system draws inspiration from optics-based tracking devices. Optics-based tracking devices consist of a light emitting source, a set of optical lenses to focus the signal to a backend sensor matrix and an image processing unit to determine the direction and position of the tracking point. Optical lenses serve as waveguide and change the direction of traveling light. Light is focused on the plain sensor matrix. The resulting graph is then saved for processing. The curved surface of the optical lenses gives the systems a cone shaped field of view (FOV). As long as the emitter stays within the field of view, and within a certain range for accuracy, position of the emitter can be computed. The accuracy is limited by the resolution of the captured image; for high accuracy operation the sensors are in the 10s of millions. A two-camera system can determine the absolute position of a point by comparing two images.

Since light signals do not penetrate materials very well, optical tracking devices lose traction when a user turns away from the receiver camera. Light is a form electromagnetic (EM) wave. EM wave travels in a straight line in free space or in air. In the EM wave spectrum, visible light has relatively low penetration depth to non-transparent materials. However, when going to lower frequencies, the penetration characteristic increases drastically. A standard 2.45 or 5 GHz can penetrate some thin materials, but still cannot penetrate human body. When going even lower frequency in to the Very High Frequency (VHF) range (30 MHz to 300 MHz). The penetration depth is just about enough, but the signal absorption by human body is measurable. Most of the medical imaging research and devices use frequencies from this range. Keep going down into High Frequency (HF) range (3 MHz to 30 MHz wavelengths 100 to 10 meters, 10 MHz electromagnetic (EM) wave has a wavelength of 30 meters), the penetration through human body and most materials drastically increases. A 10 MHz EM wave would penetrate the human body with very little signal distortion. Two frequency spectrums can be used, namely, 13.56 MHz radio-frequency identification (RFID) and 27 MHz citizen band.

The presently disclosed position tracking system uses small circular current loops to generate magnetic field. The current loops are arranged in a spherical pattern along three axes. Due to the geometrical symmetry in all directions, the magnetic field can be broadcasted in all directions with approximately equal strength. This can be treated as a point source. The signal is then captured by a matrix of small receiver loop antennas. In this frequency range, the size of waveguide is too large for home use. To create a perception of depth, an antenna matrix is placed directly over a convex spherical surface. Each antenna points to a unique direction. A fair comparison is that such arrangement resembles compounded eyes of an insect. When an antenna captures a signal, a line can be draw from that antenna to the point. When two or more receiver loops capture the same signal, the intersection of these lines is the absolute position in space of the emitter. The orientation can be determined by three points in space, or by a micro-electro-mechanical system inertial measurement unit (IMU) orientation sensor. IMUs may be a better choice in determining orientation due to its smaller size. In the follow context detailed design of each component is provided.

With reference to FIG. 1, an example of a position tracking system 100, will now be described. Position tracking system 100 includes a user 110, emitters 115, 120, 125, 130, 135, 140, 145, 150, 155, 160, a receiver 170, a communication module 175, a processing unit 180, and a personal computer or gaming system 190. In other examples, the position tracking system 100 includes additional or alternative features, such as additional emitters.

Figure 2:
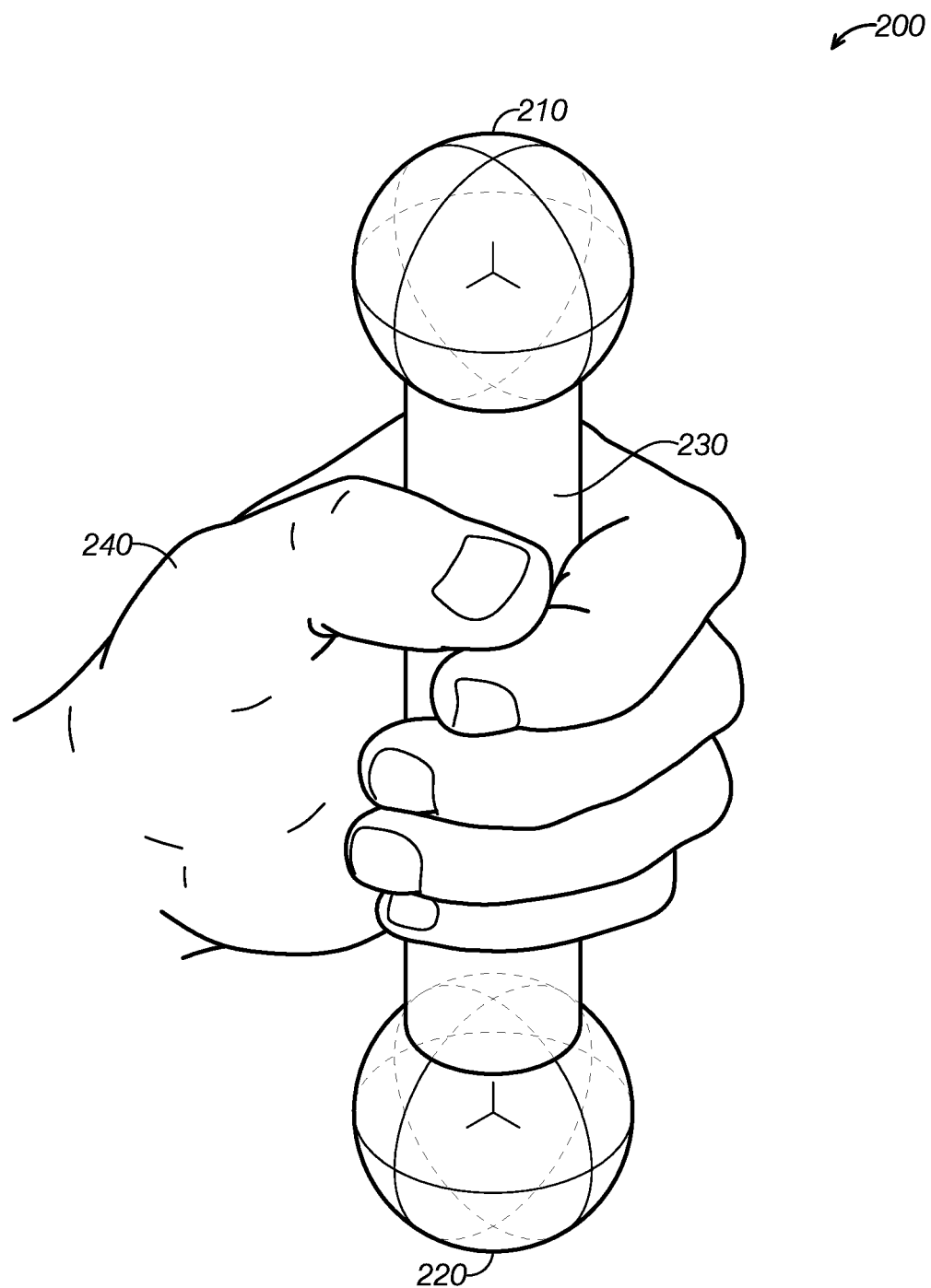
FIG. 2 is a perspective view of the hand-held emitter shown in FIG. 1.

As can be seen in FIG. 1, emitters 115, 120, 125, 130, 135, 140, 145, 150, 155, 160 are positioned on various parts of the body on the user 110. One example of an emitter is shown in FIG. 2. A hand-held emitter unit 200 includes emitters 210, 220, a controller 230, and a user's hand 240.

The goal of the emitters 115, 120, 125, 130, 135, 140, 145, 150, 155, 160 is to radiate equal amount of magnetic to in all directions for the receiver matrix to capture strong enough signal. To have an actual working emitter 115, 120,

125, 130, 135, 140, 145, 150, 155, 160, the geometry arrangement of the emitters has to be considered, power is be tuned according to the distance between the emitters 115, 120, 125, 130, 135, 140, 145, 150, 155, 160 and the receiver 170; thus corresponding a control module is needed. In the following context, the overall 1) design philosophy is discussed and the issues are addressed, 2) emitter geometry, 3) emitter performance and 4) power tuning, 5) emitter design, and 6) control module.

1) Emitter Design Philosophy

Figure 3:
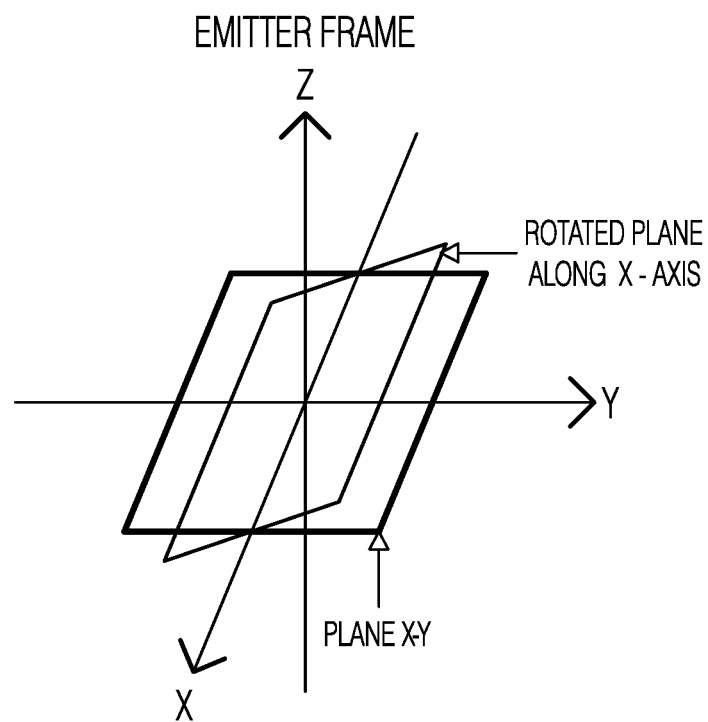
FIG. 3 is a graph showing three-dimensional (3D) space divided into a number of planes along three axes.
Figure 3:
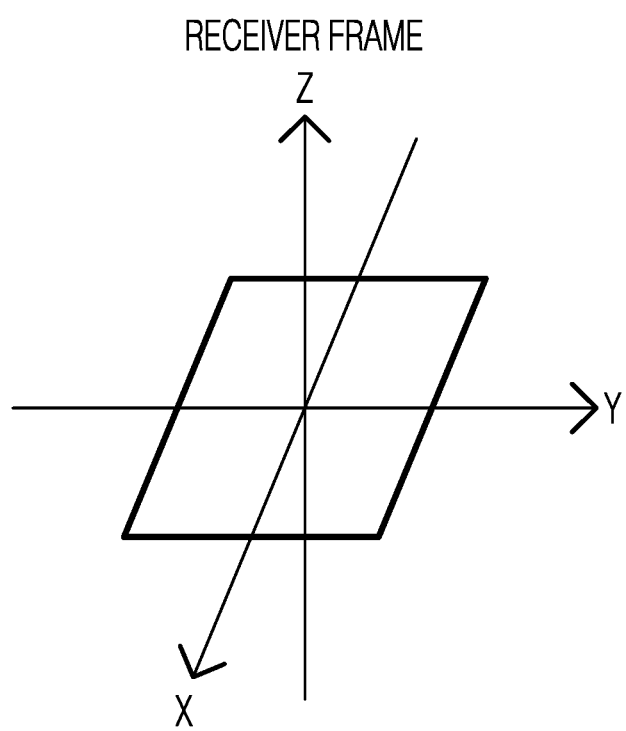

Three-dimensional (3D) space can be is divided into an infinite number of planes along three axes, as shown in FIG. 3. Consider on one of the plains, two current loops form a perfect coupling. In this arrangement, there is a maximum amount of magnetic energy, transferred from emitter loop to receiver loop. Given in this design, the receiver frame is to be fixed at a location, and the emitter is to be worn, if the emitter frame is rotated a little bit (against axes that such plane is on), then it is no longer a perfect coupling; thus the strength of the signal suffers. This drop-in strength cannot be differentiated from the possibility that the emitter simply moves slightly away. However, if another emitter loop, which is identical to the previous one, is to be placed on a plane which is now in perfect alignment to the receiver frame, then another perfect coupling is formed. If the emitters are activated one at a time, and with cooperation of receiver that only cares about the strongest signal in a period of time, then there will always be a perfect coupling. In this regard, apply this principle to all incremental planes along three axes, over an infinite period of time, the emitter emits equal amount of energy in all directions; thus the emitter becomes agnostic towards rotations.

2. Emitter Geometry

Figure 4:
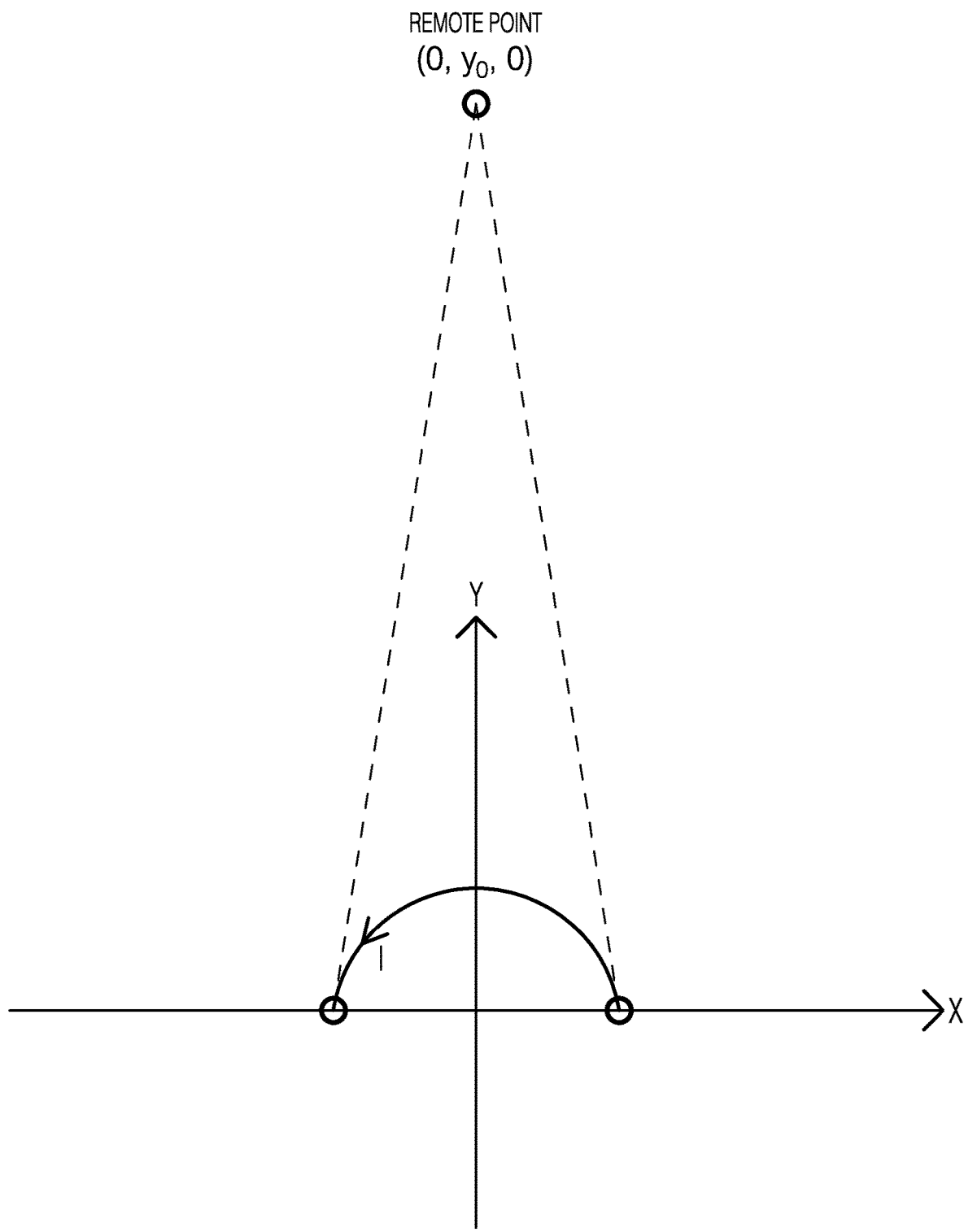
FIG. 4 is a graph showing the remote point sensing the magnetic flux.

To achieve an equal radiation to all directions, an emitter loop is composed of a set of copper wire segment. The segment forms a circular path. From the basic Biot-Savart law, to ensure equal radiation to all directions, a remote point of the same distance and same plane (this would be referred as the remote point) should be exposed to a wire of the same length and geometry. For a full loop, although remote points would experience equal radiation, the bottom half of the loop is destructive to the strength of the signal. Thus, to maximize the B-field strength, the inner rims of the loops are being wrapped with EM absorbers. In this way, only the constructive half of the loop is being used. The term "half" is not a literal half, but whatever is "visible" to the remote point, which may be a little larger than the full half circle. Due to small radius of the emitter, and y-direction vectors does very little to contribute to remote $dl \times \hat{r}$, this difference is less than 0.02% and can be ignored. FIG. 4 shows the remote point sensing the magnetic flux (the flux is into and out of the page based on the direction of the current.

a) Number of Loops Per Set

Figure 5A:
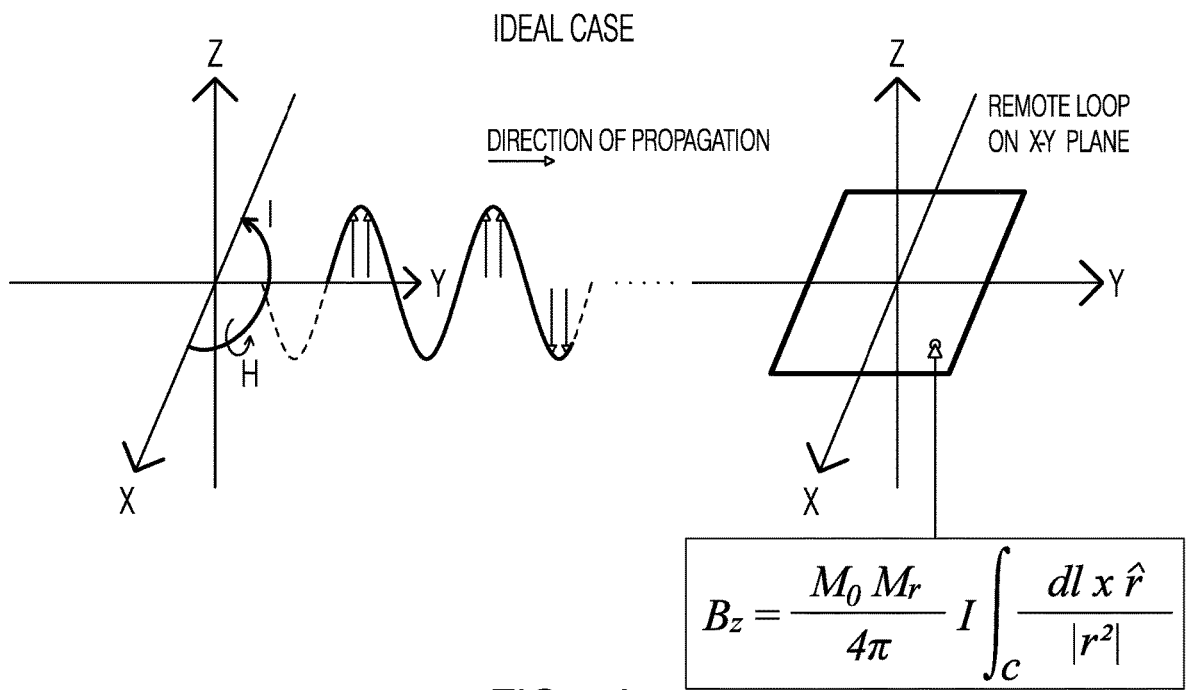
FIG. 5A is a graph showing an ideal case for number of loops per set.
Figure 5B:
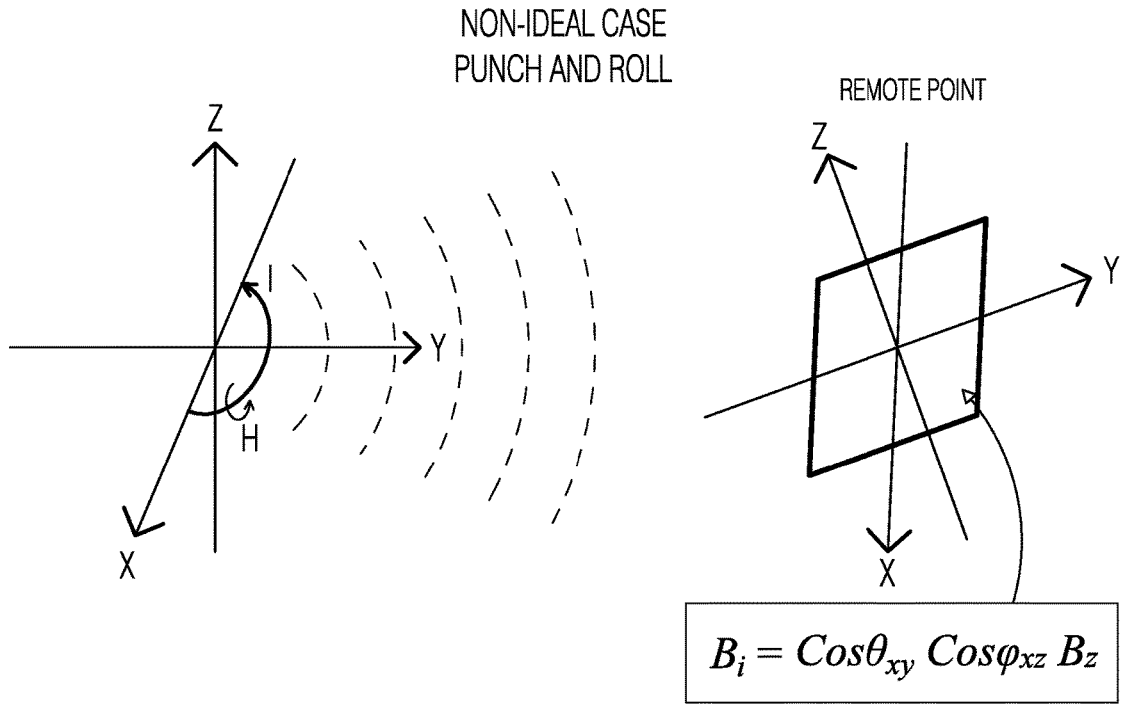
FIG. 5B is a graph showing a non-ideal case for number of loops per set.

A time varying current loop produces EM field, since the remote receiver antenna is a loop as well. Only magnetic component is needed for analysis. Emitter has flux density along the half circle.

$$B_z = \cos\theta_{xy}\cos\varphi_{zx} \frac{\mu_0\mu_r}{4\pi} I \int \frac{dl \times \hat{r}}{|r|^2}$$

Where Bz is the magnetic flux density generated at distance r with receiver lying flat on receiver x-y plane, and emitter wire lying flat on emitter x-y plane; θzy is the angle between the would-be-receiver antenna z-y plane and the emitter loop z-y plane, this is the pinch angle, given the z-axis is the vertical axis; φzx is the angle of between the would-be-receiver antenna z-x plane and the emitter loop z-x plane, this is the roll angle; μ0 is the permeability of free space 4π×10-7 (H/m); μr is the relative permeability modifier for different materials; I is the current running through the wire, assuming uniform current distribution at any point along the wire; $\hat{r}$ is the unit vector between the remote point and the current dl; dl is the wire segment; and r is the distance between the receiver antenna and the emitter wire, at the current dl position. FIG. 5A shows an ideal case and FIG. 5B shows a non-ideal case (punch and roll). To take a conventional 3 dB reduction for cut-off $$\frac{V_{\theta_{xy}}}{V_{max}} = \frac{B_{\theta_{zy}}}{B_{max}} = \frac{\cos\theta_{zy}}{\cos 0} = 0.707$$

amplitude:

$$\theta_i = \frac{\pi}{4} \text{radian} = 45°$$

This is the same for pinch angle θz.

b) Radiation Geometry of Each Emitter Set

To ensure the signal acts like a point source and propagates the EM wave in a spherical pattern, a set of loops has to be used. Increasing the number of loops reduces the distortions of the perceived signal between two receiver matrices. To completely eliminate perceived distortions, each loop must occupy a circumference less than the average resolution of the system. For example: choose the radius of the emitter to be 0.8 cm or 0.008 m and the average resolution is 1.6 mm or 0.0016 m, then: Circumference: C=2πr=0.0502655 m and minimum number of loops per emitter.

$$N = \frac{C}{\text{resolution}} = \frac{0.0502655}{0.0016} = 31.416 \approx 32$$

Figure 6A:
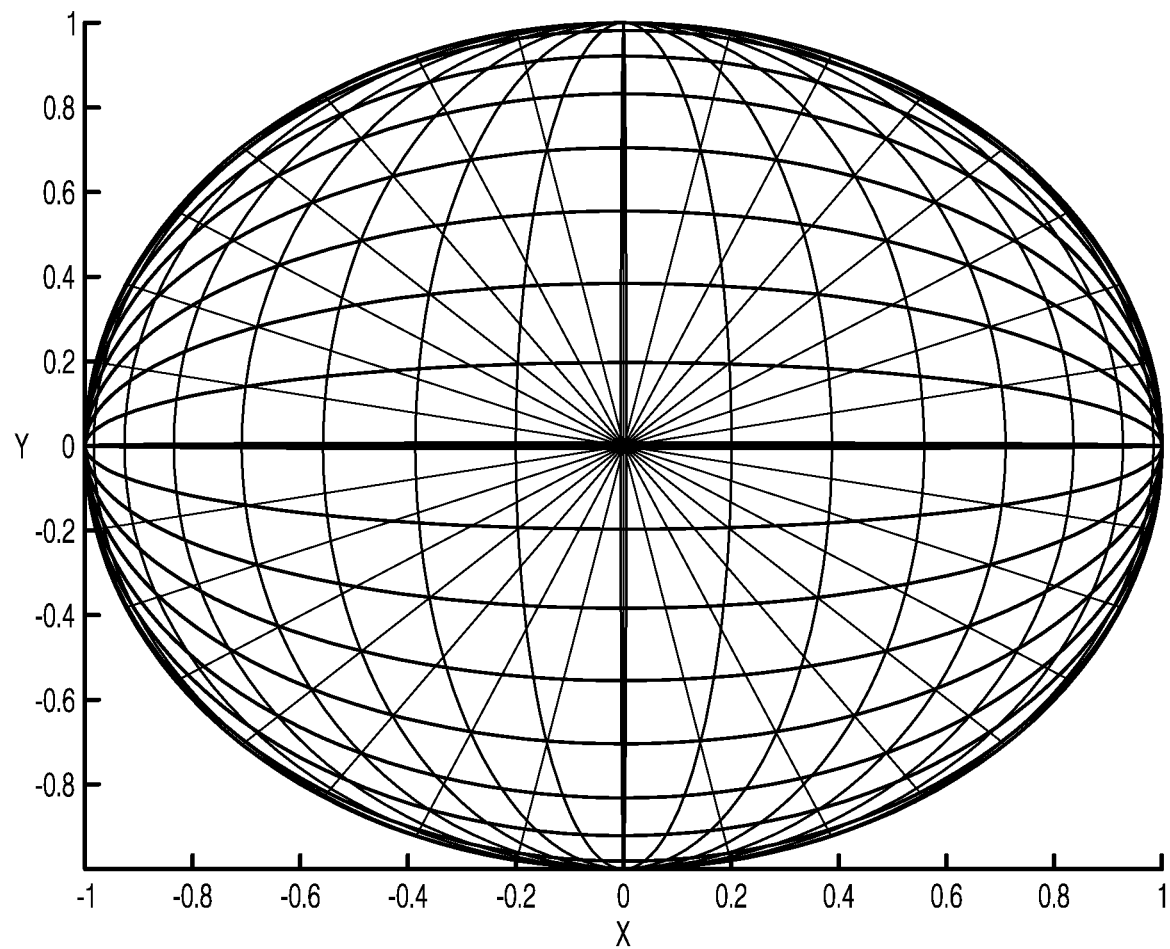
FIG. 6A is a first graph showing emitter loops, from a first angle, arranged in a spherical pattern along three axes to emit approximately equal magnetic waves in all directions.

For simplicity of calculation, and some tolerance choose a number more than minimum, let N=32, as in FIG. 6A. When the emitter x-y plane is perpendicular to the x-y plane of the receiver loop, the resulting magnetic flux density is $$B_i = \cos\left(\frac{\pi}{2}\right)\cos\varphi_{zx} \frac{\mu_0\mu_r}{4\pi} I \int \frac{dl \times \hat{r}}{|r|^2} = 0.$$

Figure 6B:
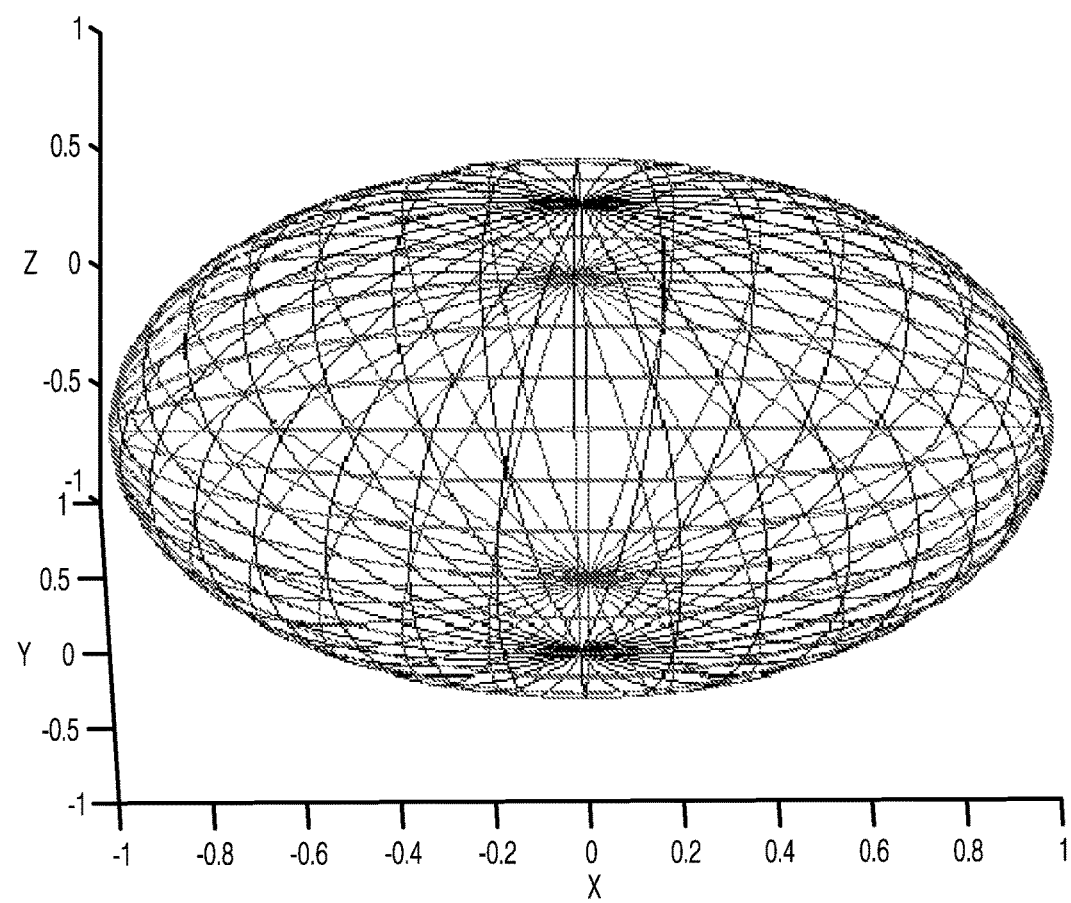
FIG. 6B is a second graph showing emitter loops, from a second angle, arranged in a spherical pattern along three axes to emit approximately equal magnetic waves in all directions.
Figure 6C:
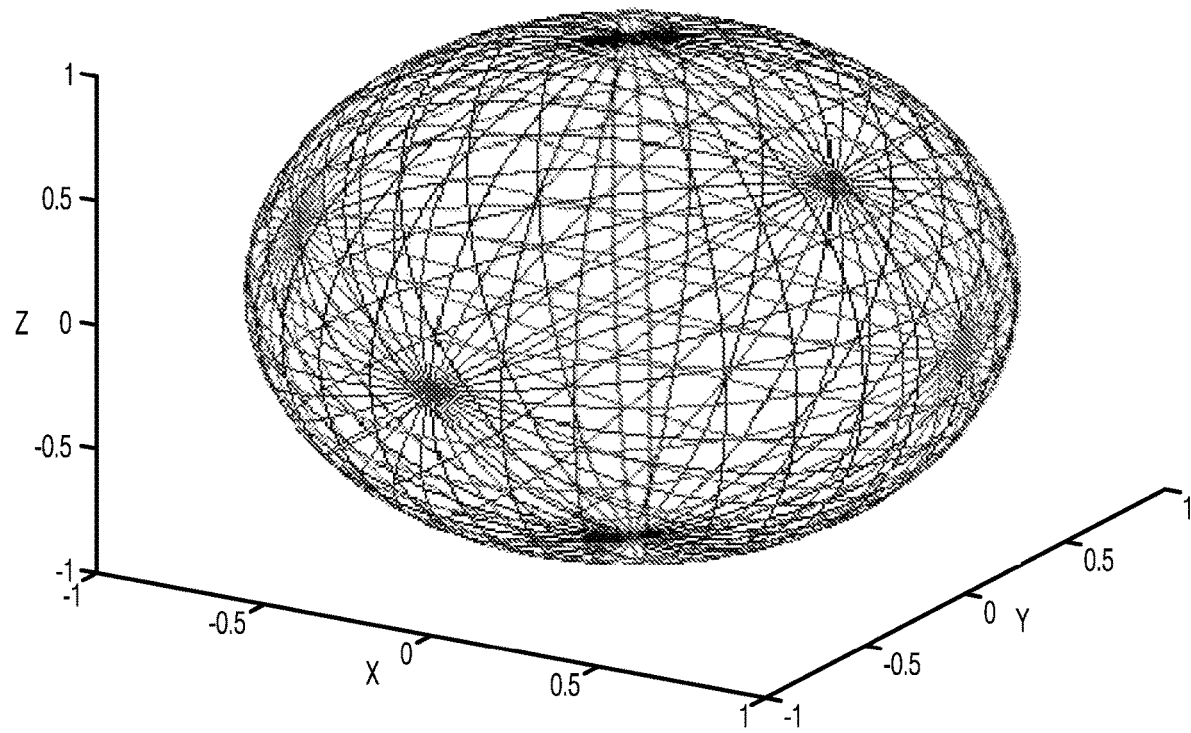
FIG. 6C is a third graph showing emitter loops, from a third angle, arranged in a spherical pattern along three axes to emit approximately equal magnetic waves in all directions.

To prevent this from happening, emitter loops have to be at angle to each other. The most efficient way is to use three sets of emitters and range them at 60° angle with each other (FIGS. 6B and 6C). In this case the worst-case scenario is that the receiver antenna is perpendicular to any of the three emitter sets, and the resulting flux density is $B_{x\theta}$=cos(30°) $B_z$=0.866$B_z$, which is still larger than the 3 dB cut off amplitude. Thus, the total number of loops per emitter is N=32*3=96.

3. Emitter Performance

Emitter loops must not be too big, otherwise they cannot be used to track body movement. From above, a radius of 0.8 cm is chosen. Each emitter 115, 120, 125, 130, 135, 140, 145, 150, 155, 160 should have a diameter of 1.6 cm. Ninety six (96) loops forms an emitter set, and two or four emitters would be used to determine position. This is because there is a rather sizable input connector, battery and other attached circuits. Two sets would ensure that a complete half loop is always exposed to the receiver 170. As the question of why having four, that only applies to tracking head position, as shown in FIG. 1 with emitters 135, 140, 145, 150. With an HMD, or headphone, these accessories may block signal due to its metallic content. Four emitters 135, 140, 145, 150, two in the front and two in the back, would ensure position tracking. Each current loop generates an incident B-field for the receivers:

$$B_z = \cos\theta_{zy}\cos\varphi_{zx}\frac{\mu_0\mu_r}{4\pi}I\int\frac{dl\times\hat{r}}{|r|^2}$$

With $^{1}\varphi_{zx}=7.5°\approx 0.13083$ radian, $\cos\varphi_{zx}\approx 0.9915$ is very close to 1 and thus the above function can be approximated to:

$$B_i = \cos\theta_{zy}\frac{\mu_0\mu_r}{4\pi}I\int\frac{dl\times\hat{r}}{|r|^2}$$

Also, from previous section, knowing that cos θxy is less than the cut-off attenuation, then only emitter Bz component needs to be concerned. In the following analysis, the formula is simplified to original Biot-Savart law:

$$B_z = \frac{\mu_0\mu_r}{4\pi}I\int\frac{dl\times\hat{r}}{|r|^2}$$

When performing discrete analysis, Biot-Savart law can be re-written as:

$$B_z = \frac{\mu_0\mu_r}{4\pi}I\sum_c\frac{\Delta l\times\hat{r}}{|r|^2}$$

This is will be the analysis from now on. Also note that μr is the relative permeability. In fact, this should be "effective relative permeability" μeff. This μeff is geometrically dependent. That means the alignment between ferrite substrate magnetic dipoles and the conducting wire. A perfect alignment would mean μeff=μr. Depending on the size of receiver, the ferrite substrate may not be needed. Also, the number of parallel loops can be increased to enhance the signal.

3. Emitter Performance Tuning

From above calculations, the magnetic flux density is really low when the emitter is 3.2 meters from the receivers. To increase performance, three parameters can be manipulated: a) relative permeability of the substrate, b) total resistance of the wires, and c) the current output.

a) Relative Permeability of the Substrate

Since this is not a communication device, high permeability material with high complex permeability can be chosen to boost the signal. Several high permeability ferrite materials can be used. Conventional type 61 ferrite has permeability of 125; whereas, type 73 ferrite would have permeability around 1400 at 15 MHz. Other, Magnesium-Zinc ferrites have permeability from several hundred to several thousand. Both type 61 ferrite and type 73 ferrite materials can be considered.

b) Total Resistance of the Emitter Wires

An emitter loop can be printed on highly permeable ferrite substrate. By increasing the width of the conducting wire, resistance can be reduced and thus increasing the possible current output through this conducting wire. Two layers of ferrite can sandwich the wire to create more induction. However, only single side printing is utilized in the current design. Wire thickness has to be small due to skin effect. Copper is used for loop antenna so it can be cheap and simple to manufacture. Thinnest skin depth at maximum frequency:

$$\delta = \sqrt{\frac{2\rho}{(2\pi f)(\mu_0\mu_r)}} = \sqrt{\frac{2\times 1.68\times 10^{-8}}{2\times\pi\times 15\times 10^6\times 4\times\pi\times 10^{-7}}} \approx 0.16843\times 10^{-4} \approx 17\ \mu m$$

Since the skin depth is 17 μm, choose wire width to be w=0.6 mm. By choosing wire thickness smaller than 2 times skin depths, the power characteristics become simpler. Since the loose resistance would be just the resistance of the wire, instead of the skin depth resistance. Thus, choose wire thickness to be h=30 μm. The resistance of the half loop is:

$l$: Average length of the wire loop, $l = (8\ mm - 0.2\ mm)\times\pi = 0.02450\ m$ $A$: Cross-section of the wire, $A = 0.5\ mm\times 30\ \mu m = 1.5\times 10^{-8}\ m^2$ $R$: Resistance of the wire, $R = \rho\frac{l}{A} = 1.68\times 10^{-8}\frac{0.0245\ m}{1.5\times 10^{-9}\ m^2} = 0.02744\Omega$ c) Current Output The higher the current output the more heat it would generate. Heat is the major concern here. High current also causes saturation of the magnetic substrate. Since our emitter is operating at sub-micro tesla level and most ferrite magnets' saturation flux densities are 0.2-0.5 Tesla, saturation is not a problem. Power output on the wire is mostly lost due to wire resistance. As the wire thickness and width are smaller than the skin depth with applied signal. Resistance is governed by total length of the wire and the cross section. As from the previous section:

$P=I^2R=(3A)^2\cdot 0.02744\Omega\approx 0.2470\ W$

The voltage across the parallel loops is:

$V_{rms}=I_{rms}R=3A\cdot 0.02744\Omega\approx 0.08232V$

The current is set at an arbitrary 3 amps. Current running through the wire cannot be too much; otherwise it will burn the copper. With these parameters, all loops must not operate at the same time, but through a time-divisible manner. Optimizations are being evaluated in the context below.

5. Emitter Loop Design

The making of these loops has to uphold the philosophy of simple, cheap and mass-producible. In this section, initial parameters on the physical size and composition of each loop are provided (a). Then intersections between crossed loops are taken into consideration (b). Finally, signal has to be feed into the copper wires; thus (c) the feasibility of one connection technique is evaluated.

a) Physical Size and Composition

Figure 7A:
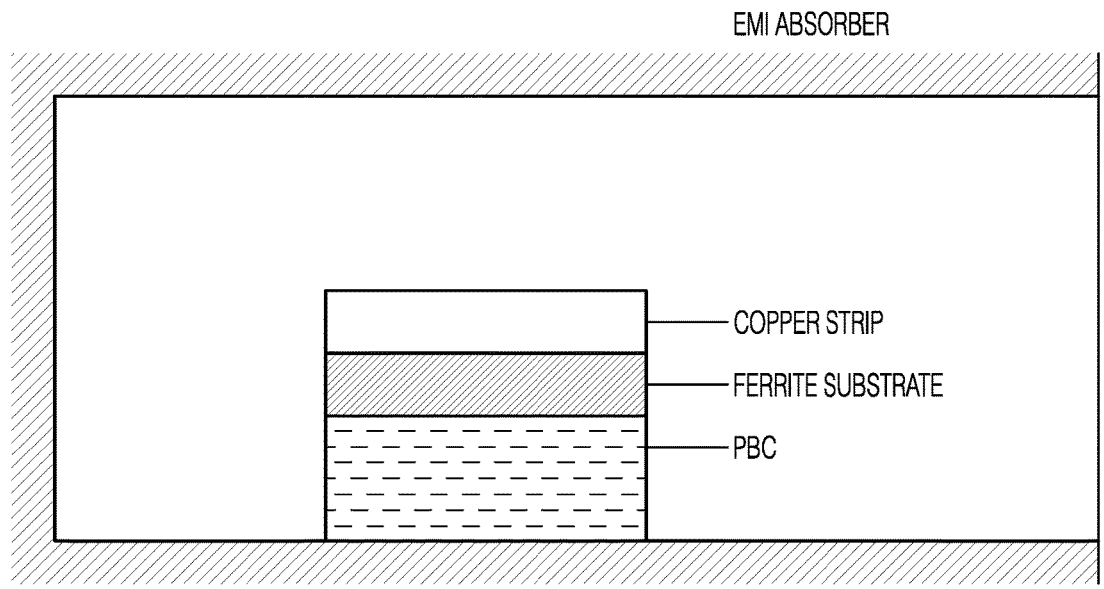
FIG. 7A is a cross section of an emitter loop composition.

Each loop is composed of three layers, copper strip, ferrite substrate and dielectric substrate. These components are then being placed into EMI absorber shell, with only one side opening toward the radio out vector. See FIG. 7A. The copper strip has dimension as mentioned above w=0.4 mm and t=30 μm. The thickness of the ferrite substrate should be no less than $\frac{1}{10}$th the strip width tferrite=40 μm. The thickness of the dielectric substrate can be as thin as possible, however, since the thinnest PCB substrate is 80 μm thick. PCB thickness should then be 80 μm. The total thickness of the unit is 30+40+80=150 μm.

With total 32 loops per rotation, each loop occupies an opening equivalent to $$2\pi/32=11.25°$$

This means an opening width of $$R* \sin(11.25°/2)*2=8 \text{ mm}*0.09802*2=1.5683 \text{ mm}.$$

However, the actual thickness of the loop is only 70 μm (the substrate thickness does not count in electrical geometry calculations).

Figure 7B:
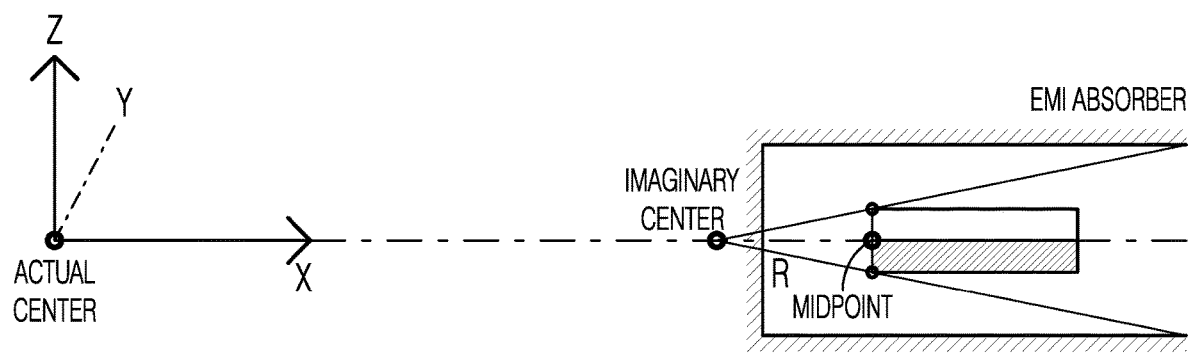
FIG. 7B illustrates calculating the opening size of a loop.

To calculate the actual opening, let actual center of the sphere be the origin, the mid-point of the loop sit on the x-axis. Set an imaginary center to be somewhere in between the mid-point and the origin. To keep both an equivalent 11.25° opening, and geometric symmetry, the opening should be at least unit thickness+one additional PCB width—giving a total of 230 μm. From this we can construct similar triangles with imaginary center and loop unit midpoint and imaginary center and actual opening, as shown in FIG. 7B.

Adjacent $$B' = \frac{35 \text{ μm}}{\tan(11.25°/2)} = 0.3554 \text{ mm}$$

With similar triangle theorem, B'/B"=70/230. The distance between the imaginary center and the midpoint of the actual opening is B"=1.1677 mm. The distance between the actual center and the midpoint of the opening is: R+(B"−width antenna−B')=8 mm+(1.16774−0.4−0.3554)=8 mm+0.4123 mm=8.41234 mm. The adjusted physical outer radius of the emitter is: Rphysical=8.4123 mm. To put things in perspective, the emitters 115, 120, 125, 130, 135, 140, 145, 150, 155, 160 have a dimension that is smaller than a Ping-Pong ball. Reducing the wire density will not significantly reduce accuracy, but increasing it will start reducing accuracy because of number of wires eventually occupy a large amount of area. It is possible to determine the orientation by running a different frequency in each wire. However, the frequency bandwidth is crumbled, and the orientation accuracy is limited by number of wires. This algorithm is one example; additional models and algorithms may be used.

b) Emitter Loops with Cross Intersections

Figure 8:
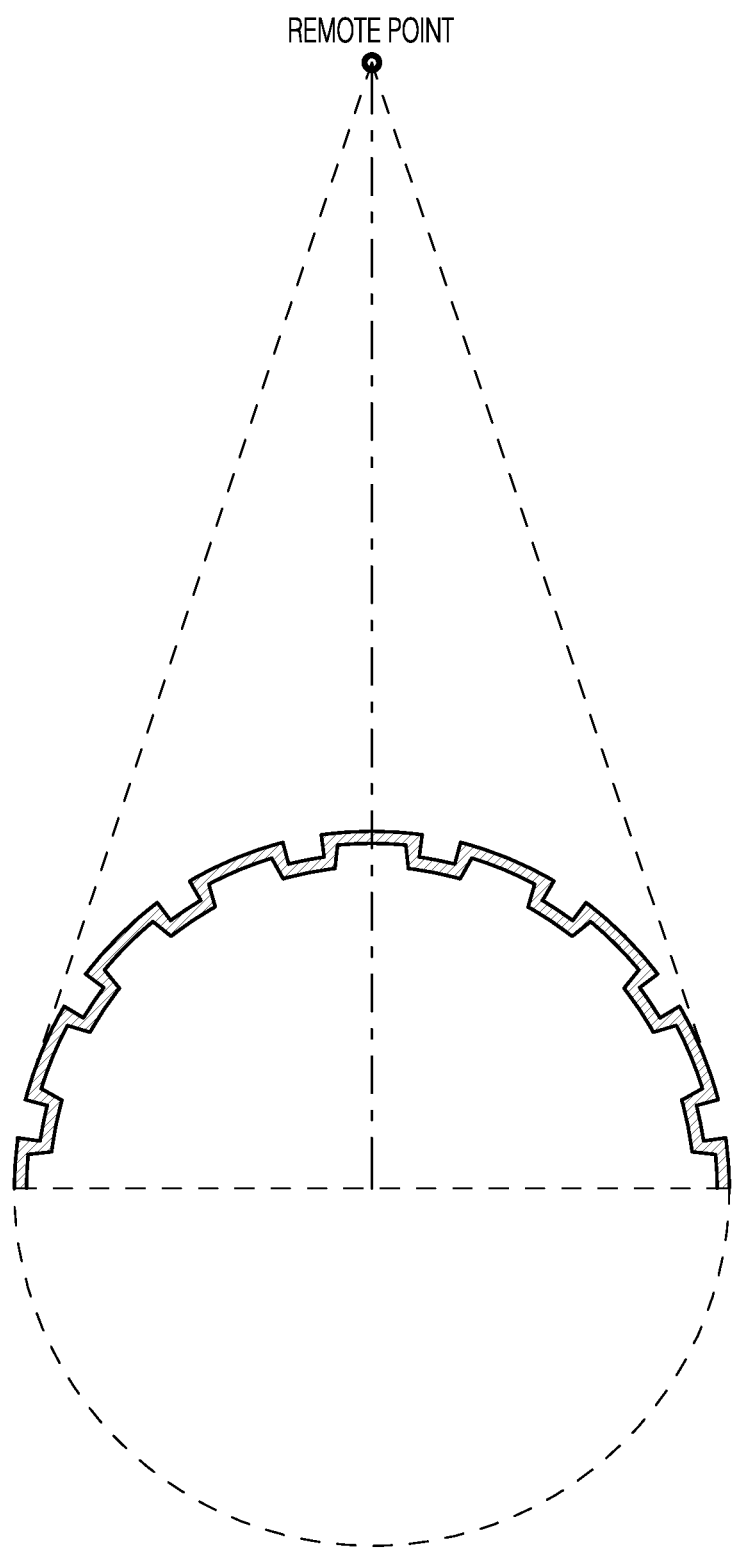
FIG. 8 illustrates intersections between crossing wires.

To reduce distortions on the remote receiver point. Intersections between crossing wires should be kept as small as possible, and number of intersections should be kept as little as possible. To achieve this, the intersections are being caved in to allow cross wires. See FIG. 8, which is not to scale.

c) Signal Connections

Figure 9:
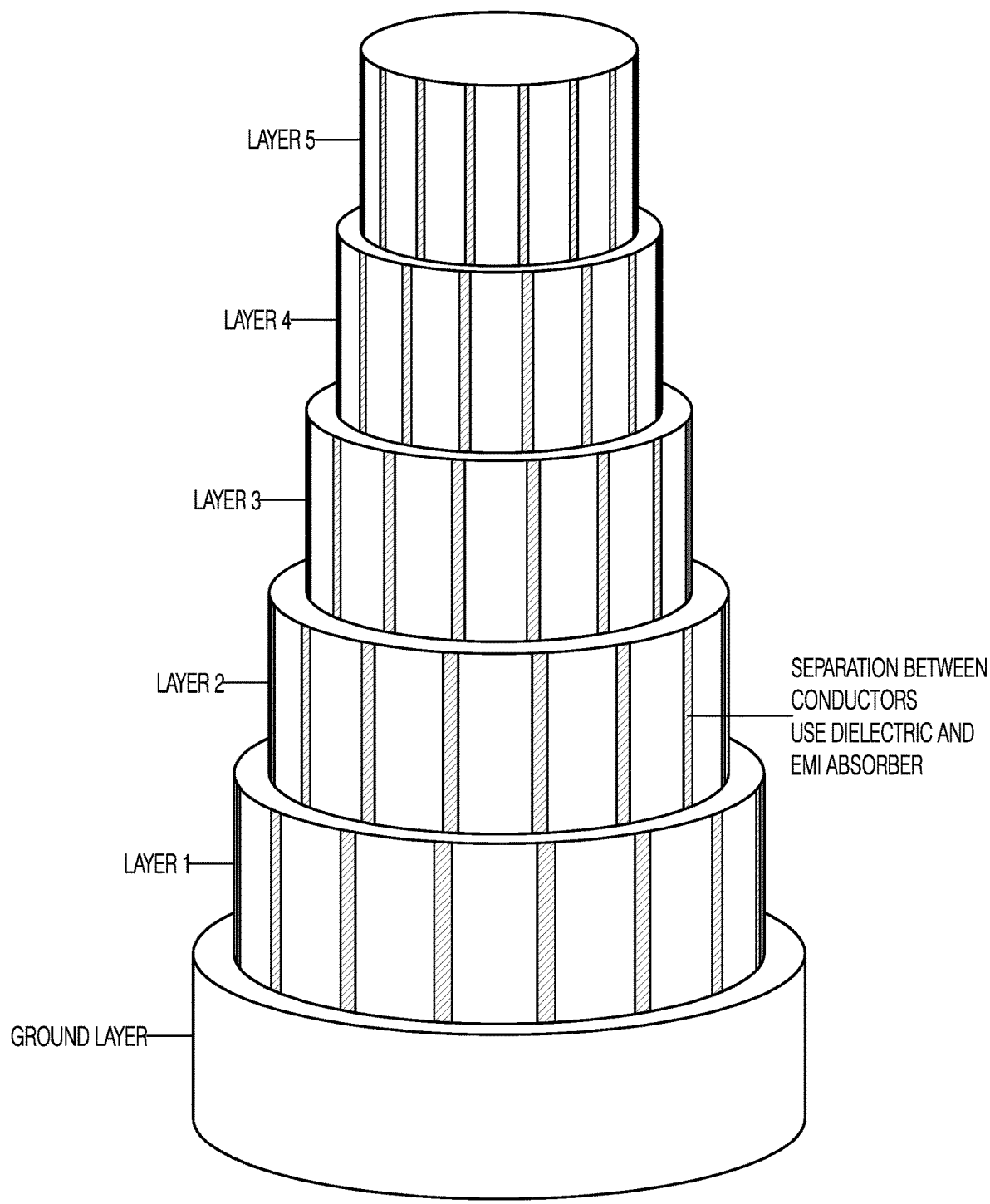
FIG. 9 illustrates the layers of signal connectors.

As mentioned above, there are totally 96 wires crossing each other. Two half circles should be activated together to ensure a close to uniform B-field at remote point. Thus, there are 48 signal lines and one ground line to be connected to each emitter set. Since the thickness of the wire is 30 μm. The thickness of the feeder lines should be no more than this. But the width of the feeder line should be at least twice as much as the loop width. In the design, simple choose 0.9 mm to be the width of the feeder lines. These feeder lines are being wrapped by EM absorbers to eliminate interference between the lines. The total thickness is 65 μm and the total width should be 0.950 mm (absorber+dielectric). The design of the connection is similar to that of an audio jack. A connector has multiple layers; the outer-most layer is the ground layer. With each reduction in radius, an inner layer is exposed. With each layer composed of several signal lines, as shown in FIG. 9.

With the outer layer 1.6 mm in diameter, then there should be a total of 20 layers and 51 maximum signal connections (Table 1). Since the diameter of the emitter is 1.6 cm, each layer can have a length of $$\frac{1.6 \text{ cm(outer diameter)} - 0.8 \text{ mm(full ring circle width)}}{51} = 0.2980 \text{ mm}$$

which is more than enough to make can adequate connection.

TABLE 1

| | | | |
|---|---|---|---|
| 1.6 | 5.02656 | 5.291115789 | 0 |
| 1.535 | 4.822356 | 5.076154211 | 5 |
| 1.47 | 4.618152 | 4.861212632 | 4 |
| 1.405 | 4.413948 | 4.646261053 | 4 |
| 1.34 | 4.209744 | 4.431309474 | 4 |
| 1.275 | 4.00554 | 4.216357895 | 4 |
| 1.21 | 3.801336 | 4.001406316 | 4 |
| 1.145 | 3.597132 | 3.786454737 | 3 |
| 1.08 | 3.392928 | 3.571503158 | 3 |
| 1.015 | 3.188724 | 3.356551579 | 3 |
| 0.95 | 2.98452 | 3.1416 | |
| 0.885 | 2.780316 | 2.926648421 | 2 |
| 0.82 | 2.576112 | 2.711696842 | 2 |
| 0.755 | 2.371908 | 2.496745263 | 2 |
| 0.69 | 2.167704 | 2.281793684 | 2 |
| 0.625 | 1.9635 | 2.066842105 | 2 |
| 0.56 | 1.759296 | 1.851890526 | 1 |
| 0.495 | 1.555092 | 1.636938947 | 1 |
| 0.43 | 1.350888 | 1.421987368 | 1 |
| 0.365 | 1.146684 | 1.207035789 | 1 |
| 0.3 | 0.94248 | 0.992084211 | 0 |
| SUM | | | 51 |

6) Emitter Control Module

As seen from above, there are a total of ninety six (96) loops crossing each other. There is no need to activate all current loops at the same time. The current loops cannot be activated all at the same time due to power constraints. These loops are operated in a time divisible manner. Also, the radiated B-field strength declines with respect to cubic distance from the signal (r3). When an emitter is close to the receiver matrices, the signal strength is much higher than when an emitter is far away. Signal strength can be tuned according to the approximate distance between the emitter and the receiver. To achieve these, the following components are needed, a) 2.45 GHz transceiver module, a) microcontroller with high clock and IO speed, c) encoding grid module and d) Digital to analog converter and e) Oscillator module. The primary motivation of trying to control the strength of the signal is not about power consumption, but to simplify receiver logic. This will be discussed when the receiver 170 is explained in more detail below.

a) 2.45 GHz Transceiver Module

The reason for using 2.45 GHz module is that so many encoding standards can be found in this frequency range. Bluetooth module is good enough for this design. The frequency is high enough that it does not interfere with less than 13.56 MHz operating frequency of the emitter. This module is needed anyway, since other buttons and sensors integrated with the emitter may share this module. 2.45 GHz transceiver module provides two parameters, the target emitter, emitting mode, and signal strength. All of which can be encoded in to a 24-bit packet (3 8-bit channels). The 24-bit packet has 6-bit sensor address, 2-bit control mode and 16-bit voltage information.

Bit 0 to 15: contains the voltage information. This voltage information is used to regulate oscillator supply voltage to make sure the sinusoid wave generated for the loop is between the positive and negative of this value. For example: 0x0000 means that the supply voltage is 0 and thus generates no sinusoid. 0xFFFF would mean the maximum amount of current is output to the copper wire.

Bit 16 to 17: contains the operation mode information for a particular sensor. There are 3 modes: 00=force stop, 01=force restart, 10=change output. Binary 11 is not used or can indicate the data is not for the emitter but for other purposes. Force stop signal forces that loop to stop transmitting any signal until the next cycle. Force start signal, forces the loop to transmit signal again regardless of the cycle. Increase output signal, asks the emitter loops to increase output by a certain amount (note: calculate the amount information). Since when emitter is moving away from the receiver matrix, some loops may lose contact with receiver due to lack of signal strength. This is compensated by receiving an increase output signal control mode so that the voltage information received is increased automatically.

Bit 18 to 23: contains the sensor address information. Each emitter set is given a unique identifier upon start. Each person may get a standard of 14 emitter sets or a maximum of 20 emitters. A theoretical 64 emitters is supported, that means three people can operate with one receiver set. Thus, only 20 bits are needed in total. In another embodiment, a minimum of 8 bits is enough for the microcontroller module, which may contain one 8 bit Digital to Analog (D/A) converter module.

b) Microcontroller Module

Microcontroller module processes the incoming Bluetooth signals and synchronizes the signal output to the antenna. This microcontroller only needs to be 8-bit. Each set of four emitters may only need one controller to operate properly (should be no more than 50 cents each TI MSP430 is 25 cents each and may be good enough). Microcontroller unit can be anything with an I/O clock speed at approximately 13.56 MHz8/=1.6950 MHz. This is to ensure the optimal emitter performance. In another embodiment, a microcontroller is not needed, as there is not a need for any processing power more than a simple linear addition, and only a counter, an adder, a clock and a parallel I/O interface are used.

c) Bus Module

Figure 10:
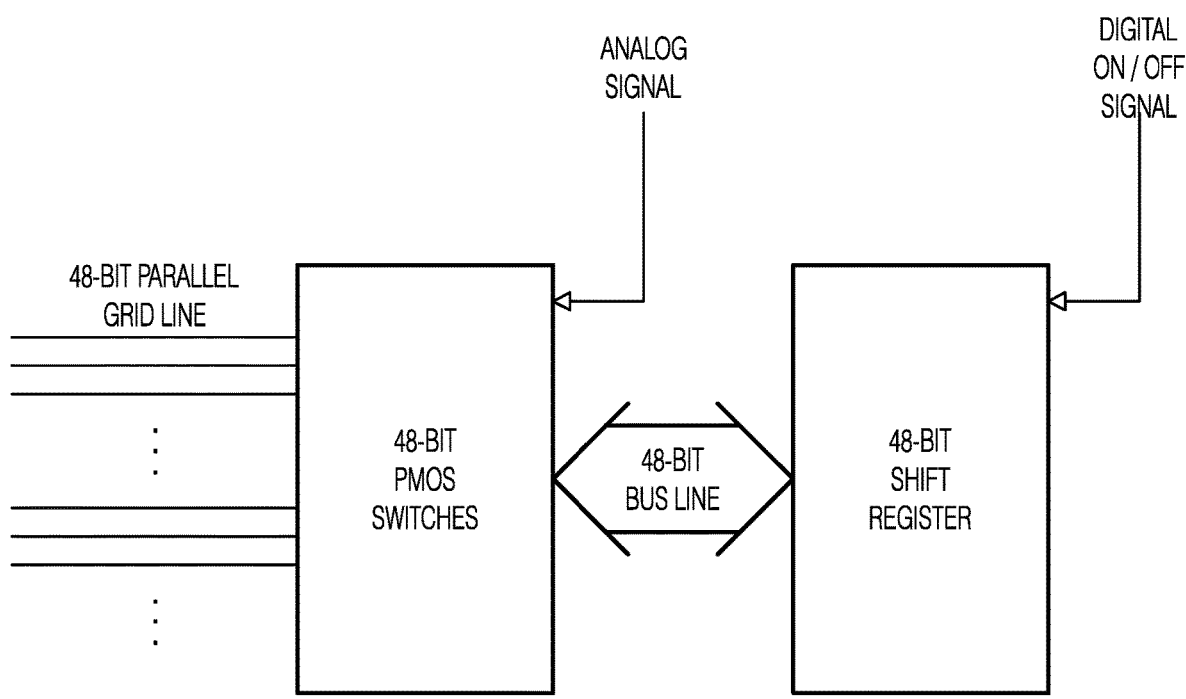
FIG. 10 is a circuit diagram of a bus module.

Since there are total of 96 loops per emitter set, these loops are operated in a time divisible manor. Ideally, each loop only needs to be activated with a time of 1 or 2 periods. That means for a 13.56 MHz lower bond, each antenna only needs to be on for $1.4749 \times 10^{-7}$ second for the receiver to determine the frequency. However, to be safe, take 8×period=$5.8997 \times 10^{-7}$ s. Since a symmetrical signal is desired, full circles—sets two opposing loops—have to be activated at the same time. That means a keyboard-like 48-bit bus. One end of a bus line is attached to the drain of a PMOS transistor. The source end connects to the high current output signal oscillators operating at a specific frequency within the 13.56 MHz to 13.96 MHz range. The gates of these PMOS transistors are connected to 48-bit shift register. This shift register controls the activation of each PMOS transistor; and thus controls the activation of each grid line to feed signal to emitter loops. The width of the grid should be twice as wide as the patch wire line width, whereas the thickness should be the same 20 µm. See FIG. 10. In another embodiment, a BJT transistor may be used instead, however the emitter to collector capacitance would be different from source to drain capacitance.

d) Digital to Analog Converter Module

Figure 11:
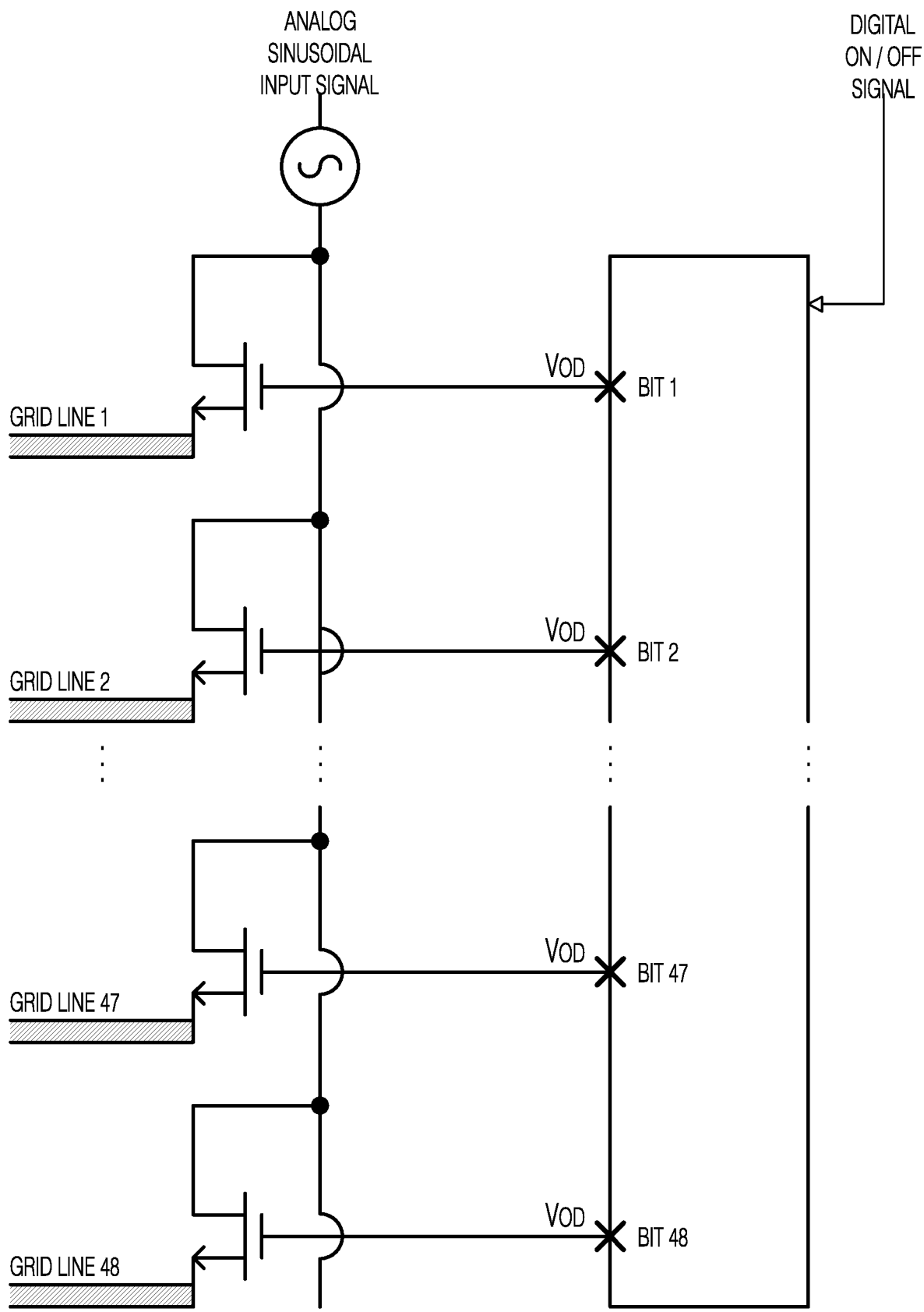
FIG. 11 is a circuit diagram of a digital control of an analog input signal.

Each emitter has a digital to analog converter module. Each D/A module connect to a signal source operating at unique. This D/A converter needs to provide reference max and min voltage for the signal source. The maximum of the digital input translates to the equivalent 0.1544V output to the loop. See FIG. 11.

e) Oscillator Module

Figure 12:
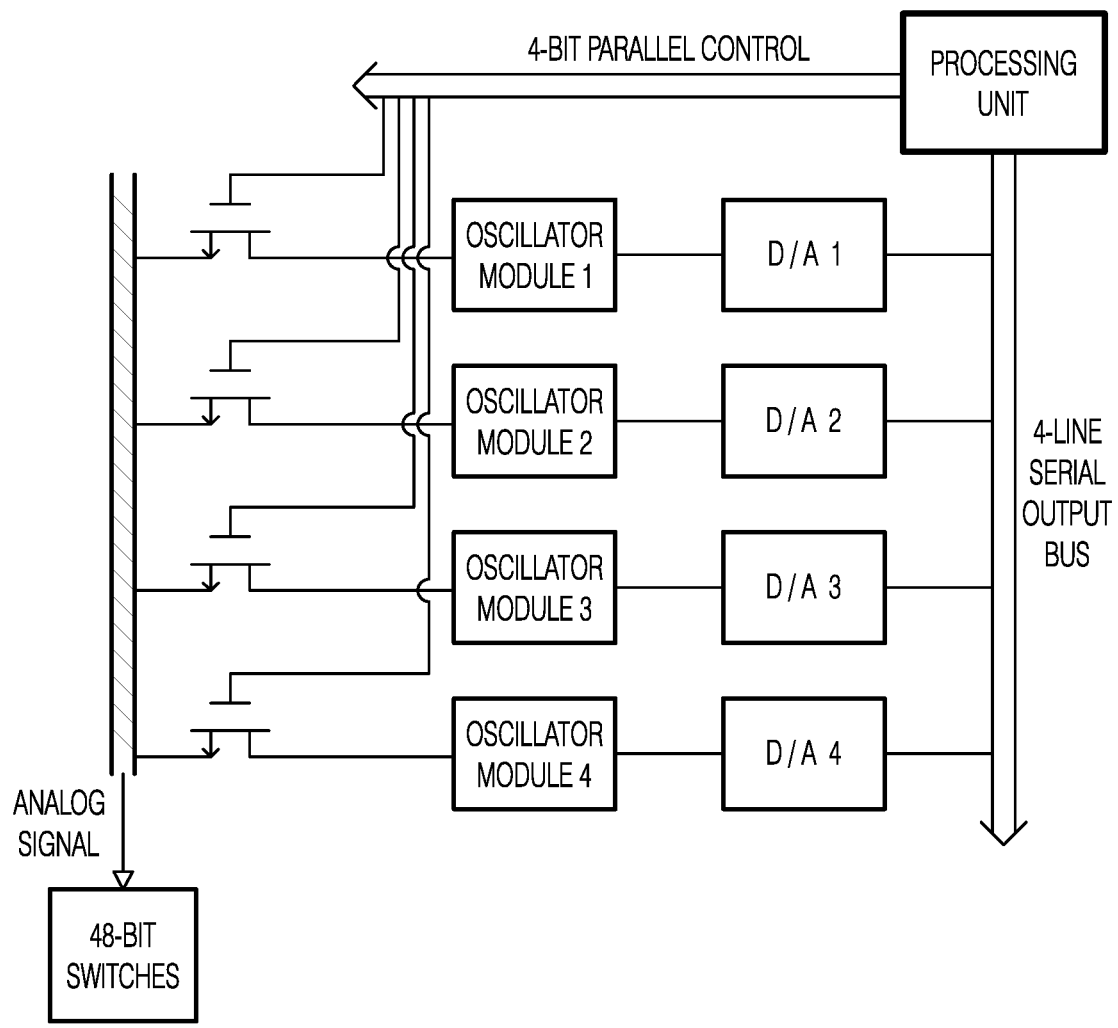
FIG. 12 is a circuit diagram of an oscillator module.

The oscillator module drives the signal and delivers current to emitter loops. The oscillator module delivers up to 3 A of current to the wire and 6 A of current to the grid. Since the grid and the wires are essentially resistive and are placed in series. The electrical characteristics are simple to model. Oscillator module can be constantly running. Each output is connected to a PMOS control switch, which acts like a kill switch. The drains of all 4 switches are connected to a common rail. This rail is then feed into grid module in section c). Oscillator module takes reference voltage from D/A module, which controls the voltage output and thus total current delivered. Each oscillator has one digital-to-analog converter associated. The operating frequency of each oscillator is unique. See FIG. 12.

7) Emitter Conclusion

Figure 13:
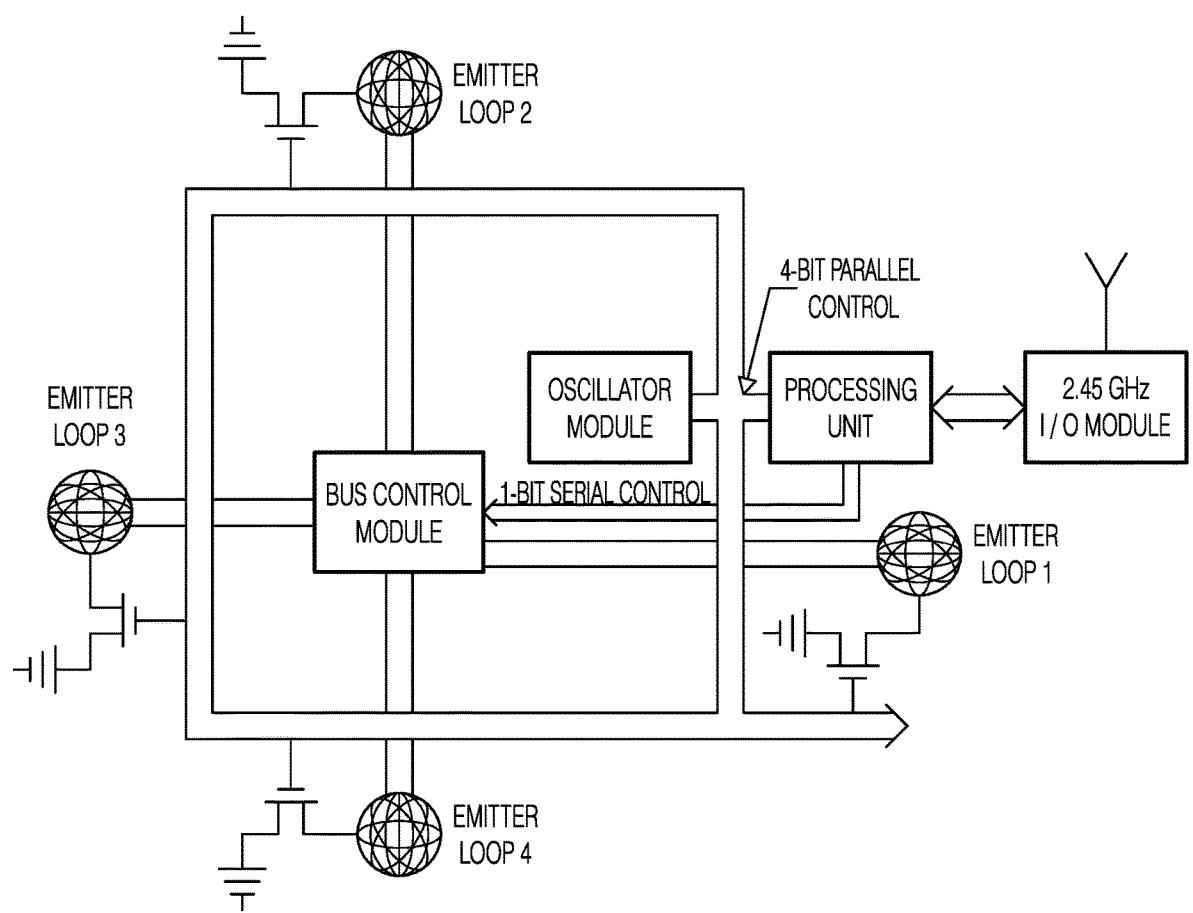
FIG. 13 is a circuit diagram integrating FIGS. 10, 11, and 12.

The integrated design of the foregoing discussion in shown in FIG. 13. From the above parameters: The current output I=3A; if not using ferrite substrate, then µr=1; and the distance is between 1.2 meters and 3.2 meters.

$$B_z = \frac{\mu_o \mu_r}{4\pi} I \sum_c \frac{\Delta l \times \hat{r}}{|r|^2} = 3 \frac{4\pi \times 10^{-7}}{4\pi} \sum_c \frac{\Delta l \times \hat{r}}{|2.2|^2} = -9.9458 \times 10^{-10} \text{ Tesla.}$$

Figure 14:
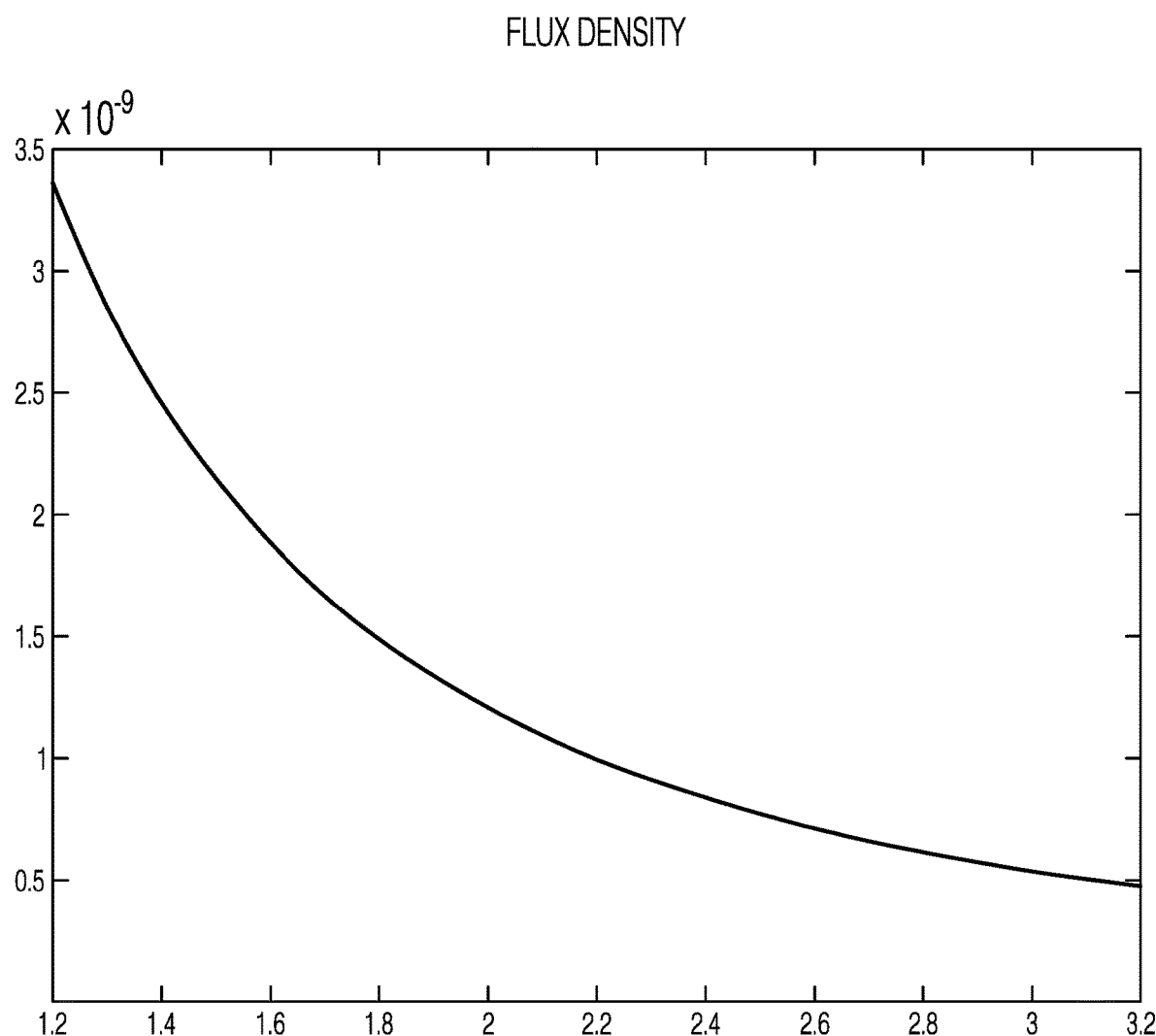
FIG. 14 is a graph showing the magnetic flux density.

The magnetic flux density of the proposed range of operation is between $-3.3509 \times 10^{-9}$ T and $-4.6967 \times 10^{-10}$ T, as shown in FIG. 14. Also with above parameters, the power consumption is really low. Digital and 2.45 GHz communication module components do not take that much power. Since the power grid line may be long and may consume some power, let that be consuming 2 times as much power as the loop itself.

$$\text{Thus, energy consumed is: } (P_{grid} + P_{antenna}) * \frac{1}{F_{Time-Division}} * 48$$

$$\text{antennas} * 4 \text{ emitters} * \frac{1000 \text{ times}}{\text{sec}} = 0.0723 \ J/\text{sec} = 0.0723 \text{ W}$$

Even counting the digital components and 2.45 GHz module, the power consumption should be approximately 0.1 W. A small AAA battery is able to power an emitter set for 15 hours. Even with the added load of IMU orientation sensor and other microcontroller modules, (MPU6050 consumes about 6.1 mW and TI MSP430 consumes about 2 mW) power consumption is still fairly low. In this range, the flux density in the near range 1.2 m is 7.1346 times stronger than that of the far range 3.2 m.

Figure 15A:
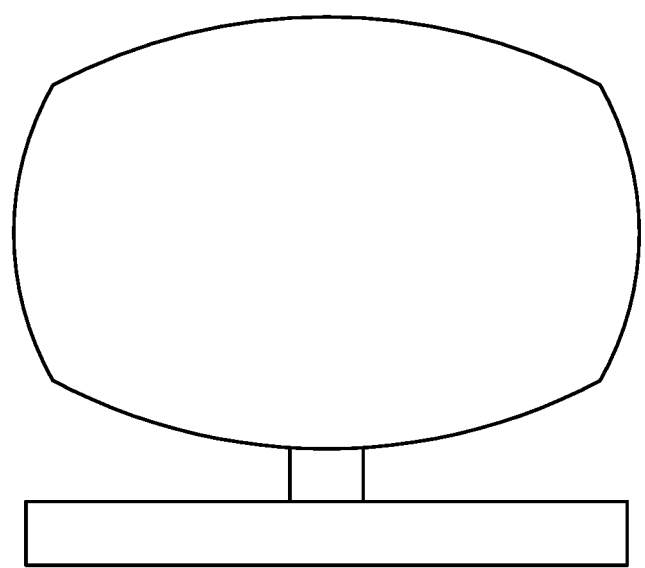
FIG. 15A is a front view of the receiver shown in FIG. 1.
Figure 15B:
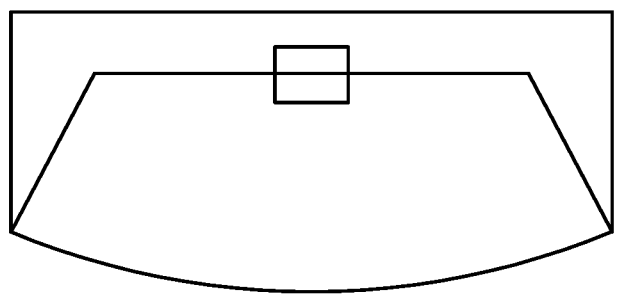
FIG. 15B is a top view of the receiver shown in FIG. 1.
Figure 15C:
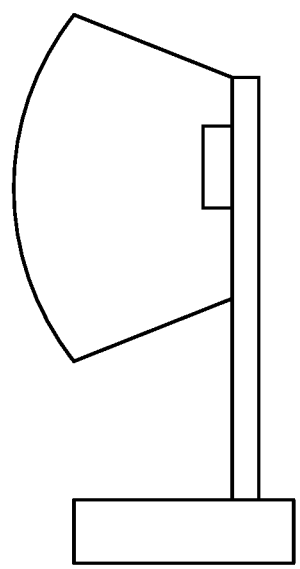
FIG. 15C is a side view of the receiver shown in FIG. 1.

Returning to FIG. 1, receiver 170 contains a communication module 175 and a processing unit 180. FIG. 15A shows a front view of the receiver 170, while FIG. 15B shows a top view of the receiver 170 and FIG. 15C shows a side view of the receiver 170. The goal of the receiver is to receive the EM wave propagated from the emitters. Receiver matrix features small loop antennas, placed over a convex spherical surface. Each loop is attached to a mixed signal integrated circuit contained in the processing unit 180 for processing signals. In the following context, first the design philosophy is discussed and then the designs for the components are provided. These include antenna size, antenna physics, antenna geometry, overall dimensions.

1) Receiver Design Philosophy

As indicated above, emitters 115, 120, 125, 130, 135, 140, 145, 150, 155, 160 are rotational agnostic. Receiver 170 has to be able to determine horizontal and vertical movement and at the same time, handle the change in depth. The depth, or the distance of the emitters 115, 120, 125, 130, 135, 140, 145, 150, 155, 160 from the receiver 170 can be directly computed by the strength of the signal. Although the actual design is a bit more complex than that, but the philosophy remains the same. In this section, the more interesting problem to solve would be the horizontal and vertical movement of the emitters 115, 120, 125, 130, 135, 140, 145, 150, 155, 160.

Horizontal Movement

Figure 16:
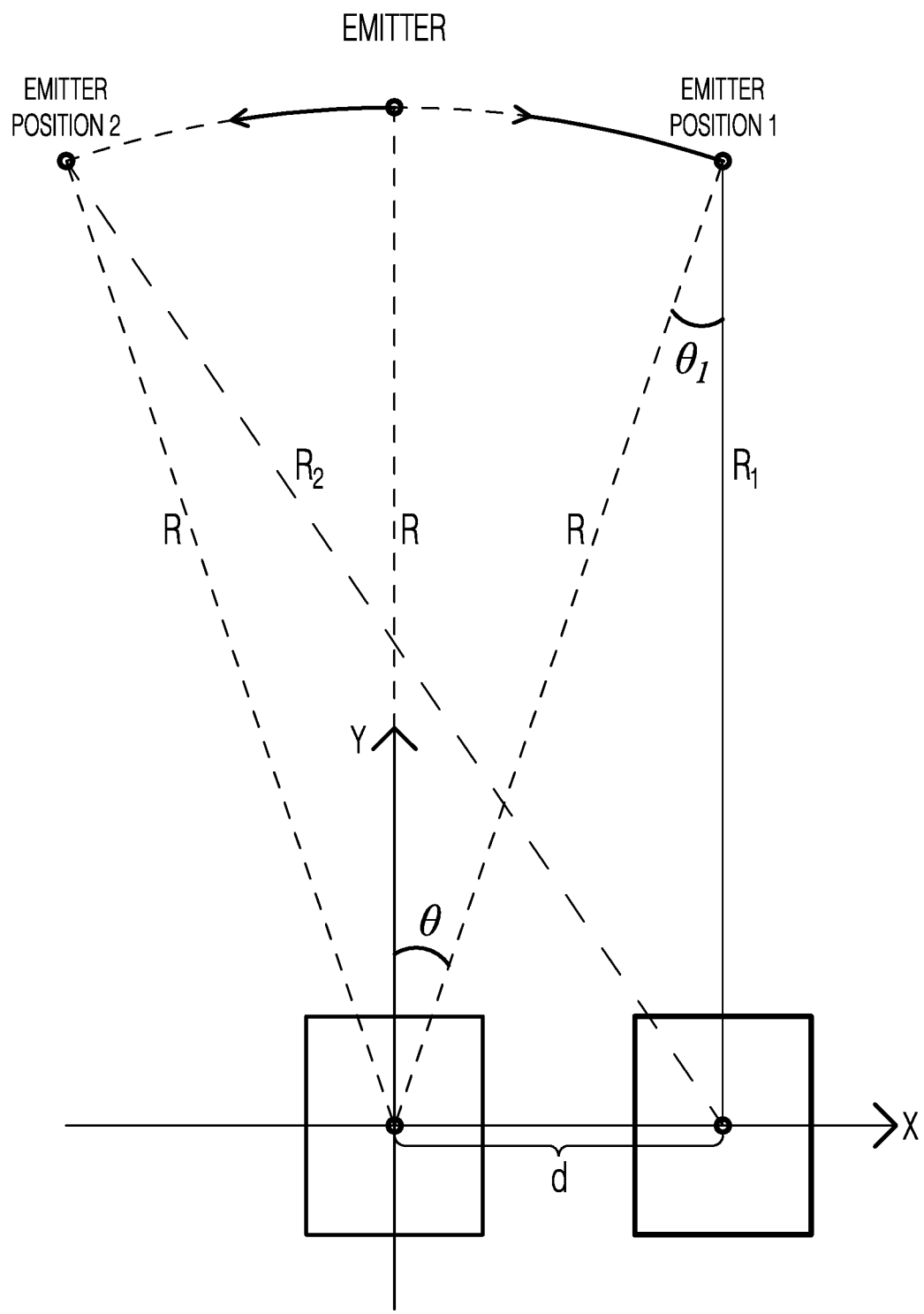
FIG. 16 illustrates an emitter position calculation.

Consider a pair of perfectly coupled emitters, such as emitter 115, and receiver 170. The emitter 115 is as shown in FIGS. 1 and 2. The receiver 170 is a closed loop of any geometry. But for simplicity and practicality, a rectangle is chosen as shown in FIG. 16. The rectangular receiver 170 sits in the origin of the frame, and the emitter 155 orbits the receiver 170 horizontally in a perfect circular path. As Maxwell-Faraday's law indicates, in this situation, the EMF or the open circuit voltage, is the same at all emitter positions $$\varepsilon = -\frac{d}{dt}\int\int B \cdot dA.$$

B field is generated by a constant frequency sinusoidal wave, geometry exposed to receiver is the same, and distance is the same for all positions. A is the area of the rectangle, which is also a constant. To solve this problem, one can place another loop receive (Receiver Loop B) on the same plane, with some distance apart from the one sitting at origin (Receiver Loop A). When emitter is doing that circular movement about receiver A, then it is going either farther away or closer to receiver B. In theory we can calculate the position of the emitter based on the difference between the two receivers, as shown in FIG. 16. However, in practice this difference in field strength has to be significantly greater, than all the noise that the system generates, it has to be greater than the output jitter of emitter, and thermal noise of the receiver combined. For example, let another loop to be placed on x-axis 2 centimeters from loop A, let the remote emitter to be at 3.2 meters, and orbit the origin 2 cm (0.02 m).

Depending on the direction $$R_1 = \sqrt{R^2 - d^2} = \sqrt{3.2^2 - 0.02^2} \approx 3.19994 \text{ m}$$

$$R_2 = \sqrt{R^2 + d^2 - 2Rd\cos\left(\frac{\pi}{2} + \theta\right)} =$$

$$\sqrt{3.2^2 + 0.02^2 - 2*3.2*0.02*\cos\left(\frac{\pi}{2} + 0.0062\right)} \approx 3.20002$$

Then distance between the emitter and receiver B is at 3.19994 m or 3.20002 m. The difference between Bz1=−4.696916×10-10 and Bz2=−4.696181×10-10 is at 7.350×10-14 T. Assume the area of the receiver loop is defined by 1 cm square loop. The difference between the voltages is $$V_{oc1} - V_{oc2} = j\omega(B_{z1} - B_{z2})A \approx 6.2345 \times 10^{-10} \text{ Volt}$$

Figure 17:
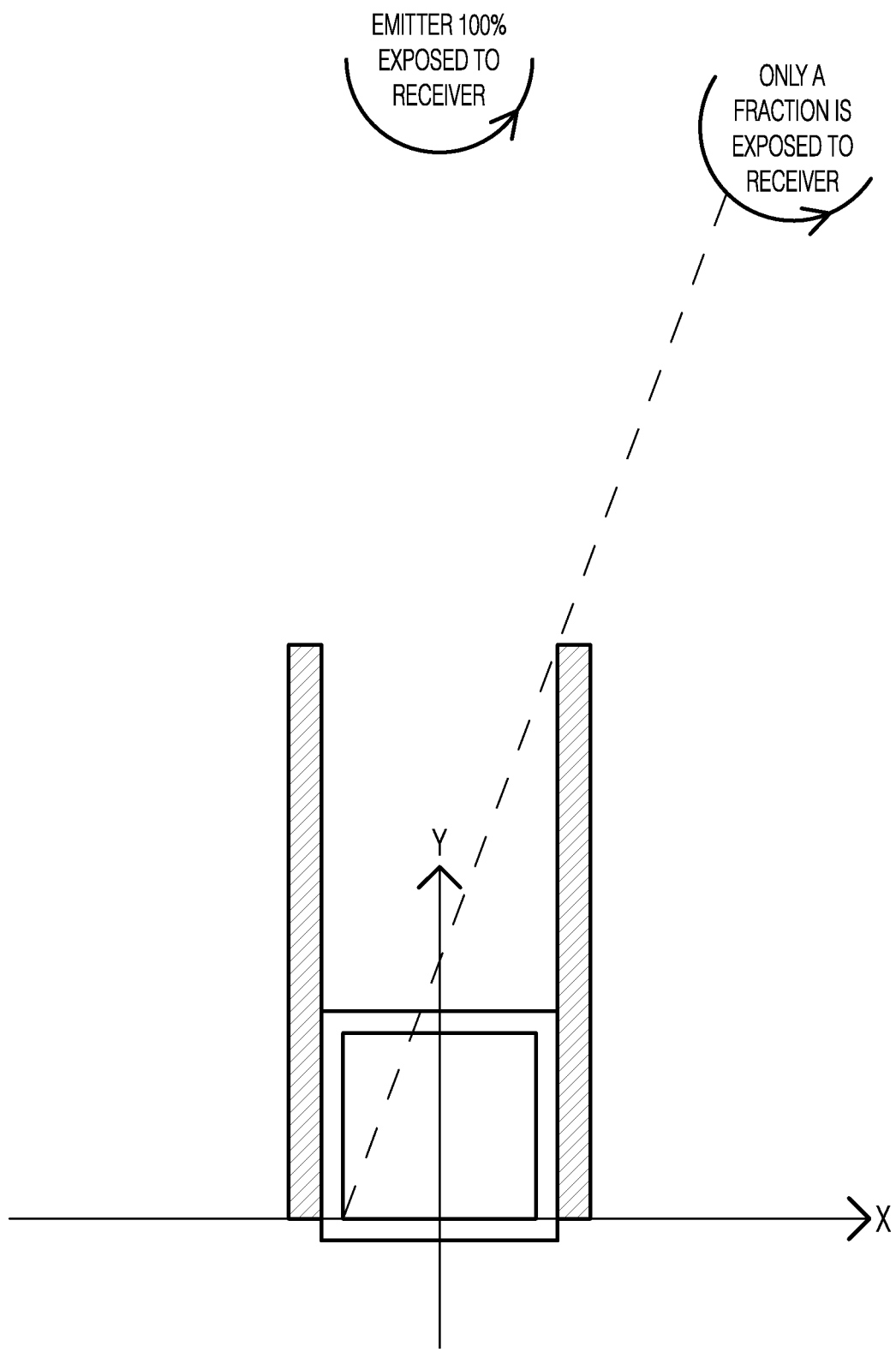
FIG. 17 illustrates a mixture of electromagnetic absorbers and blockers.

This is too insignificant to be determined by low cost RF circuits. To increase the difference between two adjacent antennas, one can increase the B-field by increasing the current, or increasing the area of the receiver. However, the system can only deliver so much current on the emitter and increasing the area would meet a dimension constraint. This is where an EM absorber used in the emitter can also be helpful here. The absorbers cannot act like a complete blackbody at that frequency, but with a mixture of EM absorbers and blockers, signals can be reduced significantly, and become measurable, even with very little horizontal movement, as shown in FIG. 17.

Figure 18:
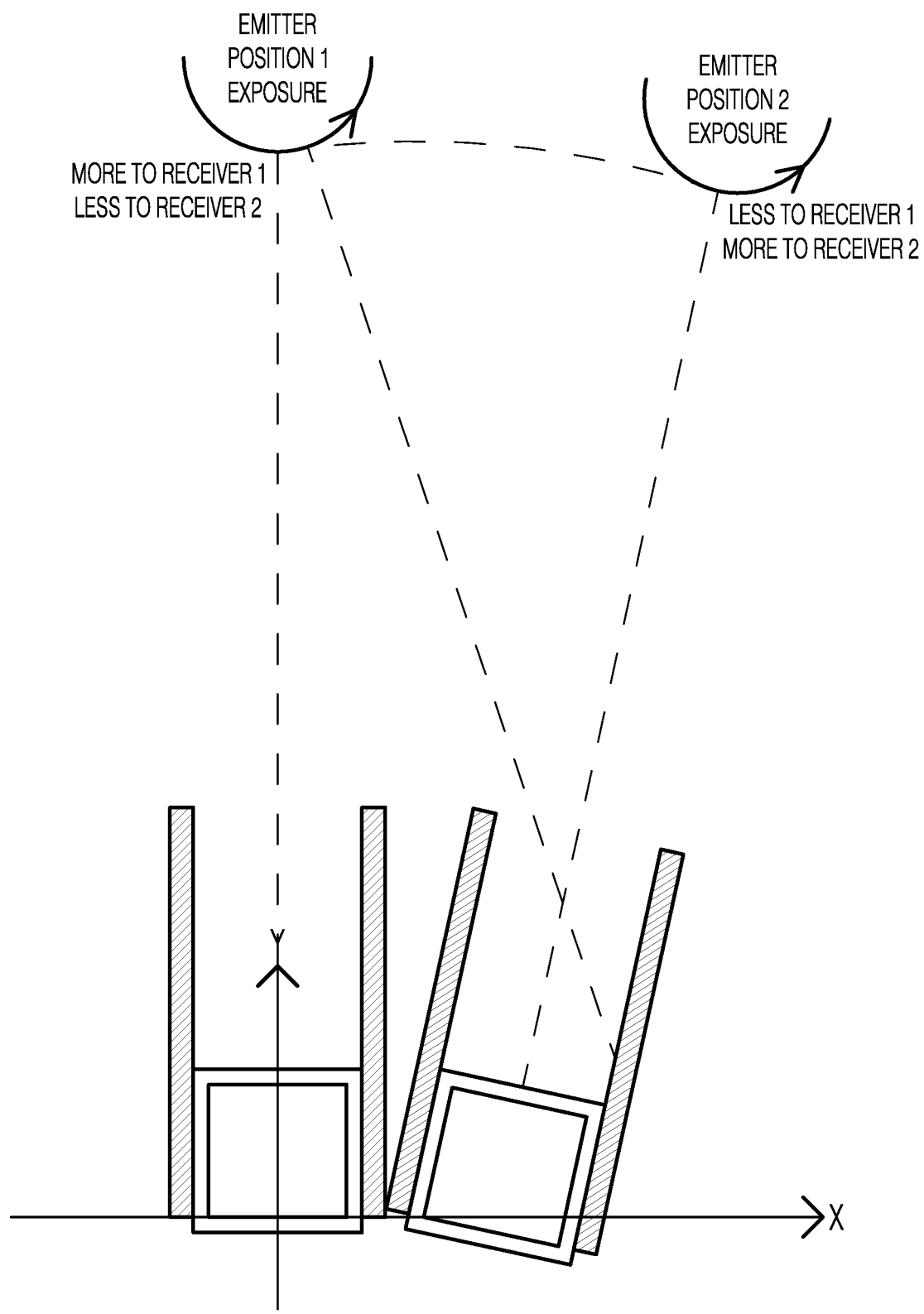
FIG. 18 illustrates an emitter position calculation with a planar adjacent receiver loop.

With this design, an emitter loop that is directly aimed at the receiver opening would have transmitted the maximum amount of power. And if moved a little, a little less power is transmitted. And with the help of its planar adjacent receiver loop, the position of the emitter can be computed, as shown in FIG. 18.

b) Vertical Movement

With horizontal movement resolved, vertical movement of the emitter is quite simple. To create a volume of receivers, as mentioned above, either rotate the horizontal plane about y-axis to create a cone, or rotate the plane about x-axis to create cylindrical wedge. Both have their pros and cons, the former offers a much better measurement since chance of perfect coupling is greatly increased; the latter requires less absorber material and is easier to manufacture.

Figure 20:
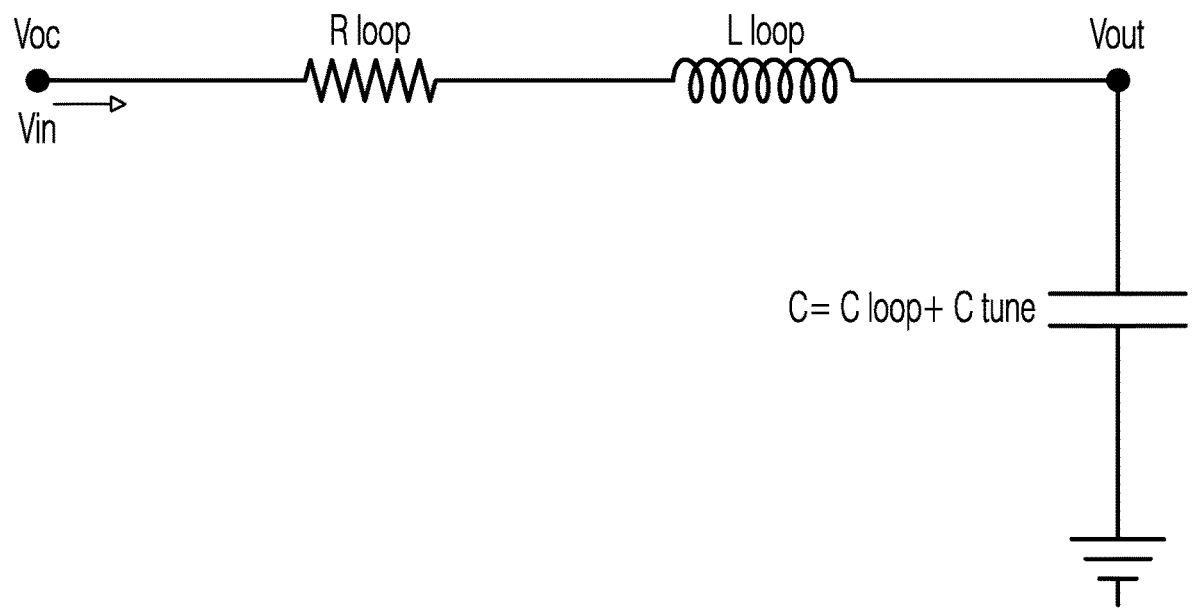
FIG. 20 is an equivalent circuit diagram of a small loop receiver antenna.

Regardless of the design, cone shaped or wedge shaped, the signal captured on any antenna would be compared to all other antennas to determine the strongest signal. Then from that signal, and its adjacent antenna, the position can be determined. However, to create a volume with acceptable precision, thousands of antennas have to be used. Compare them against one another requires a lot of time, so these should better be done in parallel and in stages. The cone design would naturally require that a set of receivers to be grouped together and share a common processing circuit. The wedge design can do the same. The results of these small set is compared to all other sets. By aggregating these small sets bigger volumes can be achieved. See FIG. 20A for loops on the same plane, FIG. 20B for cone shape receiver groups and FIG. 20C for wedge shape receiver groups.

2) Antenna Physics

The physical size and resolution of the receiver depends on the size of the antenna unit. In this section, the following issues are evaluated a) theoretical minimums, b) optimized design based on limits of the minimums, c) the equivalent circuit analysis, and d) alternative embodiments.

a) Theoretical Design

The loop antenna shall take the shape mentioned above in FIG. 18. With an incoming B-field, loop antenna will generate a Voltage at the two ends: Voc=jωAeffBi, where Aeff is the effective area. With planar loop going towards the center, each loop increases the effective area and each loop contributes an ever smaller area towards the total effective area. The effective area Aeff can be approximated with simple function: Aeff=Rectangle−Wire Occupied Area.

At 13.56 MHz to 13.68 MHz receiver bandwidth, the only interference should be thermal noise. (6 KHz per channel, 20 channels, or 20 emitters per complete set.) $V_T=\sqrt{4k_B TR\Delta f}$ T is the temperature in Kelvin, this is at 300, kB is the Boltzmann's constant, Δf is the bandwidth which is 120 KHz, R is the resistance of the conductor. To know the resistance of the conductor, length and cross-section area of the conductor has to be known.

The design must ensure VVoc1 surpasses VT to a high enough ratio of at least 3 dB. Otherwise, the captured signal is simply being reduced to background noise. To generate a high Voc, a higher frequency can be used, but there is a regulatory concern, so that the design is limited to 13.56 MHz RFID frequency and 25 MHz to 30 MHz citizen band. The incoming B-field is calculated in the context above, and it is already an optimized design.

b) Optimized Design

With the same circumference, circle offers the most area. Circular wire loop is more difficult to manufacture as well as other polygons. Square and rectangles are easy to manufacture. Square offers better area efficiency; however, the resolution of the receiver is limited by the base width of the antenna. To increase area, height of the antenna has to be increased; and thus sacrificing some area efficiency. The conductor used in here is copper to keep material and manufacturing cost low.

There are two ways to make the loops; one is to turn them inward on the same plane. This can also increase the effective area of the loop. But the trade-off here is to increase resistance. At this dimension, without having to use a more costly but precise manufacturing method, one single turn is the most effective area to resistance ratio. That being the case, having parallel loops will increase the effective area at the cost of increasing capacitance and inductance. However, each loop in that unit must guarantee the change in Voltage ΔVoc with respect to movement, must be much than their resistance caused thermal noise. Thus, in the following context, only a single turn loop is evaluated.

In one embodiment, the following parameters are used: width of the antenna W=12 mm; height of the antenna H=60 mm; width of the wire wire=1.6 mm; height of the wire wireheight=30 μm; resistivity of copper: ρ=1.68×10-8 Ω·m; and Aeff=4.9984×10-4 m2. The conductor for routing the signal to the processing unit 180 be the same as the wire. This will leave some redundancy in terms of system noise. Length of conductor=0.2816 m; resistance=0.09856Ω; $V_{oc}$=2.0002×10$^{-5}$V. The thermal noise of the system is at $V_T$=2.4240×10$^{-8}$V.

c) Equivalent Circuit Analysis

The equivalent circuit of a small loop receiver antenna is in-series wire resistance and inductance coupled by loop capacitance. Loop capacitance is generally small compare to the coupling capacitor. The resistance of the loop is already given in previous sections; the inductance of loop antenna is calculated by Neumann formula and loop capacitance is modeled by parallel plate method. With resistance, inductance and capacitance of the loop, the equivalent circuit can be completed. At the end of this section, coupling capacitor is matched to the equivalent circuit to provide maximum gain over the designed bandwidth.

Inductance of the loop is composed of self and mutual inductance: $L_{loop}=L_{self}+M_{mutual}$. Self-inductance of a small rectangular conductor is given by:

$$L_i = 2\times 10^{-7} l_i \left( \ln\left(\frac{2l_i}{w+h}\right) + 0.50049 + \frac{w+h}{3l_i}\right)$$

Where li is the length of the line segments that made up the receiver antenna; w is the width of conducting wire; and h is the height (thickness) of the conducting wire. Mutual inductance acting on a particular line segment li can be dividing into two groups: contributing inductance in which current is flowing in the same direction and destructing inductance in which current is flowing in the opposite direction. Current flowing perpendicular towards each other has no effect on mutual inductance.

The mutual inductance is given by Neumann's formula:

$$M_{jk} = \frac{\mu_0}{4\pi} \int \int \frac{\vec{ds_j}\cdot\vec{ds_k}}{|r|};$$

The total Inductance is:

$$L=\Sigma L_i+\Sigma M_{jk}=7.15\times 10^{-8} \text{ H}$$

Figure 21:
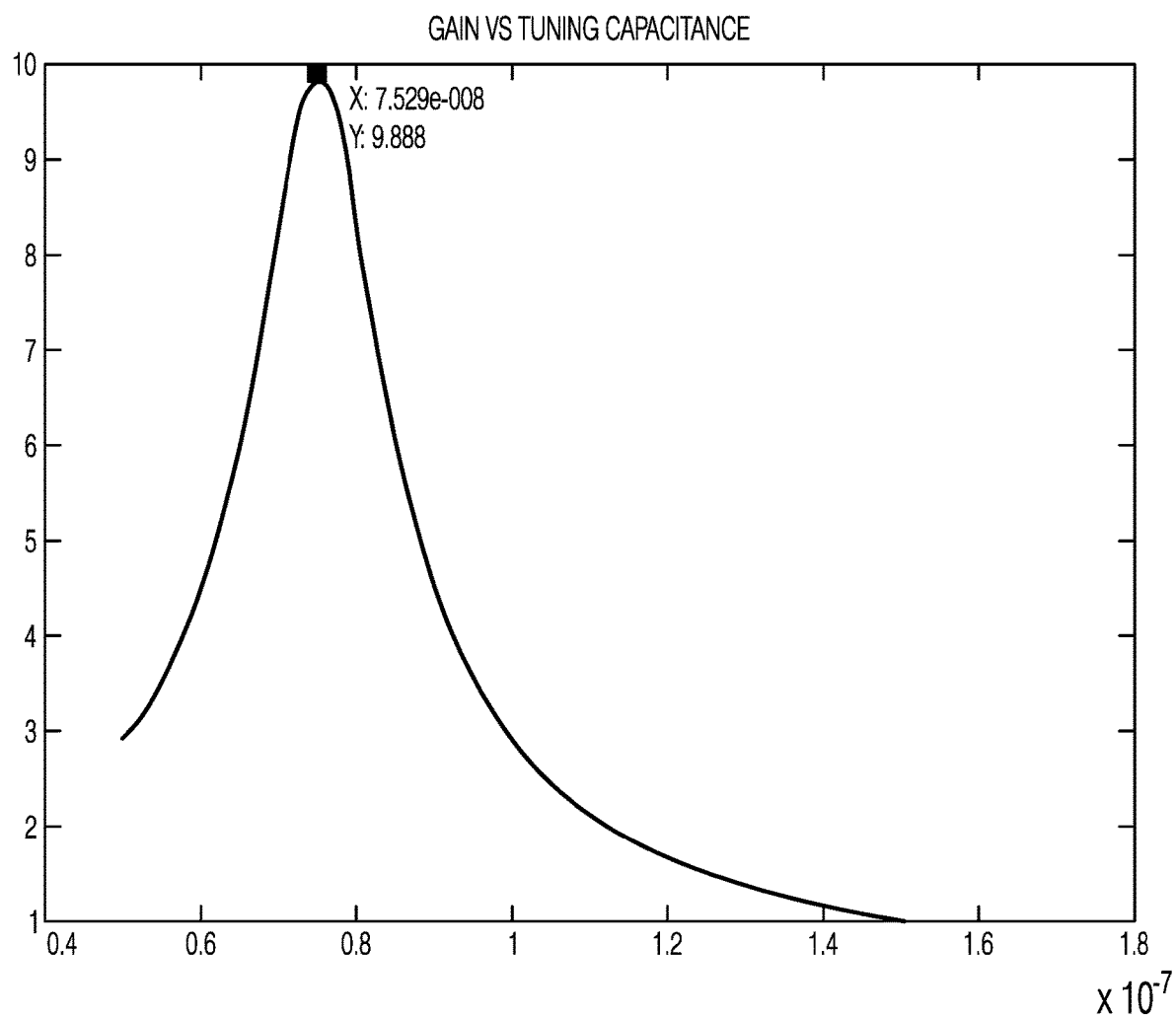
FIG. 21 is graph showing gain vs. tuning capacitance for the circuit in FIG. 20.

Since there is only one loop, capacitance is very low; this is modeled by parallel plate model:

$$C = \varepsilon_0 \frac{A}{d}$$

Where area A is given by inner loop length $l_{inner\_i}$*wire thickness. Separation between the two parallel plates: $l_{inner\_i1}$ Thus, the loop capacitance is: 1.7482×10-15 F. The result of the equivalent circuit is a low pass filter. To have the optimal gain within the designed range, apply a coupling capacitor to the output $V_0$. The equivalent circuit is shown in FIG. 21.

The transfer function for this is:

$$H(s) = \frac{Z_s}{Z_1 + Z_2 + Z_3}$$

Where $Z_1 = R$, $Z_2 = sL$, $Z_3 = 1/sC$ $$H(s) = \frac{1}{sRC + s^3CL + 1}$$

Figure 22A:
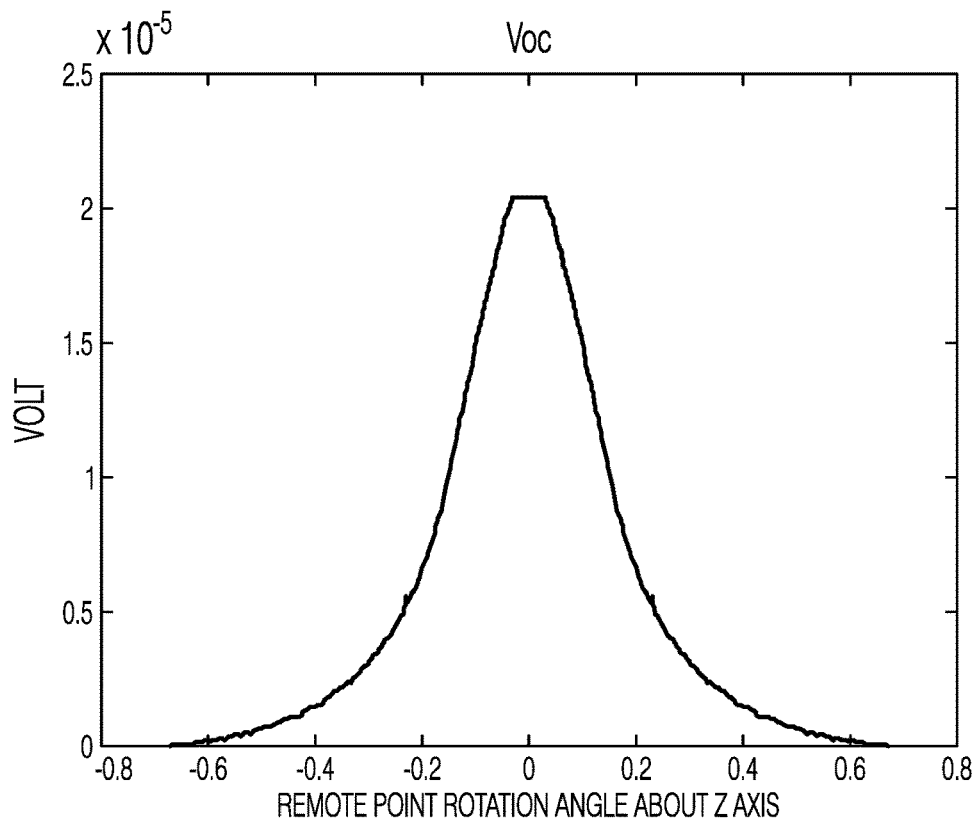
FIGS. 22A and 22B are graphs showing Voc for remote point rotation about the z-axis for a single receiver.
Figure 22B:
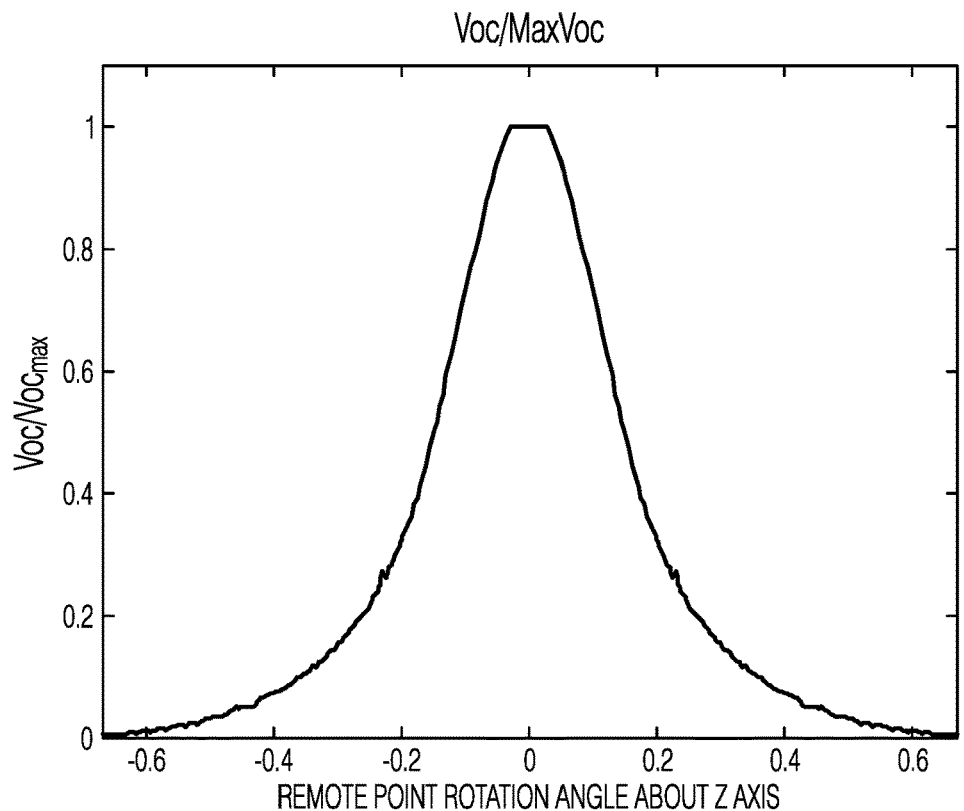

Replace s with frequency domain jω, with frequency set to 13.56 MHz, and solve for maximum absolute value with different C. Transfer function (s) resonates at 7.5292×10-8 F with gain at 9.888. Since the gain is non-linear and in not really needed. Input capacitors would act like a tuning capacitor that has to be much smaller than 7.5292×10-8 F. This is due to the frequency range of the system being relatively low; when it goes to a few GHz, the tuning capacitor becomes important to maintain a gain of above 1. See FIG. 22.

d) Alternative Embodiments

In the section above, it is shown that each receiver has one single turn. Having one single turn means the voltage received may not be enough. This may require the processing unit to have really sharp amplifier circuits. Alternate embodiments include the receiver unit having I) multiple parallel turns and II) applying a ferrite substrate.

I) Multiple Parallel Turns

As seen from the emitter section, and subsection b) of this section, with frequency set, the resistance of the wire is limited by skin depth. To increase the ratio between VOC and VT, reducing the overall resistance is an option. Although, at each turn, the ratio of VOC/VT is the same, when they stack together, the ratio multiplies by N turns. On the other hand, the having multiple turns, parallel or not, increases the capacitance and inductance of the loop. The capacitance and inductance should no longer be at a 9.5891× 10-16 F and 4.53×10-8H. Other modifications include: increasing the number of parallel turns to two turns; changing the thickness of the wire to 30 µm; changing the dielectric thickness to 20 µm; and the relative dielectric constant be 1.

Since both parallel capacitance and inductance is much greater than their one turn counter parts, the calculation only need to concerns about the former. In this case both the inductance and capacitance approximately increased to an inductance of 2.86×10-7H and a capacitance of 1.3137×10-8 F. In this case, the resonant frequency is at 2.569 MHz. At the bandwidth of 13.56 MHz to 13.68 MHz, the gain ranges from 0.0381 to 0.0374.

II) Ferrite Substrate

The use of ferrite substrate or ferrite core is known to increase the gain. This can also be used in the present application. However, this alternative embodiment comes in at the expense of increased inductance and potentially increased cost. However, since the original inductance is so small, this may not be as problematic.

3) Antenna Unit Geometry

The purpose of the absorber sink unit is to partially block signal from all other directions than its direct opening. The wall should ideally be composed of only absorber that completely absorbs signal without leak or reflection. However, a perfect blackbody absorber does not exist. Instead, a mixture of absorbers and blockers can be used to achieve the same result. As long as the combination of leakage and noise is much smaller than the promised resolution, the design premises holds true. It is to be noted that the vertical walls (placed along the same plane as receiver loops) can be composed of both conductors and absorbers. Horizontal walls (placed on top and bottom of the receiver) must be composed of absorber only. But the performance requirement for the horizontal walls is much less, since perfect coupling will triumph over false positive signal. This will be discussed more in the appendix section. In this section, the absorbers are treated as perfect blackbodies for simplicity. In this section, main goal is to determine the relationship between height of the wall, thickness of the wall, the rotational angle and resulting resolution. This information can be used to iterate through previous sections to finalize size of the antenna, and further determine the overall size of the unit.

a) Height of the Wall

Figure 23A:
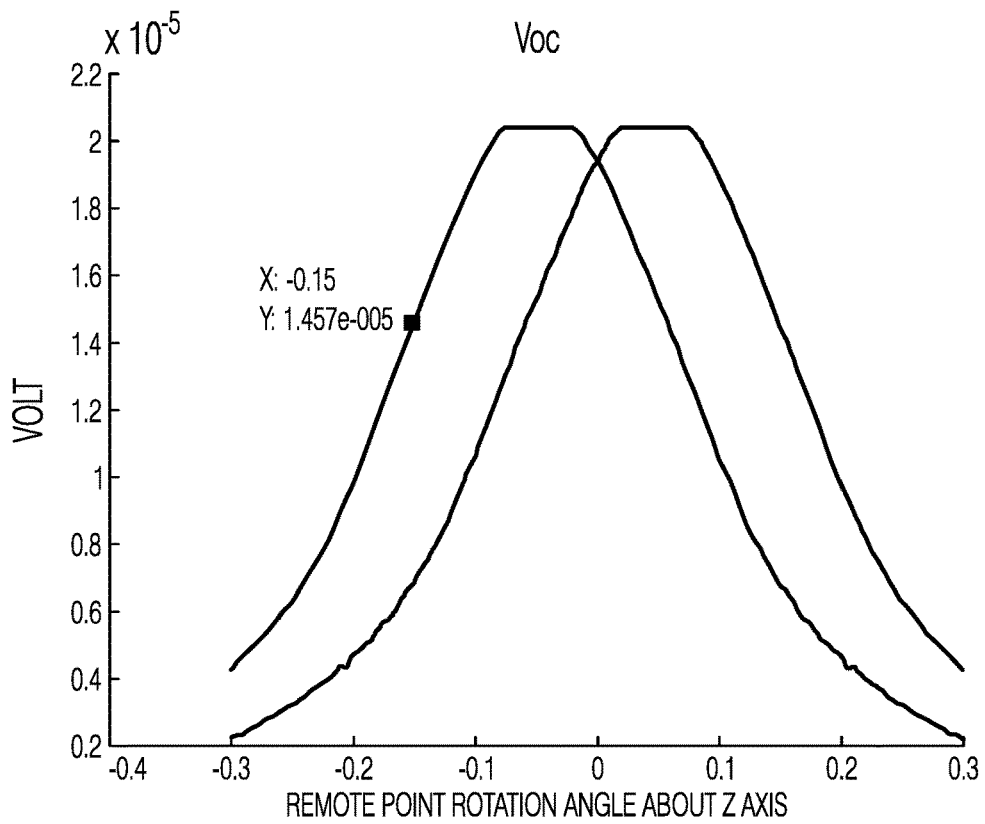
FIGS. 23A and 23B are graphs showing Voc for remote point rotation about the z-axis for two receivers.
Figure 23B:
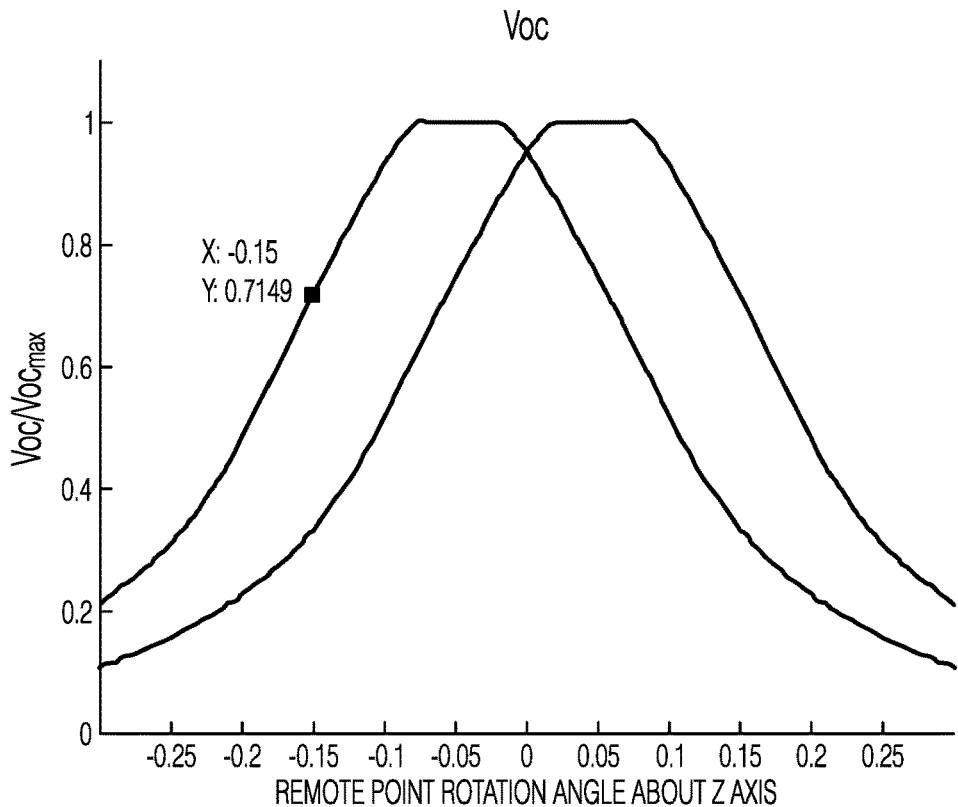

Height of the wall is determined by the width of receiver loops. In the simulations, assume that the wall acts like a perfect black body. Let the height of the wall be 7 cm and width be 1.2 cm, which puts the wall right along the edge of the receiver. The loop is still 1.2 cm wide and 6.0 cm high as described in the previous section. The emitter at 3.2 m away making the same circular movement about z-axis as discussed in the philosophy of design section above. The Voc graphs are shown in FIGS. 23A and 23B. There is a large plateau at the middle of the movement. It is about 0.06 radian or about 19.20 cm arc length. At this range, full emitter loop is exposed to a receiver, and the receiver cannot determine such circular movement. To help determine this type of movement, another receiver is needed.

b) Thickness of the Wall

The walls can be as thick as possible. Although the obvious constraint would be size, but real major concern here is weight. However, horizontal walls can be as thin as possible, since the horizontal information is never used in calculations. Absorbers in this case can be as thin as 60 µm. Vertical absorbers can have multiple layers of absorbers and conductors. The combined thickness can be at 2 mm.

c) Angle Between Adjacent Receivers

Figure 19A:
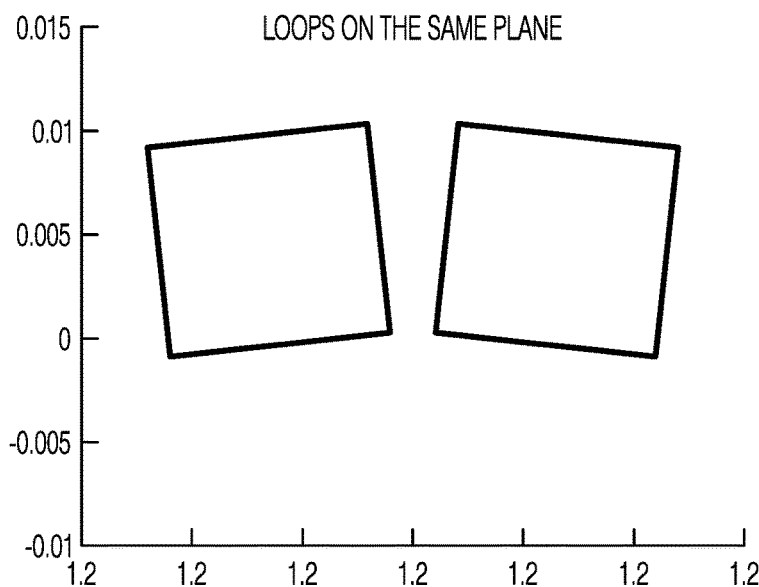
FIG. 19A is a graph showing planar loops on the same plane.
Figure 19B:
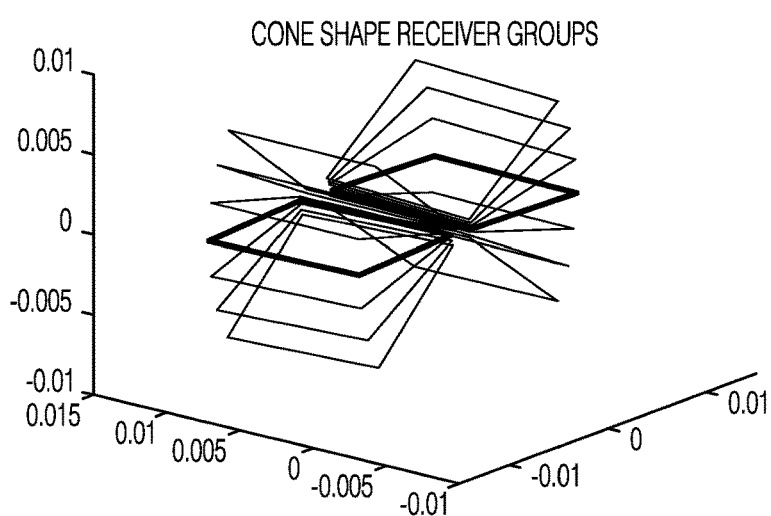
FIG. 19B is a graph showing cone shape receiver groups.
Figure 19C:
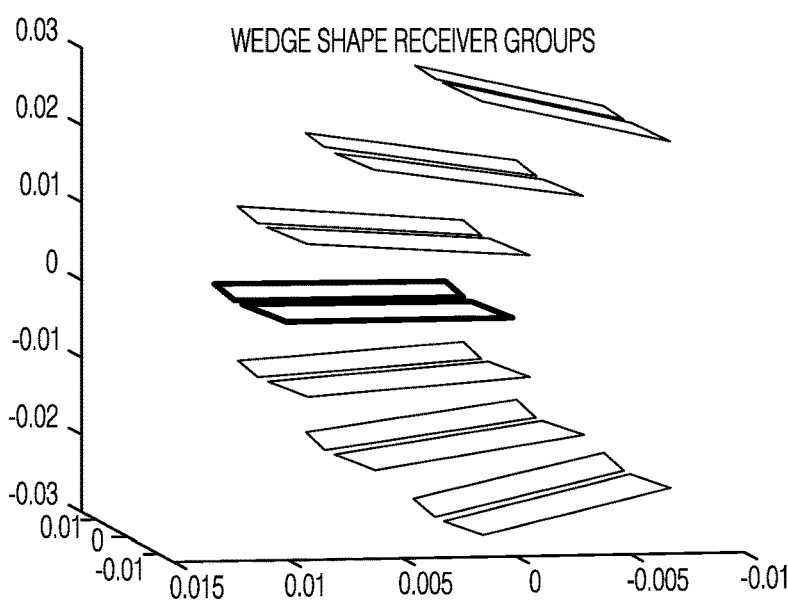
FIG. 19C is a graph showing wedge shape receiver groups.

The receiver units should be at angle (theta) with respect each other, as shown in FIG. 18. This is to ensure both geometrical symmetry and maximize the capturing area. There is a lower limit on the angle as shown in FIGS. 19A and 19B. The receiver loops must not overlap each other.

Let the imaginary center be at [0; -R; 0] and the angle between the two receivers is θ. To ensure receiver loops do not overlap each other, secant length after rotation (±θ2) has to be greater than one half of loop width and its side of the wall.

$$\text{Secant} = \sqrt{2R^2 * \left(1 - \cos\left(\frac{\theta}{2}\right)\right)};$$

Secant > LoopWidth/2 + wallThickness;

With these constraints, and the dimension of the receiver unit mentioned above, choose R=19 cm and θ=0.045 rad.

Figure 24A:
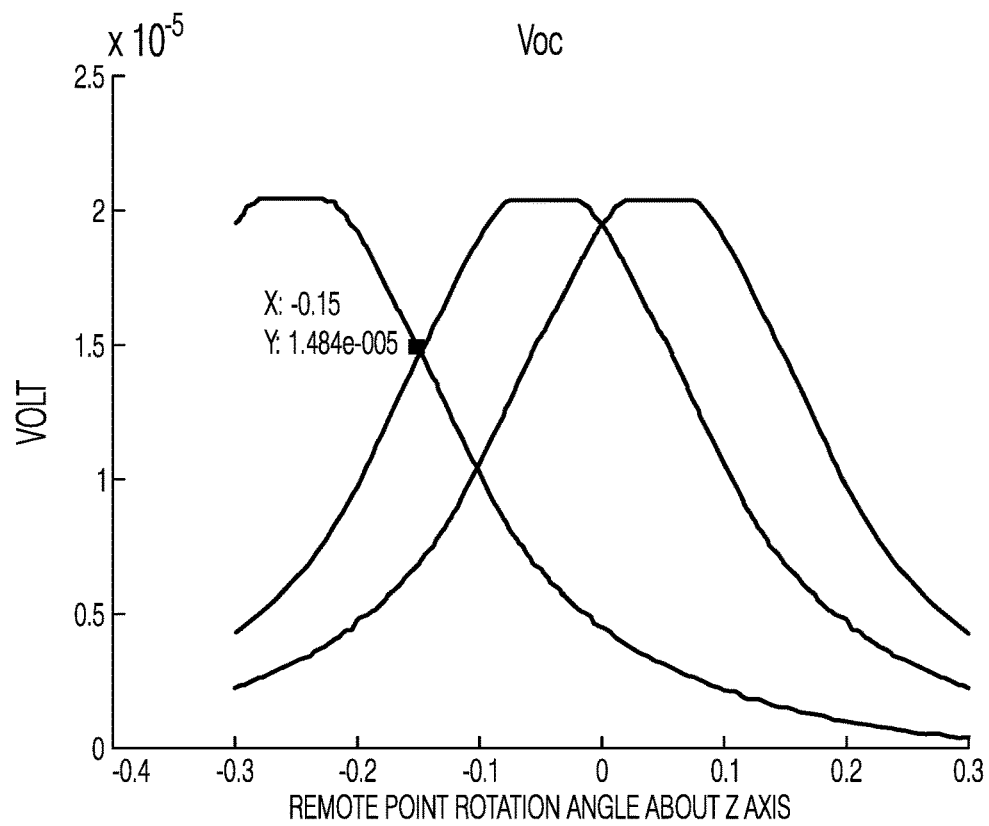
FIGS. 24A and 24B are graphs showing Voc for remote point rotation about the z-axis for three receivers.
Figure 24B:
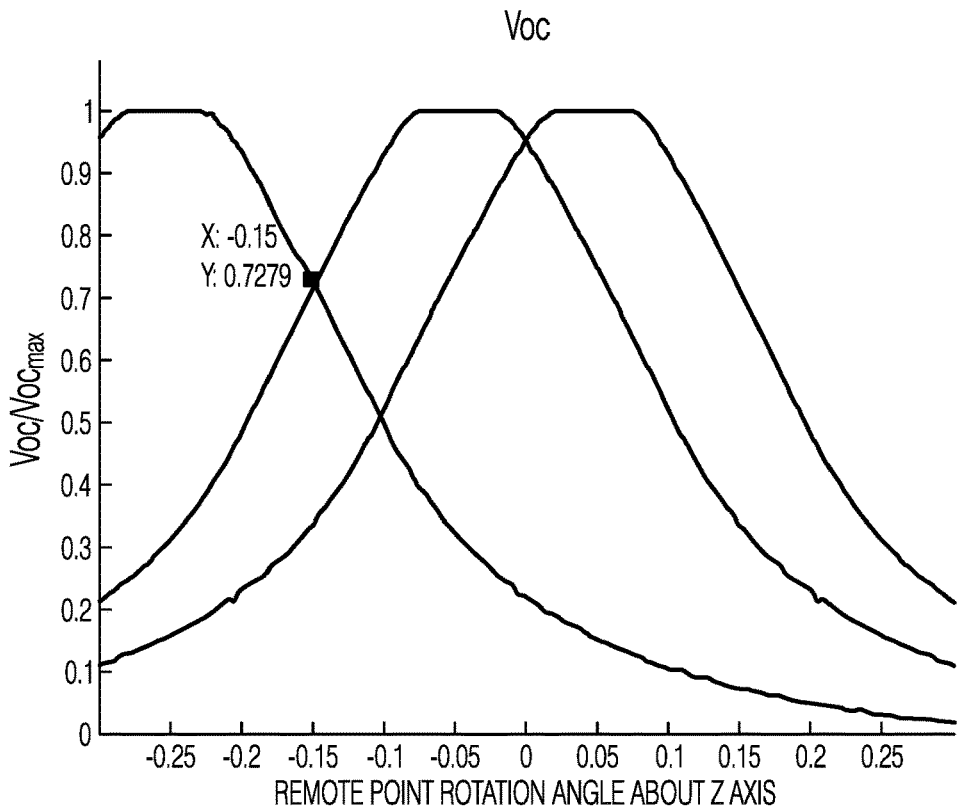

Now the plateau section is properly covered with by another receiver. The emitter current is already known and the previous locations are also known. The movement can be determined by integrated IMUs to see whether it is moving away or closer, or along the circular path. By combining all this information, the current location of an emitter can be determined. As long as every single movement is tracked by this method, the location can be continuously monitored. See FIGS. 24A and 24B.

However, if IMUs are involved in determining location, resolution and refresh rate suffers as a result. Drift can be corrected by a more complex fusion algorithm, due to additional receiver input, but such correction hinders the performance. The other way is to separate position information and orientation information altogether. IMU is still needed for orientation. A third receiver is needed to determine that absolute position.

Figure 25A:
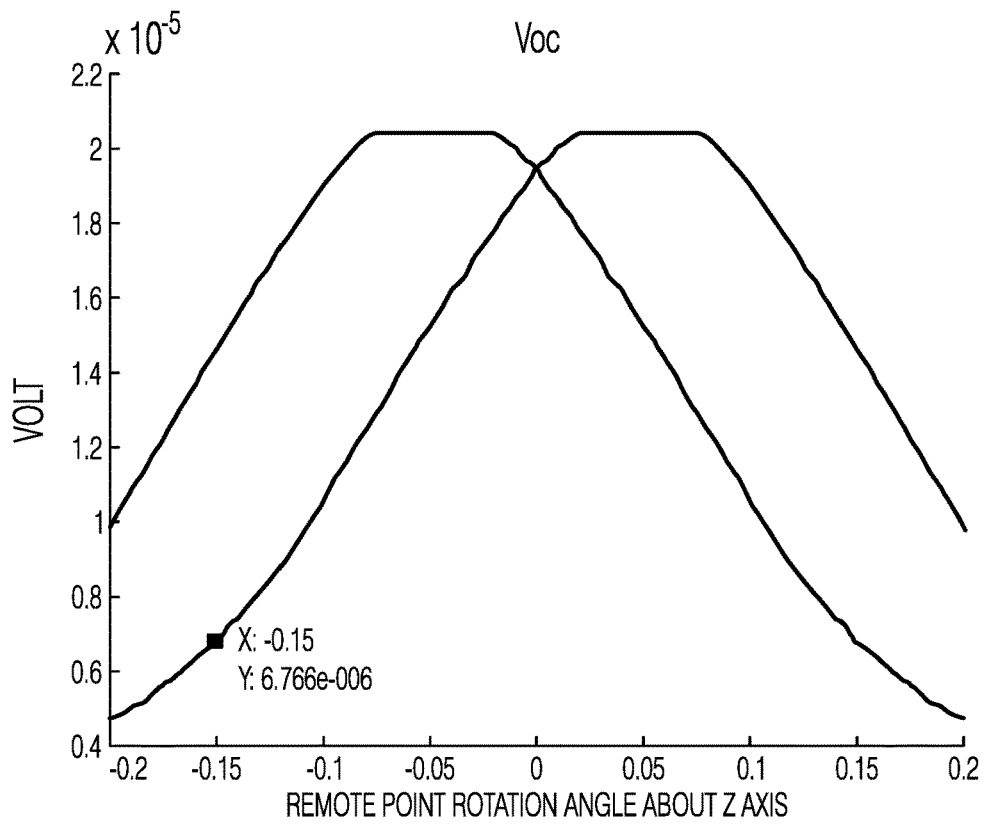
FIGS. 25A and 25B are graphs showing Voc for remote point rotation angle about the z-axis for two receivers.
Figure 25B:
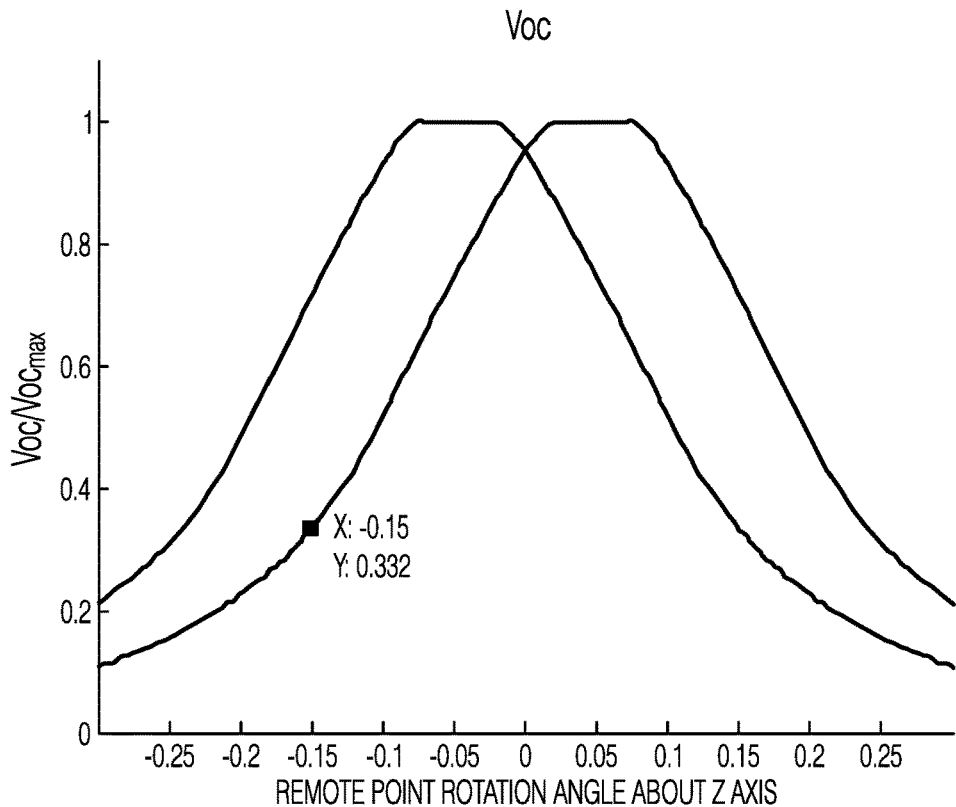

In another embodiment, the graphs in FIGS. 25A and 25B show the results when the center for the adjacent unit is at [0; -0.11; 0] and the angle of rotation is set at θ=0.25.

A third embodiment only uses the overlapped section between the pair of receivers to determine the location information. In this embodiment, the range it covers becomes less, thus other planar units have to be packed closer together.

d) Resolution of the Planar Unit

All motions or vectors can be broken down to a combination of rotation and translation. In the previous the subsection, the issue of rotation is resolved. That still leaves with planar translations—the motion of emitter departing or approaching the receiver unit along a vector. This motion must be detectable by a receiver as well. Recall the theoretical limit (already has some safeguard built in) is the thermal noise, which is 0.12% of maximum VOC. Resolution must be noticeably larger. With conventional 3 dB rule $\Delta VOC > 0.17\%$ of VOC_Max, this number is about 1/583th of theoretical VOC_Max. This number has to be digitized eventually. With some more redundancies added and consideration of simplicity of design, choose each noticeable $\Delta VOC$ to be 1/512 of VOC_Max and let this be the threshold voltage (VThreshold=$3.9066 \times 10^{-8}$ Volt).

For rotational motion, assume only two receivers arranged in position described above and accurate IMU units are also used to determine position. Due to geometrical symmetry, and near linear lines on the sides, 2 units covers about a detectable range of 0.3 radian ($\pm 0.15$ rad), or an arc length of 96 cm at 3.2 m range. In this case, even only to utilize the more linear part of VOC, it only needs to be divided into 100 steps to achieve an overall resolution of 4.8 mm at 3.2 range. Since the original design goal is on average millimeter range, this is acceptable.

Figure 26A:
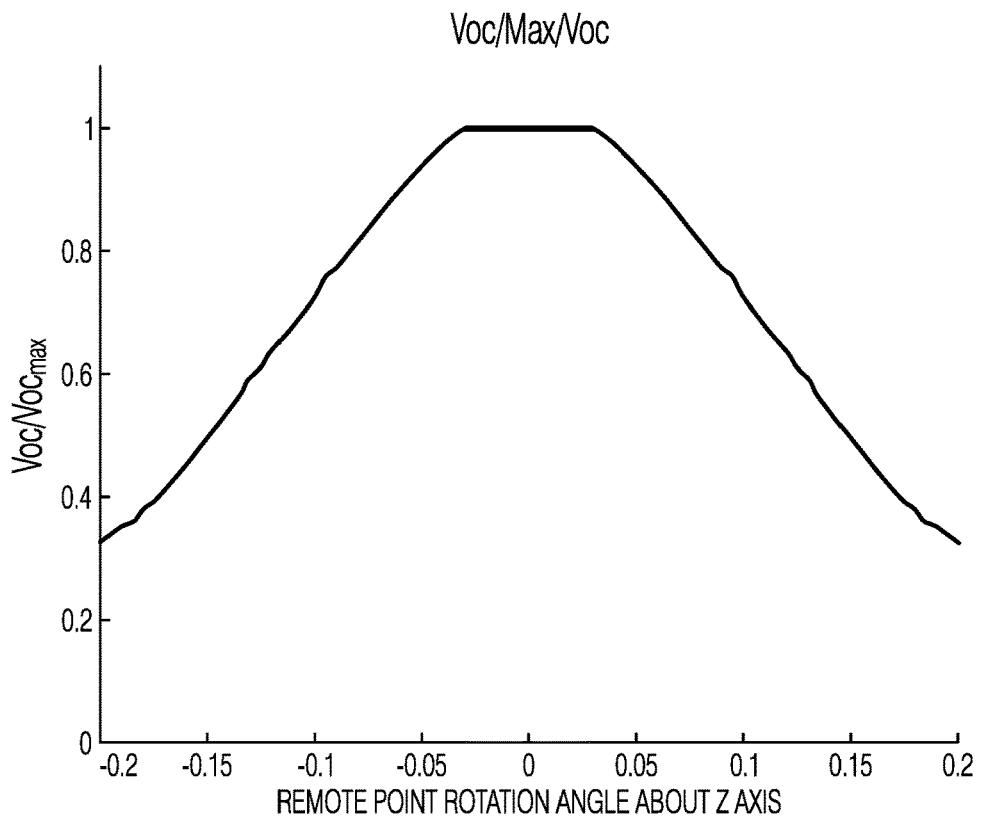
FIG. 26A is a graph showing a maximum Voc for remote point rotation angle about the z-axis for one receiver.
Figure 26B:
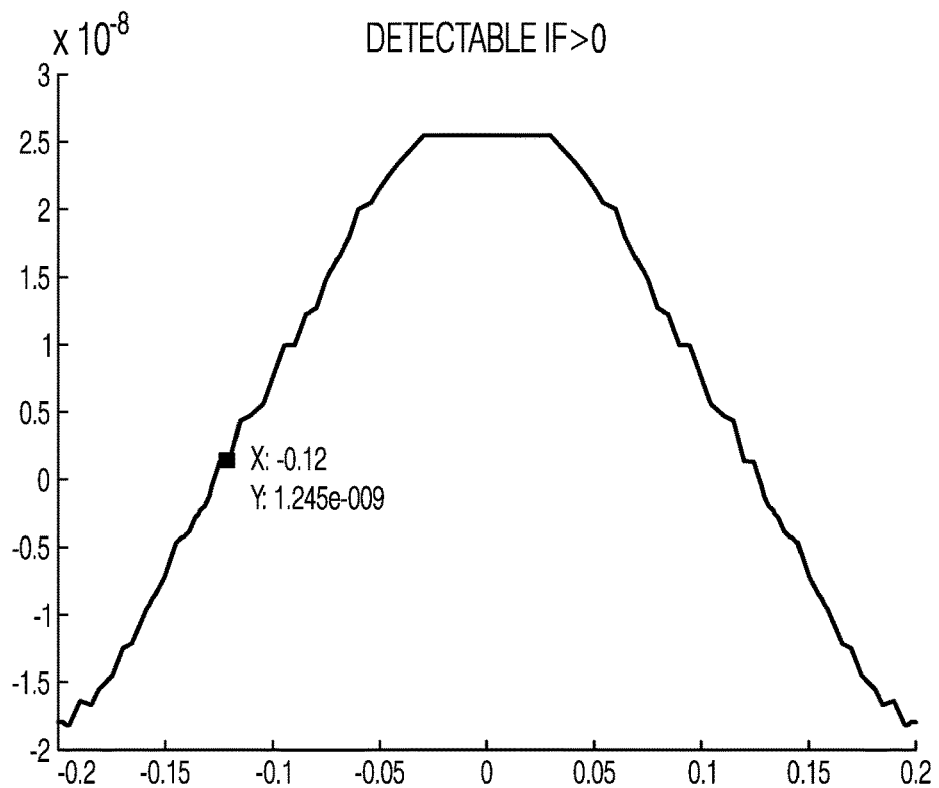
FIG. 26B is a graph showing a detectable range of Voc for one receiver.

At $\pm 0.15$ rad, the minimum voltage that is utilize is at $6.766 \times 10^{-6}$V and the maximum the voltage at that position is rated at $2.0361 \times 10^{-5}$V. Between these bounds, if the step is set at the threshold voltage $3.9066 \times 10^{-8}$V, then it can be divided in to 348 times. With these steps the extrapolated resolution is rated at 1.4 mm, which is more than sufficient. See FIGS. 26A and 26B.

It is noted that this maximum voltage is slightly higher than the reference voltage of $2.0002 \times 10^{-5}$V, because, due to geometrical arrangement, the receivers are actually slightly closer to or farther from the emitter. This difference is not significant, as long as a reference maximum is set at that range.

It is a little tricky on translation movement, if the emitter moves away or closer to emitter. The signal strength is the only indicator of such movement. When it comes closer to the edge of the detection range ($\pm 0.65$ rad), the signal strength at that position is closer to 0. If the emitter again moves along that vector closer to or farther from the emitter, the difference of the signal strength is much smaller. To determine position in these situations, may involve accurate IMU units, or by referencing again to another receiver. In this design, referencing to another unit is preferred, because it will be much more accurate and predictable.

Figure 27A:
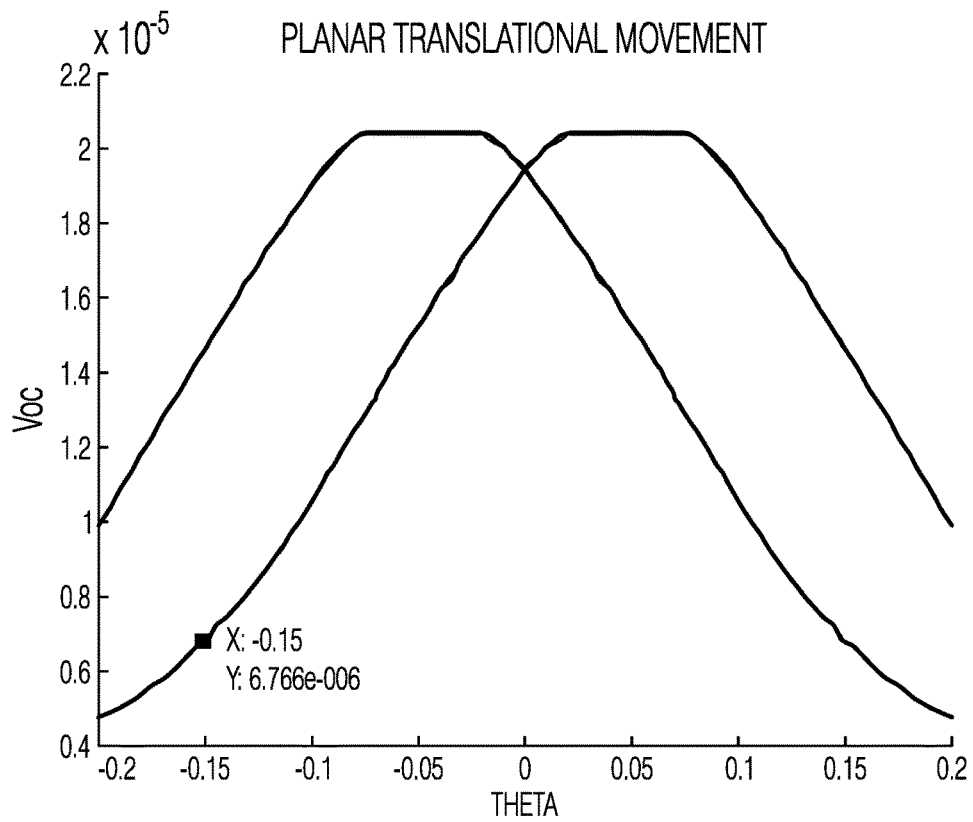
FIG. 27A is a graph showing planar translational movement for two receivers.
Figure 27B:
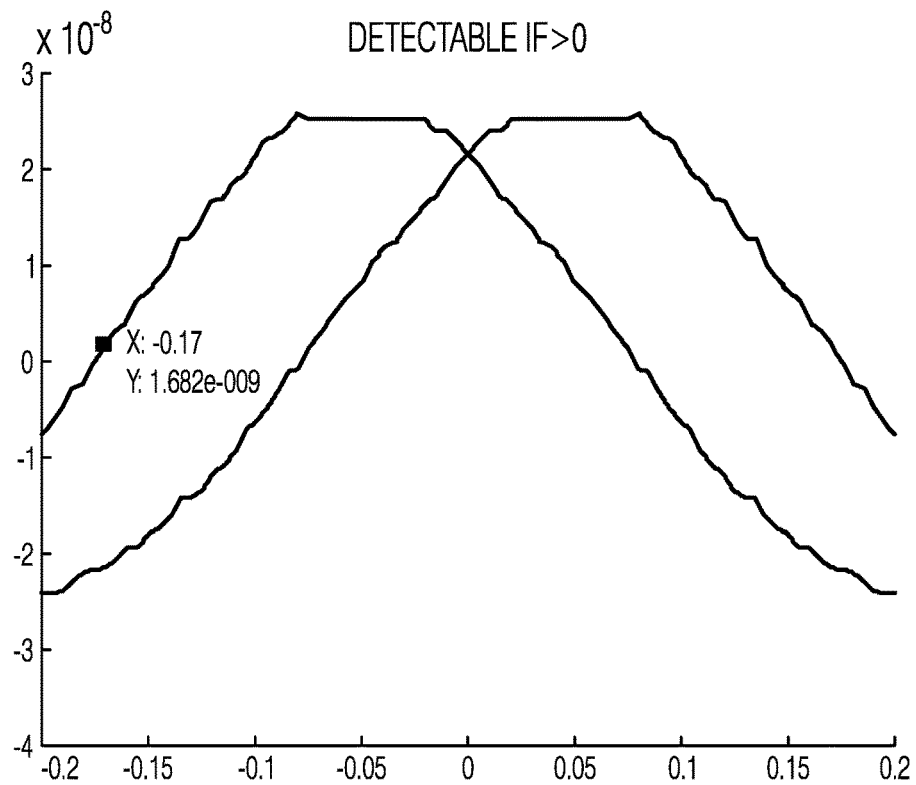
FIG. 27B is a graph showing a detectable range of Voc for two receivers.
Figure 28A:
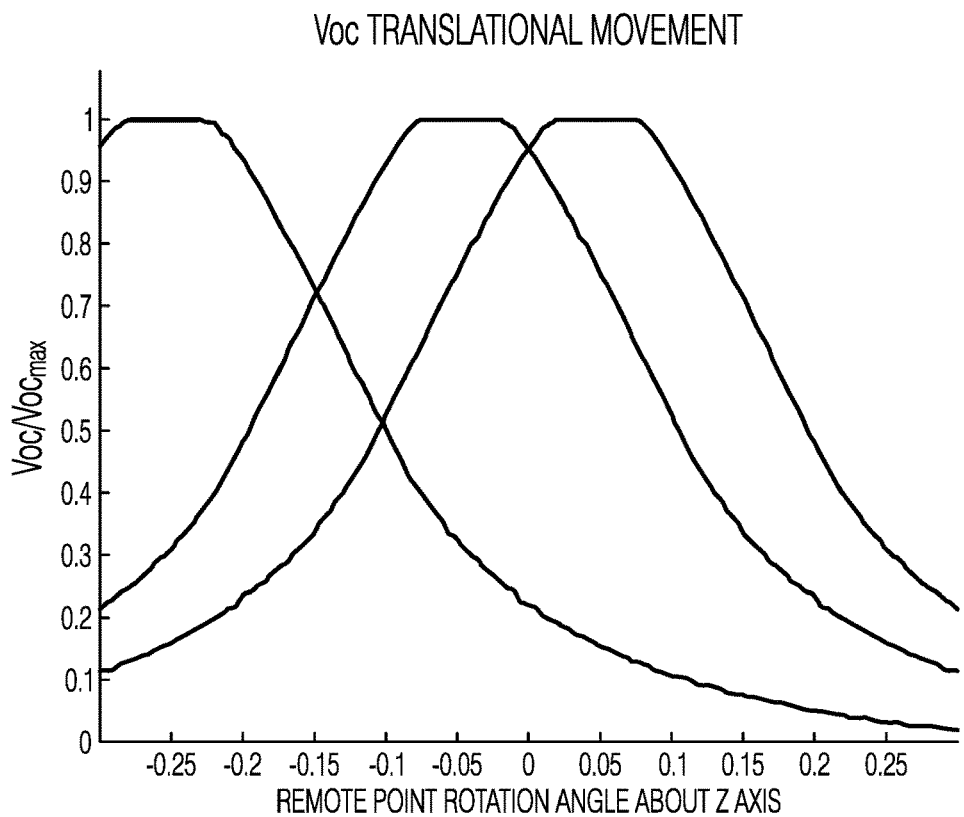
FIG. 28A is a graph showing planar translational movement for three receivers.
Figure 28B:
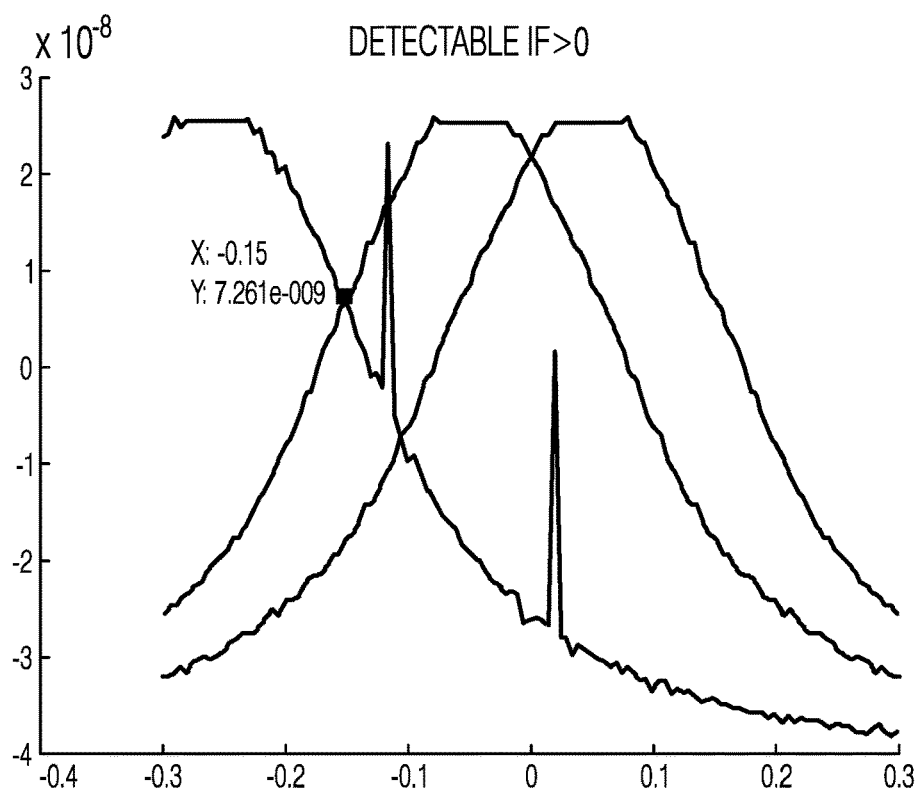
FIG. 28B is a graph showing a detectable range of Voc for three receivers.
Figure 29:
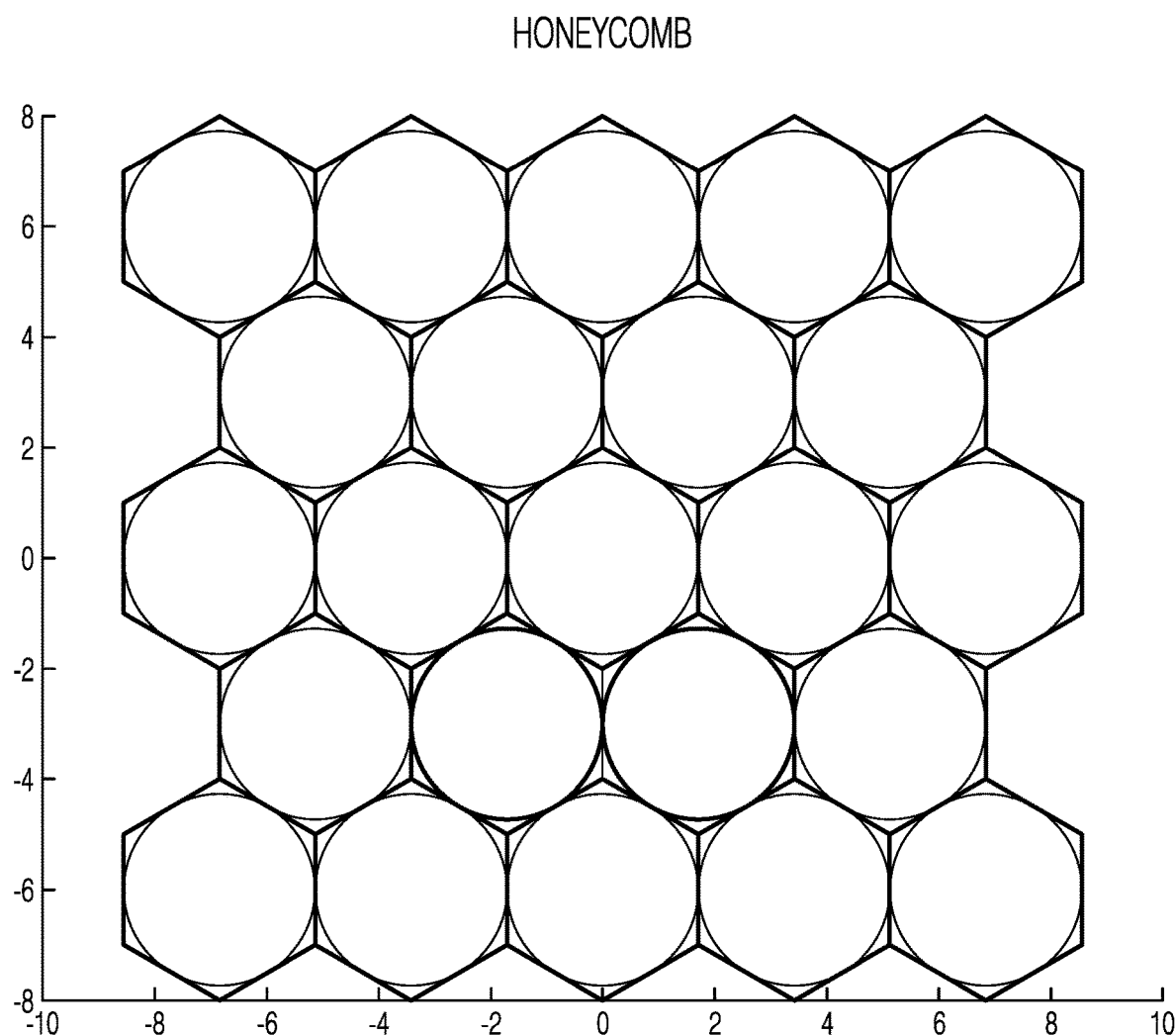
FIG. 29 illustrates a honeycomb matrix of cone shaped receiver units.

For translational movement, regardless of the wedge shaped or cone shaped designs, any one receiver out of two or three relevant receivers has to be able to detect an increase (moving closer), or a decrease (moving away) in VOC. This change in voltage must be greater than the threshold voltage ($3.9066 \times 10^{-8}$V) defined above. Since the design goal is to achieve millimeter accuracy, let the movement be 5 mm at 3.2 meter. But the applying the same analysis, the voltage detected at the receiver end can be observed. The useful section, however, is limited to the part where the difference is greater than threshold voltage. This section is limited to $\pm 0.12$ radian. See FIGS. 27A and 27B.

FIGS. 28A, 28B, 29A and 29B show that when put two receivers together, the useable range can be extended to $\pm 0.17$. Since the other receiver loses linearity beyond $\pm 0.15$, the design has to limit the detection range down to the linear part. Similarly with three receivers, the detectable range cannot increase. It is noted that there are little spikes. These are due to the fact that when the emitter moves further away, it also exposes a little bit more wire segment to the receiver, and this will cause a sudden surge in amount of voltage transferred. This becomes negligible as these surges are discarded.

4) Antenna Matrix and Dimensions

From above parameters, the overall dimensions of receiver matrix's dimensions can be calculated. The processing unit also needs some space, but the custom ICs can be made much smaller and more compact than receiver loops and thus may only contribute a little to the overall size. Summing up the individual pairs of antennas can yield an acceptable estimate. There is also of note that the matrix resulted from wedge shaped units may be slightly smaller than that resulted from cone shaped units. In the following context both wedge shaped and cone shaped matrix dimensions are provided.

In one embodiment, the dimensions of the units are as follows: height of the unit: 7 cm, base of the unit (including wall thickness): 1.6 cm; radius and angle between two paired antennas: 19 cm and 0.09 radian (5.16°), and radius and angle between two adjacent units: 11 cm and 0.25 radian (14.32°).

a) Wedge Shaped Unit Embodiment

In the vertical movement case, the resolution may suffer. Range of detection for a planar unit of a pair of antennas is rated at about 65 cm secant length and 66 cm arc length at 2.2 meter and 95 cm secant length and 96 cm arc length at 3.2 meter. Accuracy on the several millimeter range, if the similar level of resolution is to be kept on vertical movement, then 200 pairs are needed for that unit. In this case 200 pairs all points to a unique direction over a convex surface, this arrangement forms a unit. Increasing the number of vertical pairs will increase resolution; the hard limit is the total thickness of the 30 µm wire plus the substrate.

Wedge shaped units can be packed closer together. The vertical dimension of a single unit would be about 2 cm, because the 200 vertical units placed extremely tight together. At most units twenty five (5×5) are needed to cover about 3 m×3 m volume at 2.2 meter or 4 m×4 m at 3.2 meter. However, twenty (4×5 with 4 horizontal and 5 vertical) may suffice, which covers about 2.4 m×3 m at 2.2 meters and about 3 m×4 m at 3.2 meters.

Assuming twenty five units in total, and dimensions listed above, the total dimension should be a cut-off wedge with height, width and thickness measure around 10.3 cm×17 cm×7 cm (or 8 cm by leaving some room for ICs).

b) Cone Shaped Unit Embodiment

For the cone shaped unit embodiment, overall dimension would be a little bigger. But the number of antenna pairs per unit count can be made much sparser. Recall the threshold voltage is set at $3.9066 \times 10^{-8}$V or 1/512th (0.195%) of maximum voltage. This is about 3.6°, of rotation from the perfectly coupled position. However, this information can be correlated by IMU units to determine the absolute orientation and thus calculated based on that information. Even given the lower limit, only 100 units or 50 pairs are needed to form a cone to avoid such calculations.

Getting from above parameters, one unit is about 3.4 cm measured at base. To make sure everything is packed as close as possible, the cones are fitted with an outer (may even be imaginary) hexagon shaped shell and placed together. Still, 25 or 20 units are needed to cover the range of our measurement.

Figure 30:
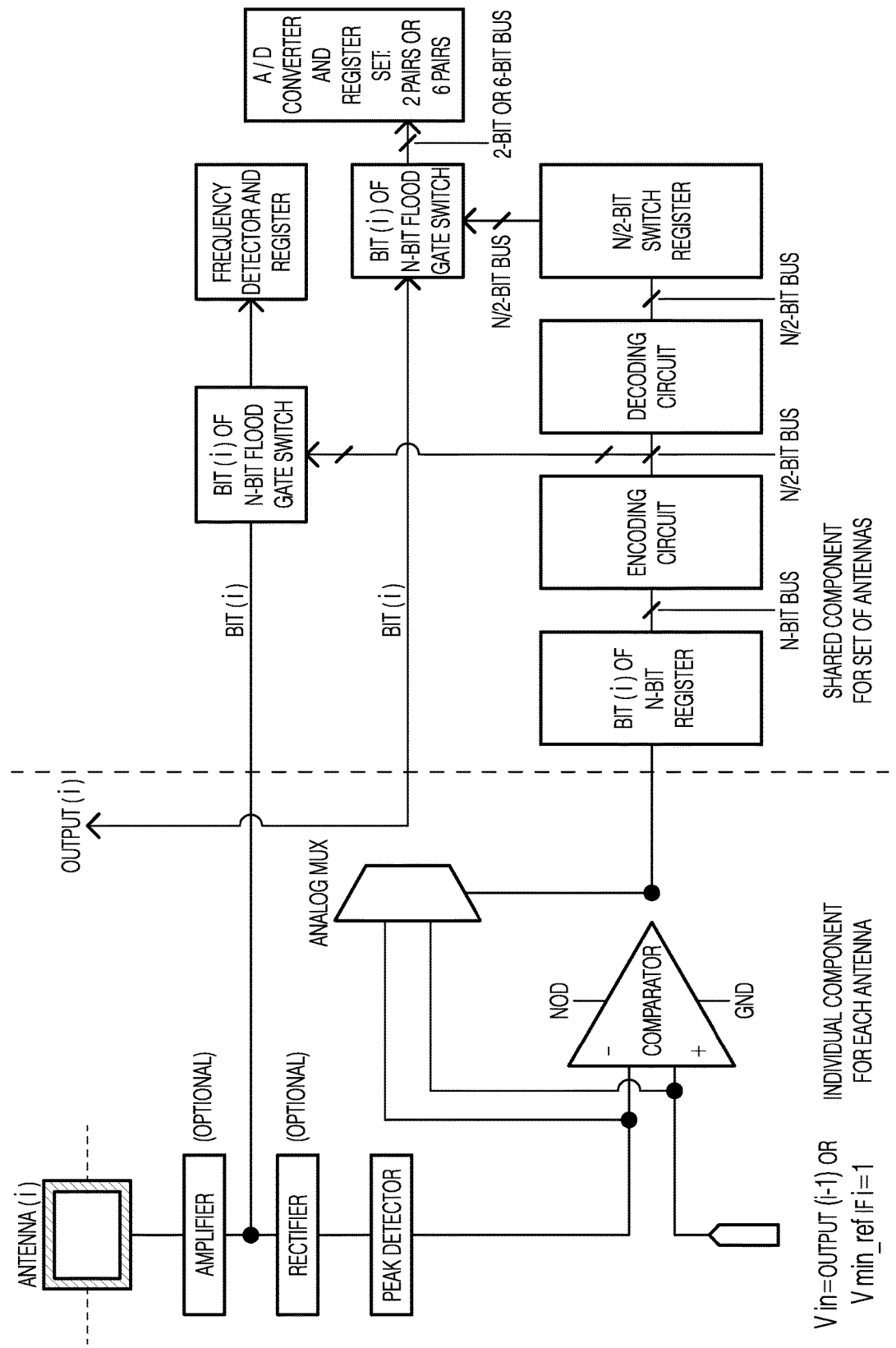
FIG. 30 is a circuit diagram of a mixed signal circuit for one receiver loop.

Assuming twenty five units in total, and dimensions listed above. The matrix should resemble a honeycomb, as shown in FIG. 30. The height, width and thickness should measure round 16 cm×17 cm×7 cm (or 8 cm by leaving some room for ICs).

Returning to the embodiment shown in FIG. 1, processing unit 180 is attached to the receiver 170. As discussed above, the set of receiver antennas are grouped together, thus the processing units may also be grouped together, such as manufactured on the same die. This design is based on the perfect coupling of emitter wires and receiver loops. The processing unit 180 consists of two main components (not shown): a mixed signal circuit which does the preliminary processing and a general purpose processor to calculate the position based on data. In this section, as before, first 1) design philosophy is discussed, followed by 2) circuit sketches for mixed signal processing unit, and 3) pseudo algorithms to calculate the position of emitter.

1) Processing Unit Design Philosophy

The design is based the "perfect coupling" of emitter wires and receiver loops. The premise is that the perfectly coupled loops or at least the most perfectly coupled loops always have a higher VOC than non-perfectly coupled loops. All receivers are compared against each other to figure out the max. This can be done by digitize each signal and compare the result. However, in the worst case scenario, there are about 200*25 receivers to compare; such would be a lot of calculation for a processor to handle in real time. The alternative is to have analog mixed signal circuit to handle the comparison. And then a limited or filtered data can be sent to digital general purpose processor, so the general purpose processor can be a low end processor.

Since the emitter has finite number of emitter loops and they naturally have angles between them, if the cone shaped receiver embodiment is used, the receivers only need to be as accurate as the emitters, and can be made even sparser. Additional calculations are linear mappings as long as cosine tables are in place. This is why a physically larger honeycomb may actually be faster and lighter than wedge shaped.

2) Mixed Signal Circuit

As mentioned above, mixed signal circuit could handle the comparisons of signal strength. Also, it should determine the frequency of the signal. To achieve these two, there are few things to consider: a) Only the peak of the signal needs to be compared; b) The maximum of the signal can be digitized as per antenna or only done once after comparisons: c) To determine the frequency one can use a voltage controlled oscillator to determine the phase difference, or use really sharp band-pass filters; d) Frequency can be determined as per antenna or only done once after comparisons, the latter is preferred; e) Ideally frequency and strength digitization only needs to be done once, but this is ultimately dependent on the propagation delays with in the circuit. Propagation delays are directly the result of gate capacitance of a process node; and f) Propagation delays can be addressed by either change the process node to a smaller one, or increase the emitter time. (If emitter time is increased, the performance is reduced accordingly and the design has to be modified accordingly). The diagram of the circuit is provided in FIG. 31.

Figure 31:
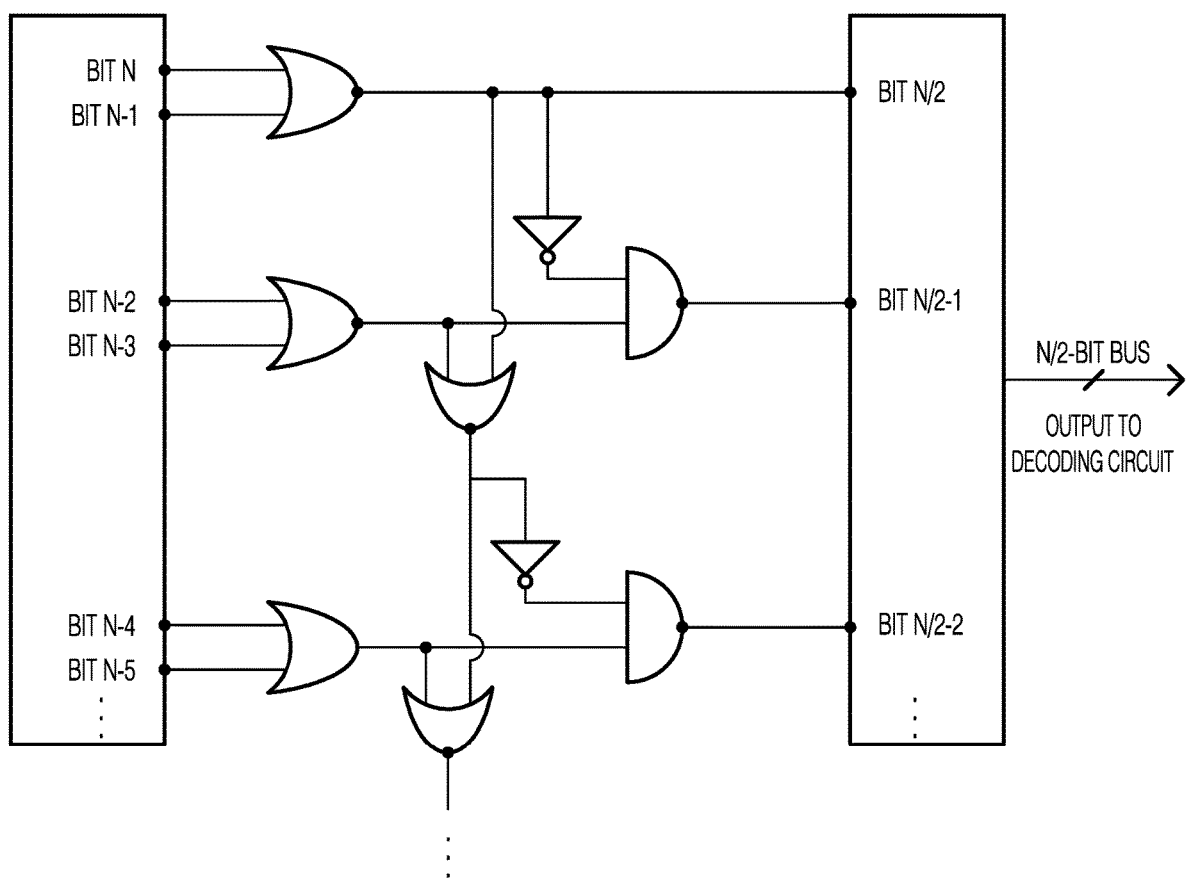
FIG. 31 is a circuit diagram of an encoding circuit.

From FIG. 31, the following determinations are made:

a) The left hand side of the dotted line is circuits for each antenna. The right side of the dotted line is shared by a set of antenna. The most optimized size of antenna size still needs to be determined. Several factors, such as size of the chip, number of connections, packaging. These have to be determined after some node process is selected.

b) There are two optional components, an amplifier and a rectifier. An amplifier may be used to elevate the voltage so that A/D converter circuit can be much easier to implement. A rectifier circuit provides a little cushion for the peak detector circuit so that the bleed rate of peak detector can be manageable.

c) The input voltage to the system is either the output from previous stage or the "minimum reference voltage". The minimum reference voltage $V_{min\_ref}$, is set to slightly lower than the voltage at ±0.15 rad. At this position, the voltage is about 0.7149 of Vmax (see, previous section, Antenna Physics.) By pegging the initial comparison to this voltage, say 0.65 of Vmax a lot of false positives can be eliminated. If an amplifier is indeed added, then the minimum reference voltage should be increased by the same scale.

d) Comparator circuit simply compares input voltage to the captured voltage by the antenna. Against the input voltage of to this stage. If the captured voltage is greater than the input voltage, then the comparator output is VDD, or a logic "1"; vice versa, the output would be ground or a logic "0". The output is feed into an analog mux switch to determine which signal to propagate to the next stage. The comparator output also takes a logical 1 or 0 on that specific bit of the register.

e) This leads to the logical arrangement of the antennas from 1 to N. For a cone shaped receiver set, start with any particular one and then compare to its planar adjacent antenna and work either clockwise or counter clockwise. For a wedge shaped, start with one end, and then to its planar neighbor and the work up and down accordingly.

f) The N-bit register would record some 1s and 0s. Note that the absorbing separators between vertically adjacent receivers are made thin. They don't need to be perfect black bodies, so it is possible that non-perfectly coupled receivers can still beat the minimum reference voltage. For example if the perfect coupling is on the "end pair" of the set, and the comparison starts at the other end. What happens is that at some point the receiver start beating $V_{min\_ref}$, and each additional stage would be greater than the previous since its closer to the perfect coupling. The table below to illustrate this point.

| | | |
|---|---|---|
| $A(1) = 0$ | $A(2) = 0$ | |
| $A(4) = 0$ | $A(3) = 0$ | |
| $A(5) = 0$ | $A(6) = 0$ | |
| $A(8) = 0$ | $A(7) = 0$ | |
| . | . | |
| . | . | |
| . | . | |
| $A(N-5) = 1$ | $A(N-4) = 1$ | |
| $A(N-2) = 0$ | $A(N-3) = 1$ | the most significant bit |
| $A(N-1) = 0$ | $A(N) = 0$ | |

Since the hardware logic allows some false positives at the register level. And depending on the type of absorber used, and the geometry of its arrangement, there is no guarantee of how many of these false positives could happen. This register information needs to be "cleaned up a bit". The correct way to interpret the register information is to look for the most significant bit. This leads to the encoding circuit shown in FIG. 32 and optional decoding circuit shown in FIG. 33.

Figure 32:
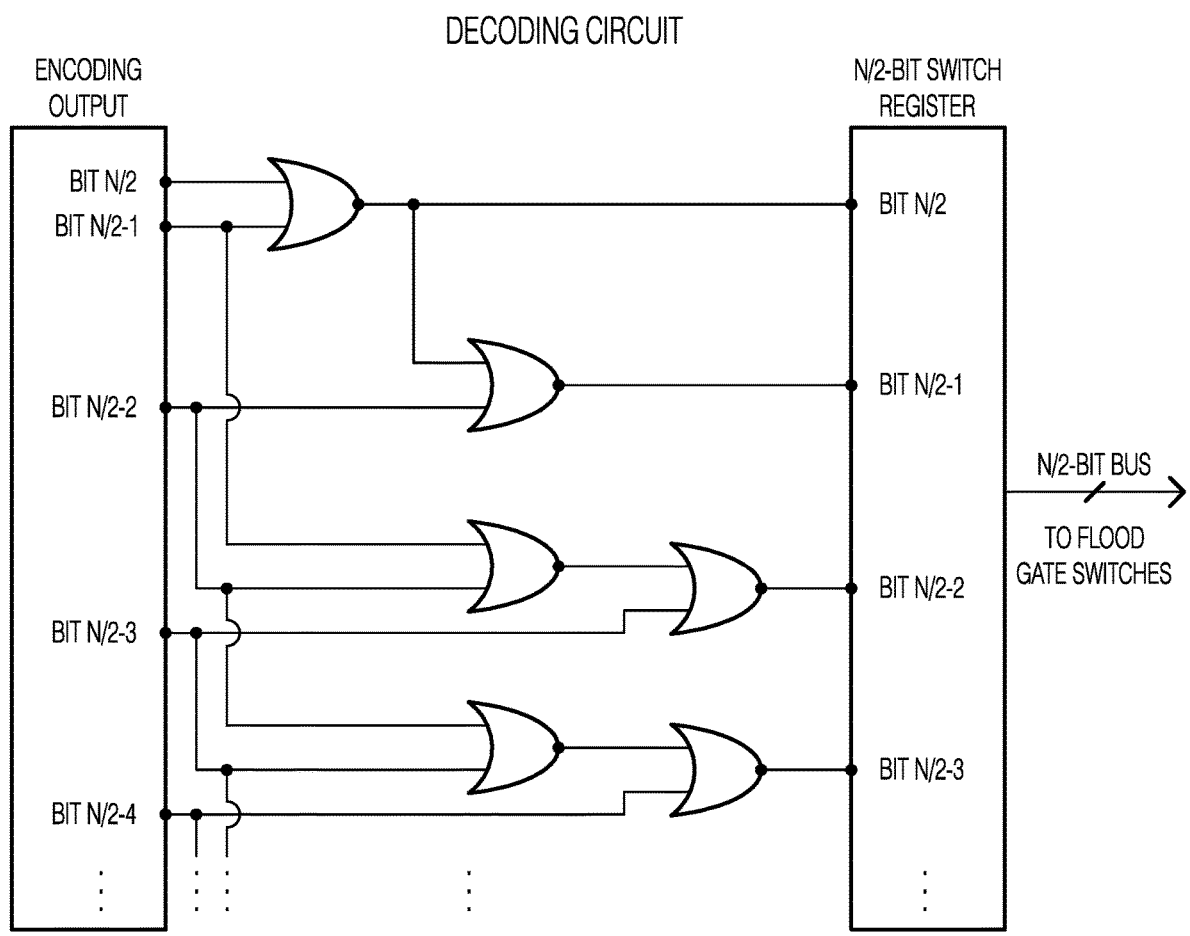
FIG. 32 is a circuit diagram of a decoding circuit.

The encoding circuit shown in FIG. 32 eliminates false positives. Since a pair of receiver loops is needed, an adjacent pair can be combined together using or gates. This reduces the size of bus that needs to be routed around the chip as well. The encoding circuit starts with the most significant bit and work downwards. The output of the "OR" gate feeds into an inverter and the next stage. Combine the inverter and the AND logic from the next stage will force that bit to "0". The OR logic between stages makes sure that the most significant bit pair from that bit on will pass on.

Figure 33:
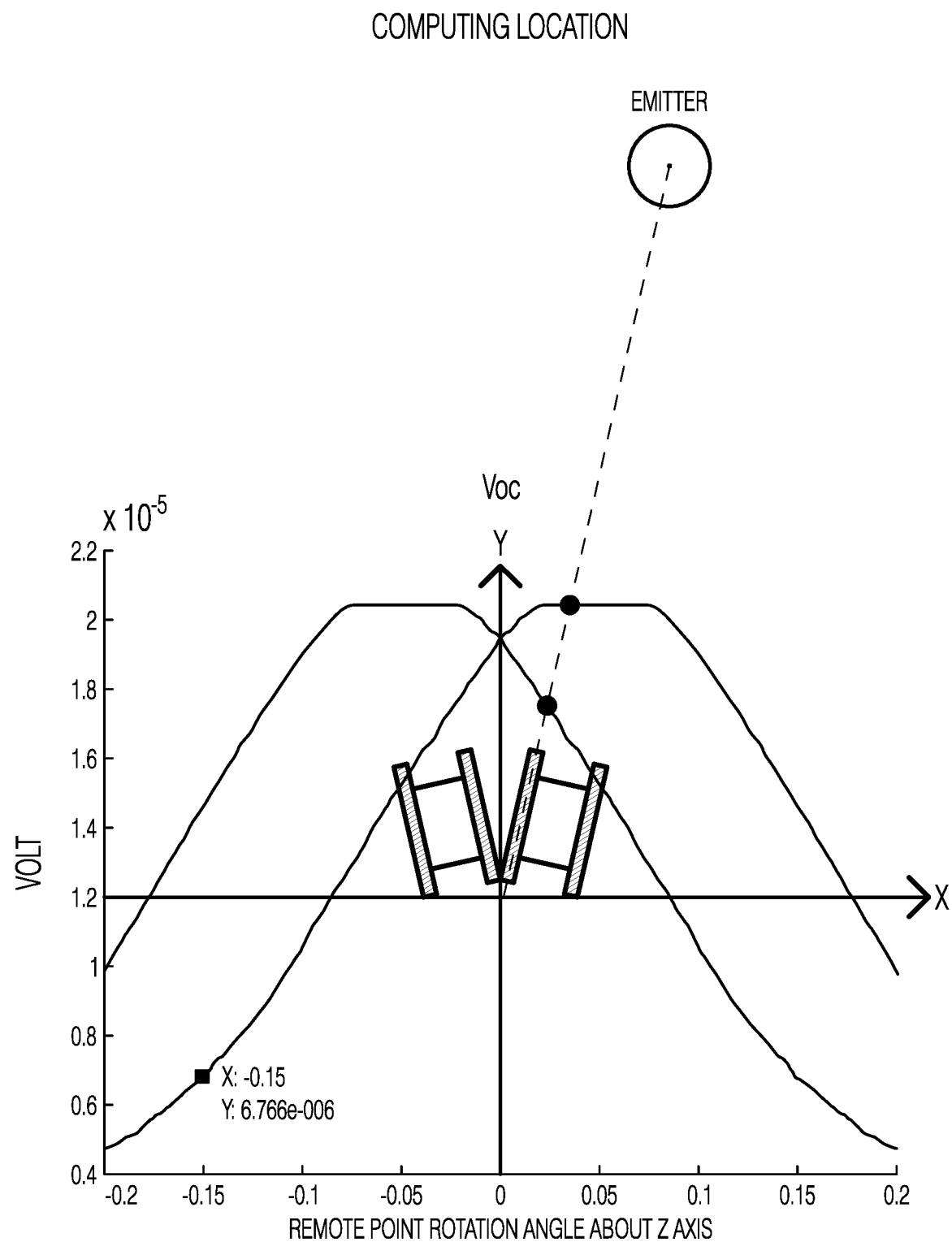
FIG. 33 is a graph illustrating computing a location of an emitter.

From the decoding circuit in FIG. 33, the principal is that the vertically aligned antennas of a wedge shaped set (or rotated antennas of a cone shaped set), are dense enough that only each pair occupies a small enough vertical space. This would lead to 200×25 antennas in total. It may be more cost beneficial to reduce this density and extrapolate the position based on multiple vertically aligned antennas. The decoding circuit in FIG. 32 makes a 1 to 3 mapping, which makes sure the vertically adjacent pairs of the most significant bit are also marked as 1. FIG. 33 assumes a wedge shaped unit. For a cone shaped, the least significant bit is interconnected to the most significant bit like all others.

The flood gate switches are simple analog switches that if turned on, feed into either the frequency detector or A/D converters and registers. These are N-bit switches, with N/2-bit control signals. For the frequency detector that is controlled from encoding circuit, only one side of the circuit is connected to the switches. The worst case scenario is that ±0.15 rad, where the strength of the signal is about 0.332 of Vmax. This would not be a problem with frequency detector. For the A/D converter case, each output of decoding circuit is connected to the respective pair of N-bit switch.

3) Algorithms

The position is computed based on intersecting vectors of two receivers of the same plane. And once the position is determined, it is continuously, modified to maintain roughly constant level at the receiver. Thus movement can be continuously tracked and monitored. This design brings up three problems, a) how to map voltage information to special coordinates, b) how to identifying position in the very first place, c) how to continuously monitor the progress.

a) Positioning Algorithms

To compute the location of the emitter, simply solve the overlapping vectors in that plane and then map that plane in 3-D space. Depending on cheese wedge or honeycomb design, 3-D space mapping solutions are slightly different.

Figure 34A:
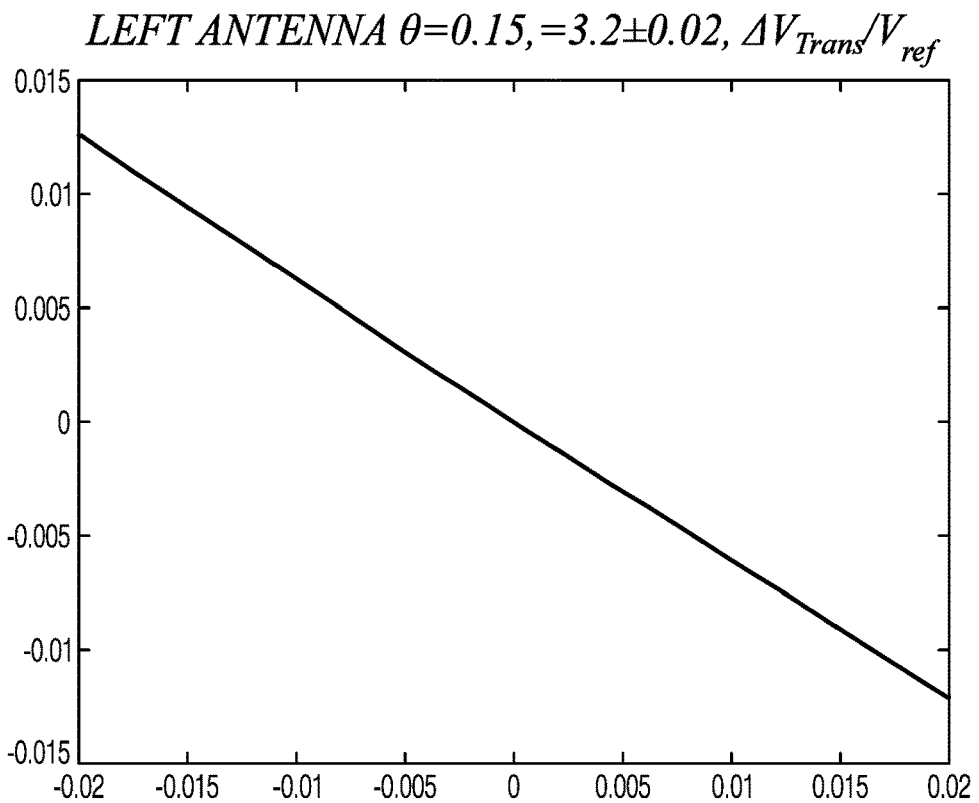
FIG. 34A is a graph illustrating left antenna transitional movement for a first distance and first angle.
Figure 34B:
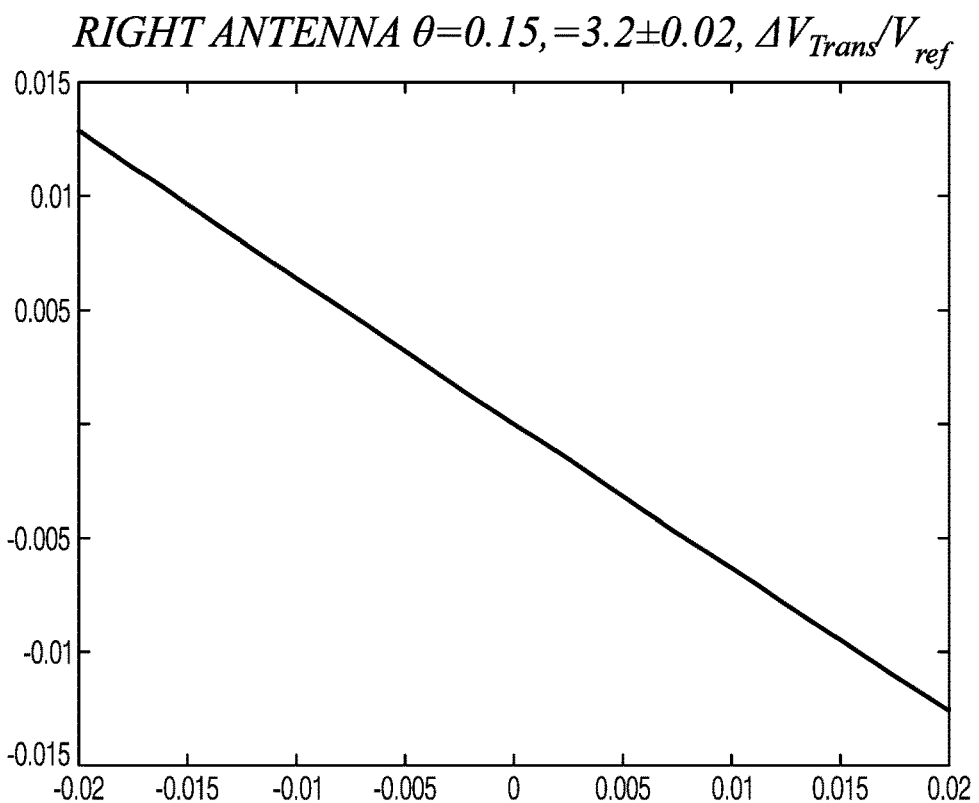
FIG. 34B is a graph illustrating right antenna transitional movement for a first distance and first angle.

On one particular plane is FIG. 34. Given the receiver knows the current I running in the emitter—the receiver controls that based on its calculated distance, so the distances is already known to the receiver. This begs the solution for the first current distance pair, which will be detailed in the next section. For now, assume the distance is already known. The paired receiver can construct a receiver expected voltage above. This can both be a mapping between position and rotational movement, or it can be approximated by 3 linear functions.

Let Vmax be the maximum reference voltage at that distance, and remember this Vmax is continuously tuned to maintain a constant level. Let the origin be at the imaginary origin of the paired antenna [0; 0]. This will be this will be further translated into world coordinate in the later stage.

Left antenna:

$$V_{OC\_L} = f_{Rot\_L}(\theta) = \begin{cases} 4.0729 V_{max} * \theta + 1.3258 V_{max}, & -0.15 < \theta \leq -0.08 \\ V_{max}, & -0.08 < \theta \leq -0.02 \\ -3.9294 V_{max} * \theta - 0.9214 V_{max}, & -0.02 < \theta \leq 0.15 \end{cases}$$

Right antenna:

$$V_{OC\_R} = f_{Rot\_R}(\theta) = \begin{cases} 3.9294 V_{max} * \theta + 0.9214 V_{max}, & -0.15 < \theta \leq 0.02 \\ V_{max}, & 0.02 < \theta \leq 0.08 \\ -4.0729 V_{max} * \theta + 1.3258 V_{max}, & 0.08 < \theta \leq 0.15 \end{cases}$$

Then it comes to translational movement, identified in the latter half of the Antenna Unit Geometry section. At a specific distance |R| and angle θ, the change along that vector will also cause a change in voltage. This change in voltage ΔVTrans should follow a 1 R3/ratio bound by constant VOC and infinity. However, in practice, if Vmax is constantly tuned to maintain a constant level, receiver voltages VOC become predictable, and ΔVTrans can be approximated by a linear function, within the range of several centimeter (±2 cm).

Figure 35A:
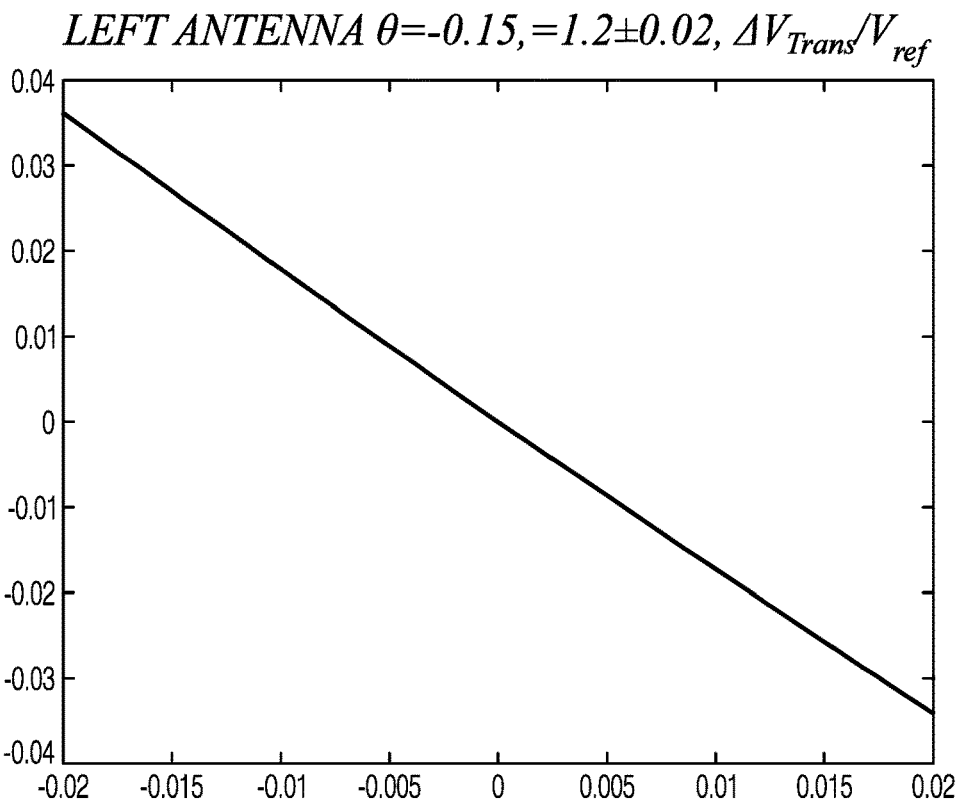
FIG. 35A is a graph illustrating left antenna transitional movement for a second distance and second angle.
Figure 35B:
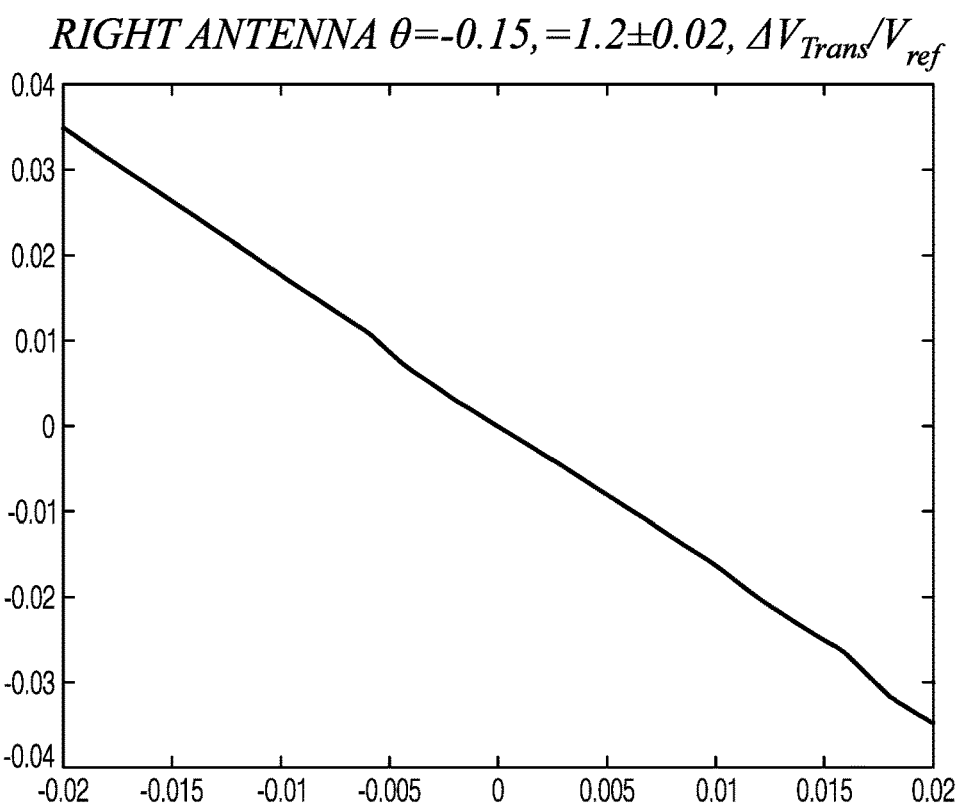
FIG. 35B is a graph illustrating right antenna transitional movement for a second distance and second angle.
Figure 36A:
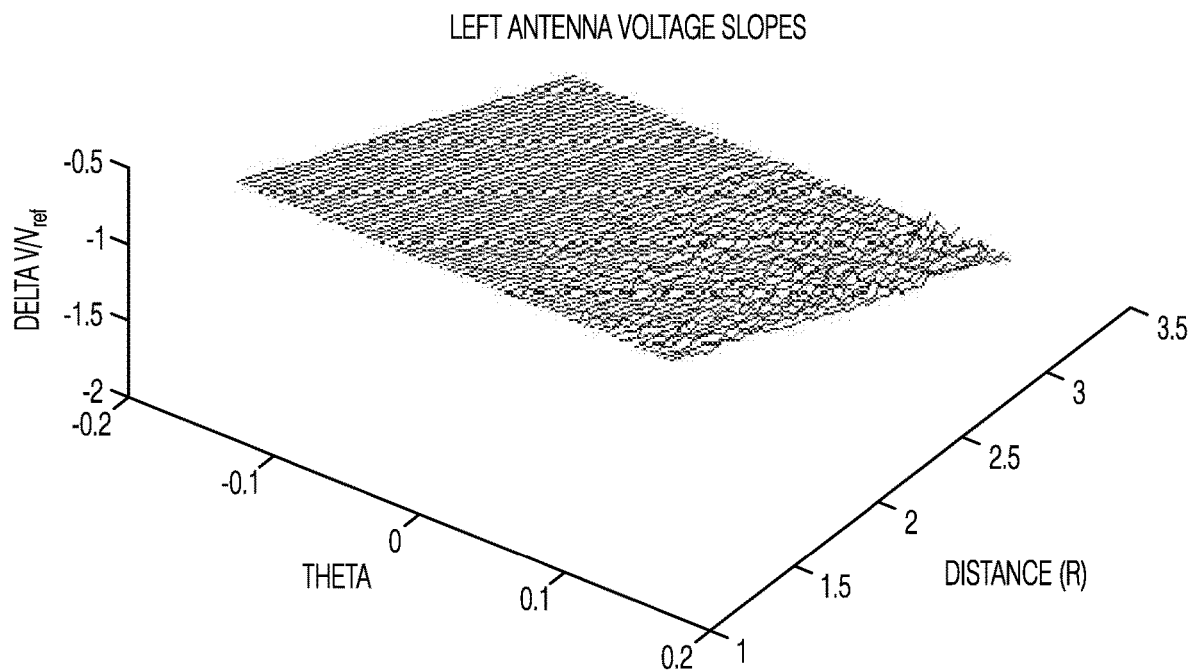
FIG. 36A is a graph illustrating left antenna voltage slopes.
Figure 36B:
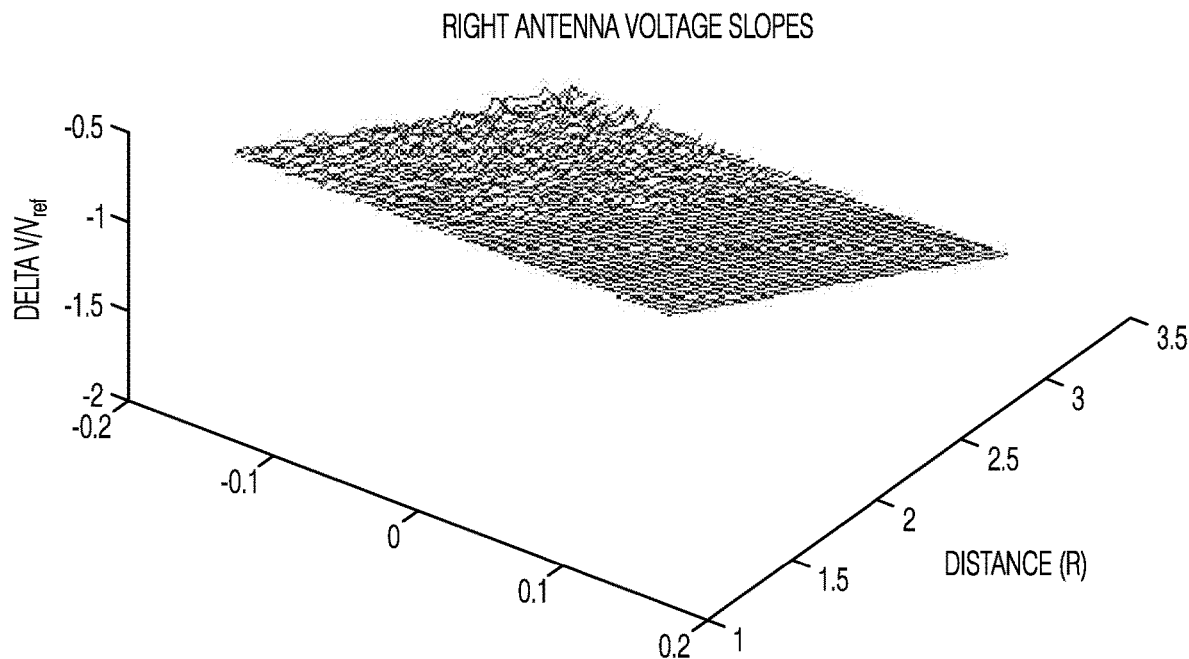
FIG. 36B is a graph illustrating right antenna voltage slopes
Figure 37:
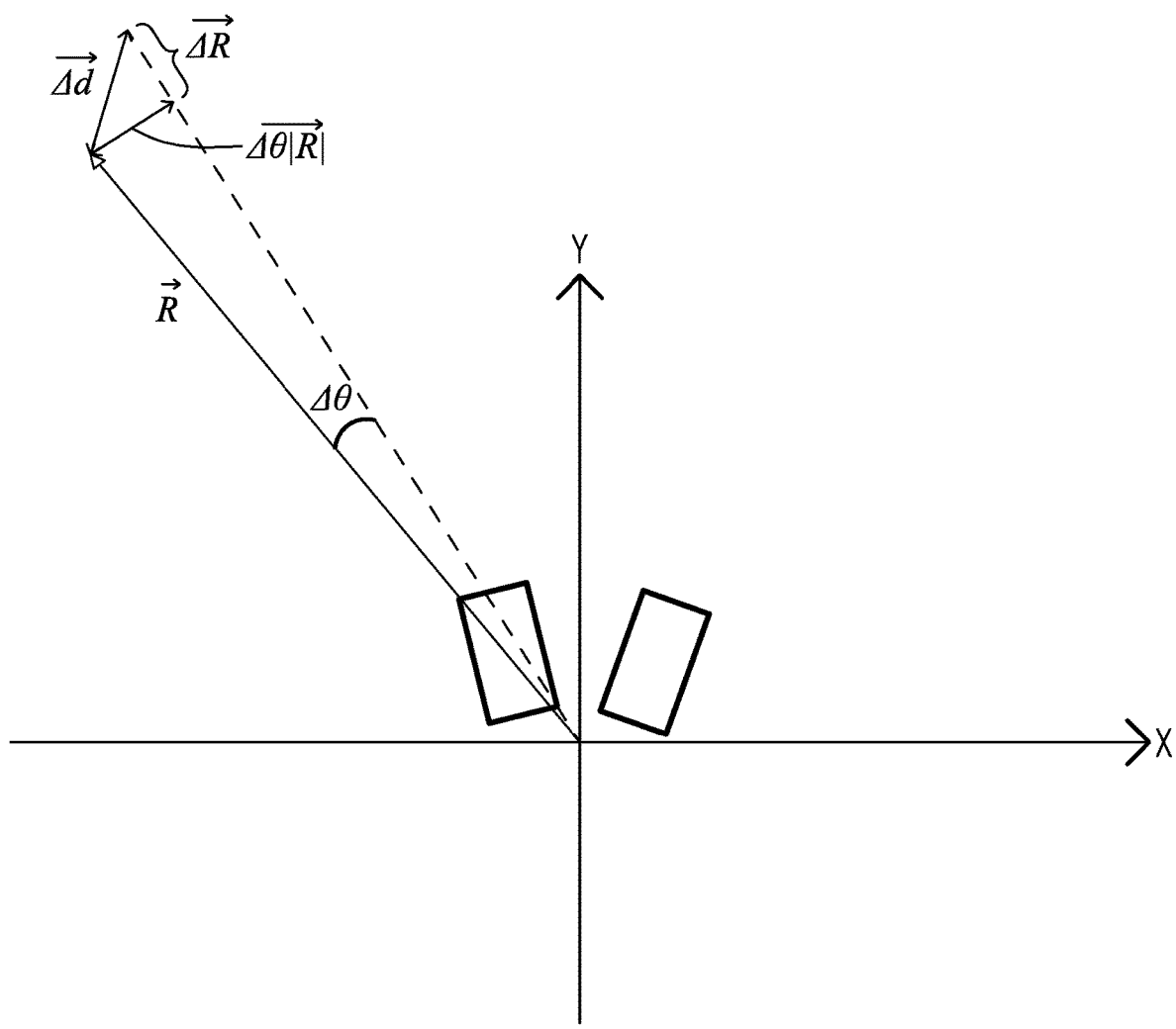
FIG. 37 is a graph illustrating vector calculations for rotational movements for two receivers.

FIG. 35A shows left antenna θ=0.15, R=3.2±0.02, ΔVTrans/Vref] and FIG. 35B shows right antenna θ=0.15, R=3.2±0.02, ΔVTrans/Vref]. FIG. 36A shows Left antenna θ=−0.15, R=1.2±0.02, ΔVTrans/Vref] and FIG. 36B shows right antenna θ=−0.15, R=1.2±0.02, ΔVTrans/Vref]. FIG. 37A shows the left antenna slope plot and FIG. 37B shows the right antenna slope plot.

Let the slope of this linear function be:

$$\alpha_{Right}(|\vec{R}|,\theta) \text{ and } \alpha_{Left}(|\vec{R}|,\theta)$$

Left antenna:

$$\Delta V_{Trans\_L} = \alpha_{Left}(|\vec{R}|,\theta) * |\overrightarrow{\Delta R}|$$

Right antenna:

$$\Delta V_{Trans\_R} = \alpha_{Right}(|\vec{R}|,\theta) * |\overrightarrow{\Delta R}|$$

Given a voltage—distance pair, θ is known and distance |R| is also known. Let the tracking point move with a random vector $\overrightarrow{\Delta d}$.

This vector can be further decomposed into a circular movement $(\overline{(\Delta\theta)|R|})$ and a translational movement $(\overrightarrow{\Delta R})$.

Figure 38:
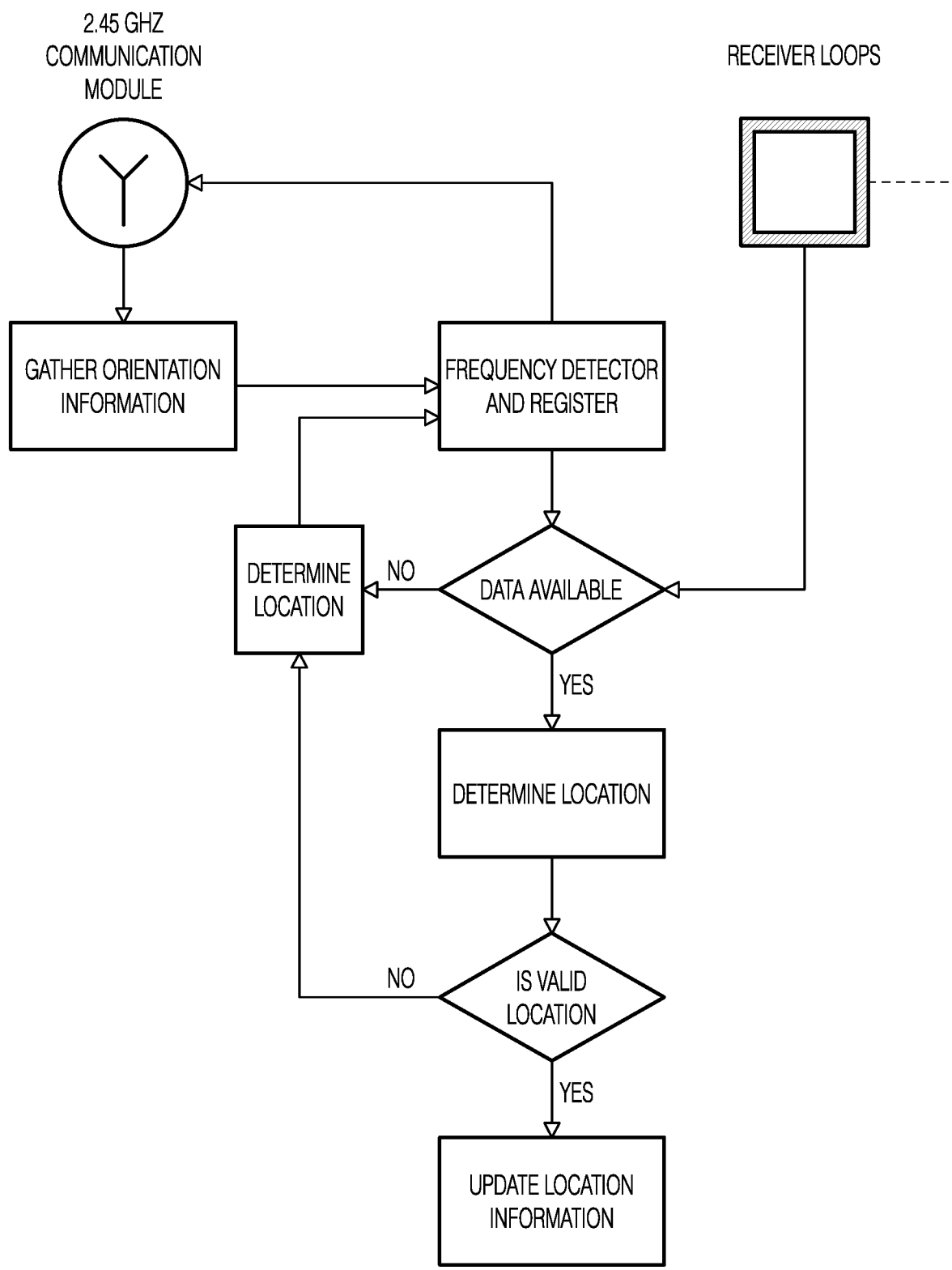
FIG. 38 illustrates a state machine for an initialization process.

See FIG. 38. When a new voltage is captured it's compared to previous result, then two relationships can be formed. Multiple previous results can be saved by the processor. Previous results can take the form of voltage form, distance-angle pair, or both at the same time. Since this is simple one to one mapping, it only takes a little calculation, to get one from another. In this calculation, the assumption is voltage form.

Left $V_{OC\_L\_New} = V_{OC\_L\_Prev} + \Delta V_{OC\_L}$

Right $V_{OC\_R\_New} = V_{OC\_R\_Prev} + \Delta V_{OC\_R}$

This change in voltage corresponds to the random movement: $\overrightarrow{\Delta d} = \overline{(\Delta\theta)|R|} + \overrightarrow{\Delta R}$.

Introduce all previous equations into above two:

$$V_{OC\_L\_New} = f_{Rot\_L}(\theta+\Delta\theta) + \alpha_{Left}(|\vec{R}|,\theta+\Delta\theta) * |\overrightarrow{\Delta R}|$$

$$V_{OC\_R\_New} = f_{Rot\_R}(\theta+\Delta\theta) + \alpha_{Right}(|\vec{R}|,\theta+\Delta\theta) * |\overrightarrow{\Delta R}|$$

Note that for rotational movement, the function is a combination of 3 linear functions, so Δθ inherit that linearity as well. To make things even simpler, as observed from above, for every significant change of Δθ, the slope of ΔVTrans does not change significantly, especially, when it is digitized according to threshold voltage defined above.

$$\alpha_{Right}(|\vec{R}|,\theta+\Delta\theta) \approx \alpha_{Right}(|\vec{R}|,\theta).$$

$$V_{OC\_L\_New} - V_{OC\_L\_Prev} = \Delta V_{OC\_L} = f_{Rot\_L}(\Delta\theta) + \alpha_{Left}(|\vec{R}|,\theta) * |\overrightarrow{\Delta R}|$$

$$V_{OC\_R\_New} - V_{OC\_R\_Prev} = \Delta V_{OC\_R} = f_{Rot\_R}(\Delta\theta) + \alpha_{Right}(|\vec{R}|,\theta) * |\overrightarrow{\Delta R}|$$

The equations are reduced to two linear functions with two unknowns. After solving the movement in a specific plane, the plane is mapped to its pre-determined spatial coordinates.

b) Initialization Process

Figure 39:
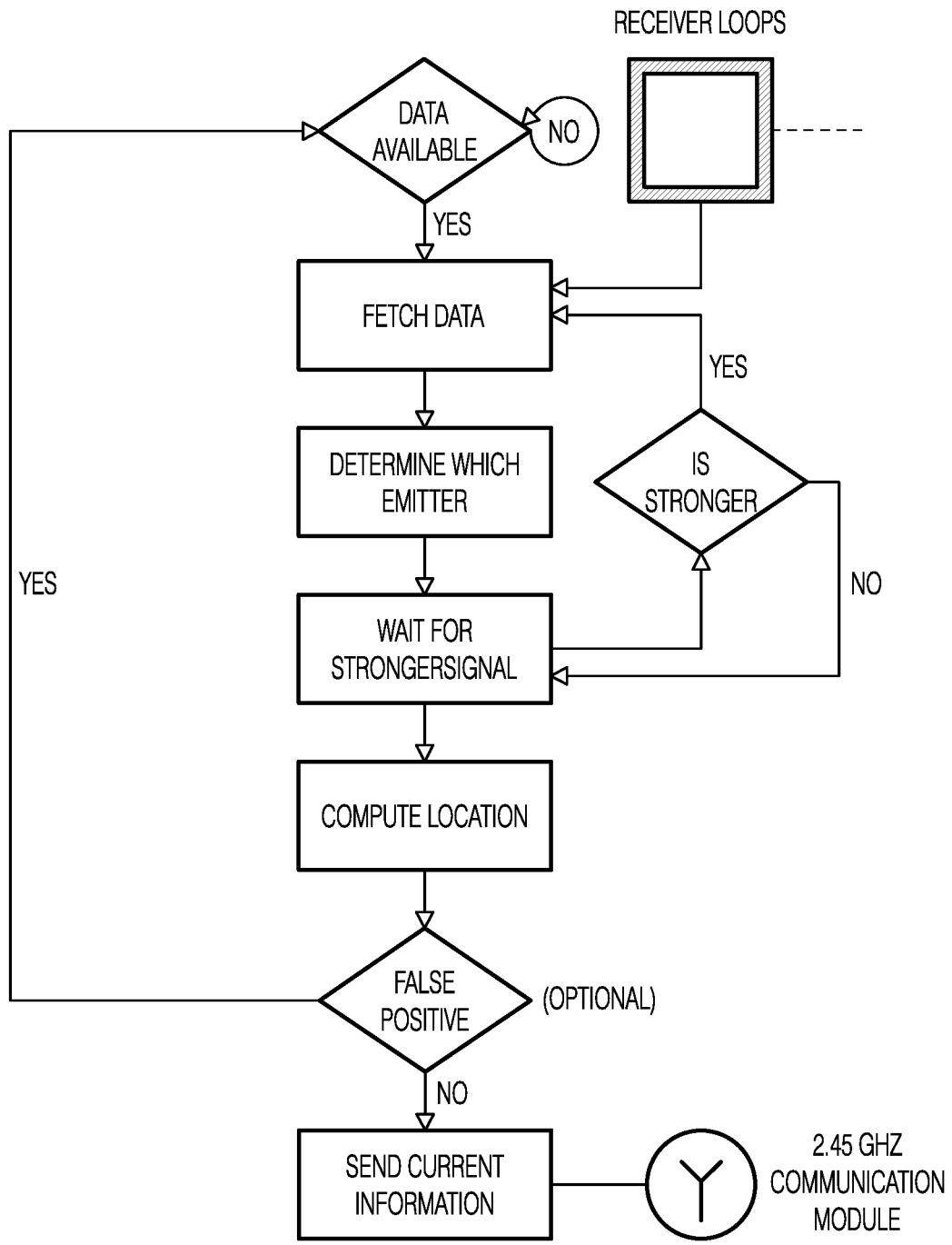
FIG. 39 illustrates a state machine for monitoring movement.

The previous section discussed about how to continuously monitor the voltage difference and translate that into position information. However, this still leaves the question of how to get the initial position information. The initialization process is a trial an error method that uses the following assumptions and algorithm as shown in FIG. 39.

The following assumptions are made with reference to FIG. 1: user 110 is at an initial position, about 2 meters from the receiver 170 and user 110 should not be moving. (If user moves, such information can be gathered with IMU units from the emitters 115, 120, 125, 130, 135, 140, 145, 150, 155, 160). FIG. 39 shows the following state machine:

I. Gather the orientation information. This will be used to extrapolate the voltage information.

II. First assume the emitter is at the closest point of 1.2 m a far from the receiver. Emitter will now emit the weakest signal possible.

III. At this point there are two ways of doing this, if signal is captured by at least two antenna, then the ratio of VOC_L and VOC_L should be the same to that of distance R. Then an estimate can be made to accelerate the process.

IV. If no signal is captured, i.e. they are not strong enough to be captured by the receiver, then increase the signal by a few centimeters or even a few millimeters at a time.

V. Once the paired antennas have workable signals, we can proceed with step III).

VI. After either jumping to the conclusion like step II) or have to go through one by one like step IV), the initial voltage-distance information can be obtained.

This initialization process gives the absolute position information. This process can be utilized at any time, when the system detects position drift. One embodiment is to have each emitter operate in two different frequencies with two sets of wires. Both sets are still arranged according to the design in emitter unit section. However, one set of wire should be used to track continuous movement like before; the other set should always run according to the initialization mode to actuate on the position information.

c) Monitoring Movement

At the receiver 170 end, the processing unit algorithm can be illustrated with the following state machine, as shown in FIG. 40:

I. Is data available?

II. If data is available, fetch frequency, strength and location data of the perfectly coupled receiver and its adjacent antennas.

III. Determine which emitter is it. For example hand may have 2 emitters and head can have 4, and feet and all other joints may only have one each.

IV. Based on the critical location of the emitter, wait to see if stronger signal is detected. Since emitter wires are activated one loop at a time, this eliminates most of the false positives and interference.

V. If better signal is detected, update the information.

VI. After all the wait and updates, compute the location.

VIII. Finally, send via 2.45 GHz channel to emitters and tell them to update their power delivery passed on their current distance from the origin.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A system, comprising:
   one or more emitters, wherein the one or more emitters comprise:
      one or more emitter electromagnetic loops, wherein each of the one or more emitter electromagnetic loops are distributed uniformly across three emitter axes;
      one or more emitter electromagnetic absorbers; and
      one or more emitter electromagnetic blockers;
      wherein the one or more emitter electromagnetic absorbers and the one or more emitter electromagnetic blockers are configured to ensure each of the one or more emitter electromagnetic loops emit a first magnetic field on its own plane;
      wherein the one or more emitters each operate in a unique frequency;
   one or more receivers comprising:
      one or more receiver electromagnetic loops, wherein each of the one or more receiver electromagnetic loops are distributed uniformly across three receiver axes;
      one or more receiver electromagnetic absorbers; and
      one or more receiver electromagnetic blockers;
      wherein the one or more receiver electromagnetic absorbers and the one or more electromagnetic blockers are configured to ensure each of the one or more receiver electromagnetic loops emit a second magnetic field on its own plane; and
   a processor comprising a mixed signal integrated circuit configured to measure strength and frequency of an incoming magnetic fields;
   wherein the one or more receiver electromagnetic loops, the one or more receiver electromagnetic absorbers, and the one or more receiver electromagnetic blockers are placed in between the one or more receivers to increase differences in the strengths of the incoming magnetic fields; and
   wherein the differences in the strengths are measurable by the mixed signal integrated circuit.

2. The system of claim 1, wherein each emitter axes comprises at least six emitter electromagnetic loops and each receiver axes comprises at least six receiver electromagnetic loops.

3. The system of claim 1, further comprising one or more emitter units comprising at least one of the one or more emitters, wherein the one or more emitter units are located on a user.

4. The system of claim 1, wherein the one or more emitters are rotationally agnostic.

5. The system of claim 1, wherein the one or more emitter electromagnetic loops, the one or more emitter electromagnetic absorbers, and the one or more emitter electromagnetic blockers are placed in between the one or more emitter to increase differences in the strengths of outgoing magnetic fields.

6. A system, comprising:
one or more emitter units comprising one or more emitters, wherein the one or more emitters comprise:
at least six emitter electromagnetic loops, wherein an x-axis, y-axis, and z-axis each comprise two of the at least six emitter electromagnetic loops;
one or more emitter electromagnetic absorbers; and
one or more emitter electromagnetic blockers;
wherein the one or more emitter electromagnetic absorbers and the one or more emitter electromagnetic blockers are configured to ensure each of the one or more emitter electromagnetic loops emit a first magnetic field on its own plane;
a receiver unit comprising:
one or more receivers, wherein the one or more receivers comprise:
one or more receiver electromagnetic loops, wherein each of the one or more receiver electromagnetic loops are distributed uniformly across three receiver axes;
one or more receiver electromagnetic absorbers; and
one or more receiver electromagnetic blockers;
wherein the one or more receiver electromagnetic absorbers and the one or more electromagnetic blockers are configured to ensure each of the one or more receiver electromagnetic loops emit a second magnetic field on its own plane; and
one or more processors configured to measure strength and frequency of an incoming magnetic field; and
a gaming system configured to execute a virtual reality game.

7. The system of claim 6, wherein the one or more emitter comprise at least eighteen emitter loops, wherein the x-axis, y-axis, and z-axis each comprise six of the at least eighteen emitter electromagnetic loops.

8. The system of claim 6, wherein the gaming system is a personal computer.

9. The system of claim 6, wherein the one or more emitter units are located on a user.

10. The system of claim 9, wherein at least one of the one or more emitter units comprises one or more handheld emitter units to be held in a hand of the user.

11. The system of claim 10, wherein the one or more handheld emitter units comprise at least two emitters at opposite ends of a controller.

12. The system of claim 9, wherein one of the one of more emitter units comprises a head emitter unit to be worn on the user's head.

13. The system of claim 12, wherein the head emitter unit comprises at least four emitters.

14. The system of claim 9, further comprising at least five emitter units, wherein one of each of the five emitter units are located on a head, each hand, and each foot of the user.

15. The system of claim 9, further comprising at least ten emitter units, wherein four of the ten emitter units are located on the user's head, two of the ten emitter units are located in a right hand of the user, two of the ten emitter units are located in a left hand of the user, and one each of the ten emitter units are located on each foot of the user.

16. The system of claim 9, wherein at least one of the one or more emitter units is configured to be worn on one or more of the user's torso, the user's shoulder, the user's elbow, the user's knee, or the user's waist.

17. The system of claim 6, wherein the receiver unit-further comprises:
a convex spherical surface;
one or more small loop antenna units; and
one or more processing units attached to the one or more small loop antenna units;
wherein the one or more receivers are rotated along y-axis to create a cone shape.

18. The system of claim 17, wherein the one or more receivers are rotated along x-axis to create a wedge shape.

19. The system of claim 17, wherein the one more small loop antenna units are formed into a honeycombed matrix.

20. The system of claim 17, wherein the processing units further comprise a mixed signal circuit and a general purpose processor.

* * * * *